United States Patent
Fujiwara et al.

(10) Patent No.: US 8,288,299 B2
(45) Date of Patent: Oct. 16, 2012

(54) OPTICAL GLASS, PREFORM FOR PRECISION PRESS MOLDING, AND OPTICAL ELEMENT

(75) Inventors: Yasuhiro Fujiwara, Shinjuku-ku (JP); Shuhei Mikami, Shinjuku-ku (JP); Hiroki Takazawa, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/699,434

(22) Filed: Feb. 3, 2010

(65) Prior Publication Data
US 2011/0143907 A1   Jun. 16, 2011

Related U.S. Application Data

(60) Provisional application No. 61/149,493, filed on Feb. 3, 2009.

(51) Int. Cl.
*C03C 3/19* (2006.01)
*C03C 3/23* (2006.01)
*C03C 3/068* (2006.01)

(52) U.S. Cl. ............. 501/44; 501/49; 501/50; 501/78; 501/79

(58) Field of Classification Search .......... 501/44, 501/49, 50, 78, 79
See application file for complete search history.

(56) References Cited

U.S. PATENT DOCUMENTS

| | | | |
|---|---|---|---|
| 6,844,279 B2 * | 1/2005 | Hayashi et al. | 501/50 |
| 2005/0107240 A1 | 5/2005 | Uehara | |
| 2007/0225147 A1 * | 9/2007 | Hayashi et al. | 501/50 |
| 2007/0232477 A1 | 10/2007 | Fujiwara | |
| 2007/0247721 A1 | 10/2007 | Kasuga et al. | |
| 2009/0312172 A1 * | 12/2009 | Nakata | 501/78 |
| 2010/0255979 A1 * | 10/2010 | Fujiwara | 501/51 |

FOREIGN PATENT DOCUMENTS

| | | | |
|---|---|---|---|
| JP | 59-169952 A | | 9/1984 |
| JP | 07-118033 A | | 5/1995 |
| JP | 2005-170782 A | | 6/2005 |
| JP | 2005281124 | * | 10/2005 |
| JP | 2006-131450 A | | 5/2006 |
| JP | 2007-254224 A | | 10/2007 |
| JP | 2007-261877 A | | 10/2007 |
| WO | 2004/015978 A2 | | 2/2004 |

OTHER PUBLICATIONS

International Preliminary Report on Patentability and Written Opinion of the International Searching Authority corresponding to International Application No. PCT/JP2010/000656, dated Feb. 3, 2010.

* cited by examiner

*Primary Examiner* — Karl Group
(74) *Attorney, Agent, or Firm* — Sughrue Mion, PLLC

(57) ABSTRACT

The present invention relates to an optical glass with a high refractive index and good precision press moldability, and a preform for precision press molding and an optical element that are comprised of the optical glass. The present invention further relates to a method of manufacturing an optical element, a lens unit being equipped with an optical element and an image pickup device being equipped with a lens unit.

11 Claims, 13 Drawing Sheets

Time course changes in nd and $\nu$ d of Form A,
Example 32 (D=-0.60, {BO1.5 x F/O} =4.8), Form A,
Example 33 (D=0.60, {BO1.5 x F/O} =3.3)
and Reference composition (D=+22.0, {BO1.5 x F/O} =18.0)
(added values are melting time(hr))

Time course change in nd of Form A,
Example 32 (D=-0.60, {BO1.5 x F/O} =4.8),
Form A, Example 33 (D=0.60, {BO1.5 x F/O} =3.3)
and Reference composition (D=+22.0, {BO1.5 x F/O} =18.0)

Time course change in specific gravity of Form A,
Example 32 (D=-0.60, {BO1.5 x F/O} =4.8),
Form A, Example 33 (D=0.60, {BO1.5 x F/O} =3.3)
and Reference composition (D=+22.0, {BO1.5 x F/O} =18.0)

Time course change in glass transition temperature Tg of Form A, Example 32 (D=-0.60, {BO1.5 x F/O} =4.8) and Reference composition (D=+22.0, {BO1.5 x F/O} =18.0)

Relation between inverse of kinetic viscosity and viscosity (Form C, Example 8; Specific gravity $4.53 \times 10^3$ kg/m$^3$)

Comparative example: photograph after holding test (Patent document 1, Example 5)

Melting at 1300 °C without a cover and then cooled to below Tg. After maintaining the glass at 1,140°C for two hours, surface state of the glass was observed.

Example 22 (Form B) in Table 4    Example 2 in Patent Document 1    Example 3 in Patent Document 1

OPTICAL GLASS, PREFORM FOR PRECISION PRESS MOLDING, AND OPTICAL ELEMENT

CROSS-REFERENCE TO RELATED APPLICATIONS

This application claims benefit of priority to U.S. Provisional Application No. 61/149,493 filed on Feb. 3, 2009, which is expressly incorporated herein by reference in its entirety.

TECHNICAL FIELD

The present invention relates to an optical glass, a preform for precision press molding, and an optical element. More particularly, the present invention relates to an optical glass with a high refractive index and good precision press moldability, and a preform for precision press molding and an optical element that are comprised of the optical glass.

BACKGROUND ART

Correction of chromatic aberration in image pickup optical systems, typified by camera lenses, is achieved by combining a high dispersion lens and a low dispersion lens. In recent years, the trend has been to attempt to achieve greater functionality and compactness through the use of optical lenses with higher refractive indexes for both high and low dispersion lenses within the feasible scope of correction of chromatic aberration.

In addition to manipulating the optical characteristics of the glass constituting a lens, it is also possible to achieve greater functionality and compactness in optical systems by rendering the optical functional surfaces of the lens asymmetric. The precision press molding method is suited to the large-scale production of such lenses.

To improve the productivity of the precision press molding method, it is necessary to first achieve a certain degree of moldability to ensure the productivity of glass materials or preforms for precision press molding. That is, a certain viscosity of glass at a temperature at which crystals do not precipitate, or a certain degree of resistance to devitrification at a temperature at which the glass is of moldable viscosity, is required.

On that basis, it is also necessary to enhance the productivity of precision press molding. Expensive mold materials that are resistant to heat and highly rigid, such as SiC and superhard materials, are employed in the precision press molding method. Pressing molds with molding surfaces that have been precision processed into shapes the reverse of the shapes of the optically functional surfaces of optical elements are employed. As a result, the service lifetime of the pressing mold greatly affects production costs and productivity. Thus, effort has been expended on employing glasses with a low glass transition temperature and sag temperature to lower the temperature during press molding and prevent the thermal deterioration of the pressing mold.

Patent Document 1 discloses an optical glass having a low glass transition temperature (Tg), a high refractive index, low dispersion, and good internal glass quality, that is suited to reheat press molding and/or precision press molding. This optical glass is described as having optical constants within the specific ranges indicated in FIG. 1 of Patent Document 1, a low glass transition temperature (Tg), and good internal glass quality that are achieved by the incorporation of pre-scribed quantities of $SiO_2$, $B_2O_3$, $La_2O_3$, $Gd_2O_3$, $Li_2O$, and F. Thus it is suited to reheat press molding and/or precision press molding.

The optical glass described in Patent Document 2 is a known optical glass having a composition similar to that described in Patent Document 1. An $SiO_2$—$B_2O_3$—$La_2O_3$—$ZnO$—$ZrO_2$—F system optical glass with a high refractive index and low dispersion is disclosed in Patent Document 2. This optical glass is described has having a high refractive index, low dispersion, and good devitrification stability. However, there is no description regarding reheat press molding or precision press molding in Patent Document 2. Patent Document 3 describes an $SiO_2$—$B_2O_3$—$La_2O_3$—$Gd_2O_3$—$Li_2O$—F system low transition temperature (Tg) glass preform material having a high refractive index and low dispersion within a prescribed range for use in precision press molding, and an optical glass suited to precision press molding.

[Patent Document 1] Japanese patent publication 2005-170782

[Patent Document 2] Japanese patent publication shou 59-169952

[Patent Document 3] WO2004/015978

Patent Documents 1 to 3 are expressly incorporated herein by reference in their entirety The differences between Patent Documents 1 and 2 are as follows. The optical glass described in Patent Document 1 contains essentially no $As_2O_3$, while all the glasses specifically disclosed in Patent Document 2, with but one exception, contain $As_2O_3$. In Patent Document 1, $As_2O_3$ is eliminated as a component that greatly burdens the environment.

The $SiO_2$—$B_2O_3$—$La_2O_3$—$ZnO$—$ZrO_2$—F system optical glasses described in above-cited Patent Documents 1 and 2 are good optical glasses with high refractive indexes and low dispersion. However, the glasses described in Patent Document 1 comprise a relatively large quantity of expensive $Yb_2O_3$, or have a high liquidus temperature, which presents problems in terms of moldability. Many of the glasses disclosed as examples have glass transition temperatures exceeding 600° C., and are not necessarily suitable as optical glasses for precision press molding. The optical glasses of Patent Document 2 have a high glass transition temperature, and cannot be considered suitable for precision press molding. The optical glasses described in above-cited Patent Document 3 present such problems as inadequate thermal stability.

Accordingly, an object of the present invention is to provide an optical glass that solves the above problems and is suited to precision press molding.

SUMMARY OF THE INVENTION

The optical glass of the present invention is comprised of two basic forms specified from different perspectives.

The first basic form of the present invention provides an optical glass having a high refractive index and low dispersion characteristics, exhibiting good thermal stability, with a low glass transition temperature, that is suited to precision press molding.

The optical glass of the first basic form of the present invention is an optical glass characterized by comprising, denoted as cationic percentages,

| | |
|---|---|
| $BO_{1.5}$ | 20 to 70 percent; |
| $LaO_{1.5}$ | 6 to 30 percent; |
| $GdO_{1.5}$ | 4 to 25 percent; | as well as O and F, with the F/O molar ratio of the F content to the O content being 0.01 to 0.30.

The second basic form provides a high quality optical glass containing B, O, and F as components, volatizing little in melt form, and having characteristics such as optical characteristics that vary little.

The optical glass of the second basic form of the present invention is an optical glass comprising glass components in the form of cations including B and anions including O and F, wherein the value of $B_B$—($B_O$—$B_B$) falls within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$.

The present invention further comprises four forms, denoted by A to D below, that are included in the first and second basic forms. The four forms of A to D relate to optical glasses that satisfy the conditions of the above-described first and second basic forms and have refractive indexes nd and Abbé numbers ν(nu)d that lie in mutually different regions.

The optical glass of Form A is an optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 20 percent; |
| ZnO | 0 to 20 percent; |
| $ZrO_2$ | 0 to 4.5 percent; |
| $TaO_{2.5}$ | 0 to 7 percent; |
| $YbO_{1.5}$ | 0 to 0.5 percent; |
| $GeO_2$ | 0 to 5 percent; | as well as O and F, with the F/O molar ratio of the F content to the O content being 0.01 to 0.30;

the combined sum of the ZnO content, three times the $ZrO_2$ content, and five times the $TaO_{2.5}$ content ($ZnO+3ZrO_2+5TaO_{2.5}$) being 40 percent or less;

the combined sum of twice the $LiO_{0.5}$ content, the ZnO content, and ½ the F content ($2LiO_{0.5}+ZnO+(F/2)$) when the total quantity of cations is denoted as 100 being 20 percent or greater;

the value of $B_B$—($B_O$—$B_B$) falling within a range of −60 to +20, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;

the refractive index nd being 1.75 to 1.81; and the Abbé number νd being 48 to 52.

The optical glass of Form B is an optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 20 percent; |
| ZnO | 0 to 25 percent; |
| $ZrO_2$ | 8 percent or less; |
| $TaO_{2.5}$ | 7 percent or less; |
| $YbO_{1.5}$ | 0 to 3 percent; |
| $GeO_2$ | 0 to 5 percent; | as well as O and F, with the F/O molar ratio of the F content to the O content being 0.01 to 0.30;

the ratio of the $ZrO_2$ content to the combined content of $ZrO_2$ and $TaO_{2.5}$ ($ZrO_2/(ZrO_2+TaO_{2.5})$) being 0 to 0.7;

the combined sum of $ZrO_2$ and $TaO_{2.5}$ ($ZrO_2+TaO_{2.5}$) being 3 to 10;

the combined sum of twice the $LiO_{0.5}$ content, the ZnO content, and ½ the F content ($2LiO_{0.5}+ZnO+(F/2)$) when the total quantity of cations is denoted as 100 being 20 percent or greater;

the value of $B_B$—($B_O$—$B_B$) falling within a range of −60 to +20, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;

the refractive index nd being 1.79 to 1.835; and the Abbé number νd being 42 to 48.

The optical glass of Form C is an optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 20 percent; |
| ZnO | 0 to 15 percent; |
| $ZrO_2$ | 5 percent or less; |
| $TaO_{2.5}$ | 3 percent or less; |
| $YbO_{1.5}$ | 0 to 3 percent; |
| $GeO_2$ | 0 to 5 percent; | as well as O and F, with the F/O molar ratio of the F content to the O content being 0.01 to 0.30;

the combined sum of the ZnO content, three times the $ZrO_2$ content, and five times the $TaO_{2.5}$ content ($ZnO+3ZrO_2+5TaO_{2.5}$) being 15 percent or less;

the combined sum of twice the $LiO_{0.5}$ content, the ZnO content, and ½ the F content ($2LiO_{0.5}+ZnO+(F/2)$) when the total quantity of cations is denoted as 100 being 20 percent or greater;

the value of $B_B$—($B_O$—$B_B$) falling within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;

the refractive index nd being 1.675 to 1.76; and the Abbé number νd being 51 to 58.

The optical glass of Form D is an optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 10 percent; |
| ZnO | 0 to 28 percent; |
| $ZrO_2$ | 0 to 8 percent; |
| $TaO_{2.5}$ | 0 to 10 percent; |
| $TiO_2$ | 0 to 8 percent; |
| $NbO_{2.5}$ | 0 to 8 percent; |
| $WO_3$ | 0 to 10 percent; |
| $YbO_{1.5}$ | 0 to 3 percent; |
| $GeO_2$ | 0 to 5 percent; | as well as O and F, with the F/O molar ratio of the F content to the O content being 0.01 to 0.30;

the combined sum of twice the $LiO_{0.5}$ content, the ZnO content, and ½ the F content ($2LiO_{0.5}+ZnO+(F/2)$) when the total quantity of cations is denoted as 100 being 20 percent or greater;

the value of $B_B—(B_O—B_B)$ falling within a range of −60 to 0, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;

the refractive index nd being 1.825 to 1.90; and the Abbé number vd being 35 to 43.

The first basic form of the present invention provides an optical glass characterized by having a high refractive index, low dispersion, good thermal stability, and a low glass transition temperature, that is suited to precision press molding. The second basic form of the present invention provides a quality optical glass comprising glass components in the form of B, O, and F, with little volatility in a melted state, that exhibits little variation in characteristics such as optical characteristics.

The four forms A to D of the present invention provide optical glasses that satisfy the conditions of the first and second basic forms. Thus, they exhibit the effects of the invention that are found in the first and second basic forms of the present invention, while additionally having the refractive indexes nd and Abbé numbers vd corresponding to their individual forms.

Form A of the present invention provides an optical glass having a refractive index nd of 1.75 to 1.81 and an Abbé number of 48 to 52; Form B of the present invention provides an optical glass having a refractive index nd of 1.79 to 1.835 and an Abbé number of 42 to 48; Form C of the present invention provides an optical glass having a refractive index nd of 1.675 to 1.76 and an Abbé number of 51 to 58; and Form D of the present invention provides an optical glass having a refractive index nd of 1.825 to 1.90 and an Abbé number of 35 to 43, respectively.

MODES FOR CARRYING OUT THE INVENTION

Figure 1:
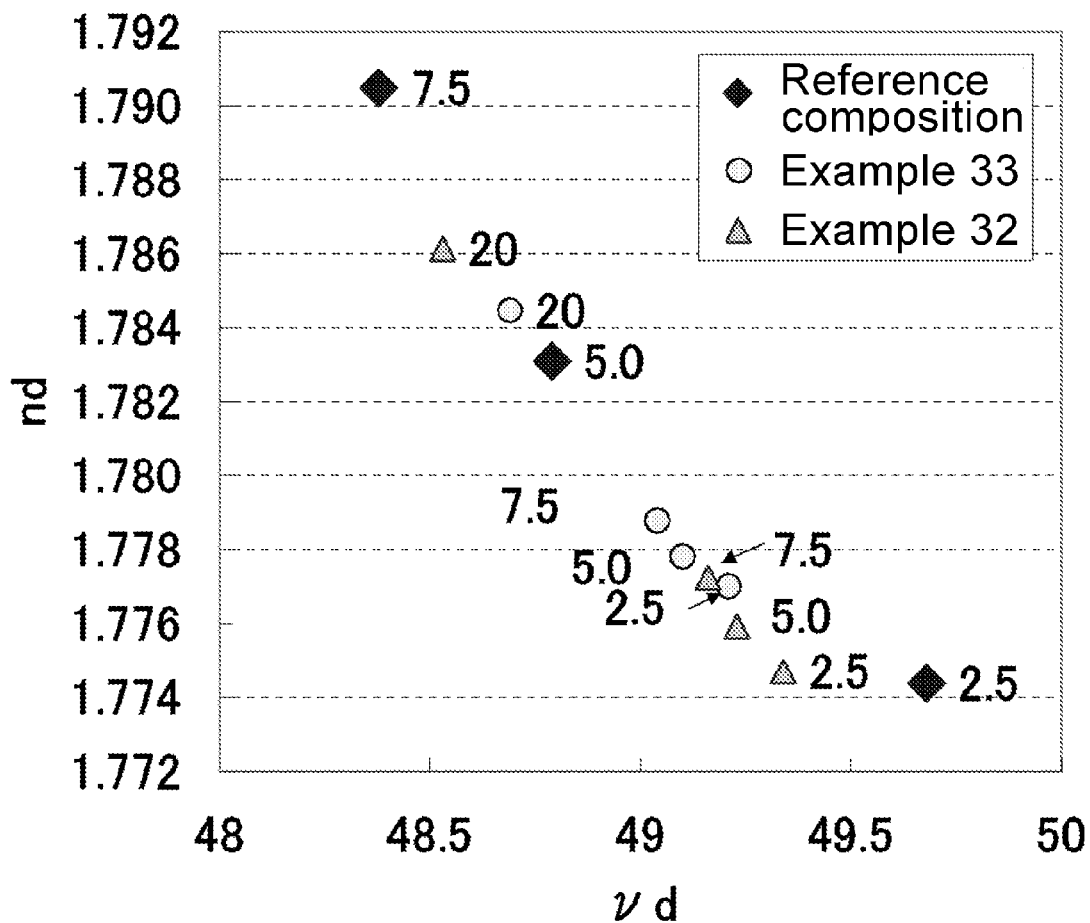
FIG. 1 The numeric values recorded near the various plots in FIG. 1 denote the melting time in unit of hours.

The optical glass of the present invention is described in greater detail below.

The optical glass of the first basic form and the optical glass of the second basic form of the present invention share the fact that they comprise the glass components of B as a cation and O and F as anions. There are thus cases where their compositions and physical properties overlap. That is, the optical glass of the first basic form can satisfy the conditions prescribed for the optical glass of the second basic form, and the optical glass of the second basic form can satisfy the conditions prescribed for the optical glass of the first basic form.

Tables 1-1 to 1-29 and 2-1 to 2-18 give desirable composition ranges and desirable characteristics for the optical glass of the first basic form. An optical glass having any combination of the composition ranges and characteristic ranges indicated in these tables is possible in the present invention.

Any optical glass optionally combining a composition range and a characteristic range given in any of Tables 1-1 to 1-29 and 2-1 to 2-18 corresponds to desirable optical glass of the second basic form.

Tables 1-1 to 1-29 and 2-1 to 2-18 record desirable composition ranges and desirable characteristics for the four forms of A to D. For Forms A to D, any combination of desirable forms of the first form and the second form is possible so long as it falls within the range of one of the forms.

As set forth above, Form A is a glass that is suited to realizing optical constants in the form of a refractive index nd of 1.75 to 1.81 and an Abbé number vd of 48 to 52.

The fact that Form A, as denoted by cationic percentages, is an optical glass comprising:

| | |
|---|---|
| $BO_{1.5}$ | 20 to 70 percent; |
| $LaO_{1.5}$ | 6 to 30 percent; |
| $GdO_{1.5}$ | 4 to 25 percent; | as well as O and F, with the F/O molar ratio of the F content to the O content being 0.01 to 0.30, is shared with optical glasses of the first basic form of the present invention. These compositions will be described further below with reference to Tables 1 and 2. Satisfying these conditions yields an optical glass having characteristics of a high refractive index and low dispersion, good thermal stability, and a low glass transition temperature that is suited to precision press molding.

Further, the fact that Form A is an optical glass comprising the glass components of cations including B and anions including O and F, and an optical glass in which the value of $B_B-(B_O-B_B)$ falls within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$, is shared with optical glasses of the second basic form of the present invention. Satisfying these conditions yields a quality optical glass comprising glass components in the form of B, O, and F, with little volatilization in a melted state, exhibiting little variation in various characteristics such as optical characteristics. However, in Form A, the upper limit of $B_B-(B_O-B_B)$ is +20. The reasons for this are as follows. In Form A, when large numbers of components with high melting points, such as rare earth components, Zr, and Ta, are included among the glass components to increase the refractive index, the liquidus temperature increases and the temperature at which the glass flows out tends to rise. Accordingly, this upper limit, an indicator of the ratio of volatilizable bonding in the present glass system, is set to inhibit volatilization of glass components at relatively high temperatures.

The fact that

| | |
|---|---|
| $SiO_2$ | 0 to 20 percent; |
| $LiO_{0.5}$ | 0 to 20 percent; |
| ZnO | 0 to 20 percent; and |
| $GeO_2$ | 0 to 5 percent | are also incorporated is shared with optical glasses of the first and second basic forms of the present invention. A description of these compositions will be given further below with reference to Tables 1 and 2.

The fact that

| | |
|---|---|
| $ZrO_2$ | 0 to 4.5 percent; |
| $TaO_{2.5}$ | 0 to 7 percent; and |
| $YbO_{1.5}$ | 0 to 0.5 percent | are incorporated differs from the optical glasses of the first and second basic forms of the present invention.

$ZrO_2$ is set to 0 to 4.5 percent because when the $ZrO_2$ content exceeds 4.5 percent, the dispersion tends to increase and the liquidus temperature tends to rise. The upper limit of the $ZrO_2$ content is desirably 3.8 percent, preferably 3.4 percent, more preferably 3 percent, still more preferably 2.7 percent, and yet more preferable upper limit is 2.5 percent.

$TaO_{2.5}$ is set to 0 to 7 percent because when the content of $TaO_{2.5}$ exceeds 7 percent, it becomes difficult to maintain desired dispersion and good stability. The upper limit of the $TaO_{2.5}$ content is desirably 5 percent or lower, preferably 4 percent or lower, more preferably 3 percent, still more preferably 2 percent, yet more preferably 1.5 percent, and even more preferably, 1.2 percent. The lower limit of the $TaO_{2.5}$ content is desirably 0.1 percent, preferably 0.3 percent, more preferably 0.5 percent, and still more preferably, 0.6 percent.

$ZrO_2$ is one of the glass starting materials that melts the most poorly and requires a high temperature for homogenization. This causes the volatilization of a large amount of fluorine in the process of melting and homogenizing the starting materials of the glass of the present invention, which include fluorine. Thus, the incorporation of large quantities of this component is undesirable from the perspective of suppressing the variation in glass characteristics that accompany volatilization.

$YbO_{1.5}$ is set to 0 to 0.5 percent because of high cost and because the incorporation of an excessive quantity increases the liquidus temperature, indirectly fostering the volatilization of glass components and compromising the homogeneity and molding characteristics of the glass. Further, this component absorbs radiation in the infrared region, rendering the glass unsuitable for use in highly sensitive optical systems of which sensitivity characteristics in the near infrared range are required, such as high-precision video cameras and surveillance cameras. In particular, the optical lens of Form A is suited to the greatest range of optical design applications among all of the forms. To permit use in these optical systems, the quantity of $YbO_{1.5}$ is desirably limited.

$(ZnO+3ZrO_2+5TaO_{2.5})$ is set to 40 percent or less to maintain low dispersion. $(2LiO_{0.5}+ZnO+(F/2))$ is set to 20 percent or more to lower the (maintain a low) glass transition temperature.

In particular, as set forth above, Form A is an optical glass having optical constants in the form of a refractive index nd of 1.75 to 1.81 and an Abbé number vd of 48 to 52. Thus, to obtain an optical glass satisfying both this refractive index nd and Abbé number vd, it suffices to divide the glass components into the following categories and adjust the contents thereof. That is, it suffices to adjust: (1) the total quantity NWF of glass forming components, such as $BO_{1.5}$, $SiO_2$, and $AlO_{1.5}$, an increase in the content of which has the effect of reducing the refractive index and increasing the Abbé number; (2) the total quantity Σ(SIGMA)RE of rare earth components, such as $LaO_{1.5}$, $GdO_{1.5}$, and $YO_{1.5}$, an increase in the content of which has the effect of increasing the refractive index and slightly reducing the Abbé number, thereby increasing the refractive index and lowering the dispersion of the glass; (3) the total quantity $(ZrO_2+TaO_{2.5})$ of components, such as $ZrO_2$ and $TaO_{2.5}$, an increase in the content of which has the effect of greatly increasing the refractive index and slightly reducing the Abbé number; (4) the total quantity of high refractive index, high dispersion elements, such as $TiO_2$, $NbO_{2.5}$, $WO_3$, and $BiO_{1.5}$, an increase in the content of which has the effect of greatly increasing the refractive index and greatly reducing the Abbé number; (5) the total quantity of monovalent and divalent components, such as $LiO_{0.5}$ and ZnO, an increase in the content of which has the effects of lowering the melting temperature of the glass starting materials, enhancing the stability of the glass, lowering the liquidus temperature, lowering the glass transition temperature, and the like; and (6) the total quantity of components other than those listed above. Among these, the adjustment of (1) to (4) above is effective for adjusting optical characteristics.

Specifically, the following applies for important components (1) to (3) of the present invention. The upper limit of (1) NWF is desirably 63 percent, preferably 60 percent, more preferably 58 percent, still more preferably 57 percent, still more preferably 56 percent, still more preferably 55 percent, and yet more preferably, 54 percent. Additionally, the lower limit of NWF is desirably 41 percent, preferably 44 percent, more preferably 46 percent, still more preferably 47 percent, still more preferably 48 percent, still more preferably 49 percent, and yet more preferably, 50 percent. The upper limit of (2) ΣRE is desirably 38 percent, preferably 36 percent, more preferably 35 percent, still more preferably 34 percent, still more preferably 33 percent, still more preferably 32 percent, and yet more preferably, 31 percent. Additionally, the lower limit of ΣRE is desirably 20 percent, preferably 22 percent, more preferably 23 percent, still more preferably 24 percent, still more preferably 25 percent, still more preferably 26 percent, and yet more preferably, 27 percent. The upper limit of (3) ($ZrO_2+TaO_{2.5}$) is desirably 8 percent, preferably 7 percent, more preferably 6 percent, still more preferably 5 percent, still more preferably 4.5 percent, still more preferably 4 percent, and yet more preferably, 3.5 percent. Additionally, the lower limit of ($ZrO_2+TaO_{2.5}$) is desirably 0 percent, preferably 1 percent, more preferably 2 percent, still more preferably 2.5 percent, and yet more preferably, 3 percent.

The quantities of $\Sigma RE$ and NWF can be adjusted by referencing the ratio of $\Sigma RE$ and NWF, namely, $\Sigma RE/NWF$. The upper limit of $\Sigma RE/NWF$ is desirably 0.9, preferably 0.85, still more preferably 0.80, still more preferably 0.75, still more preferably 0.70, still more preferably 0.65, and yet more preferably, 0.60. Additionally, the lower limit of $\Sigma RE/NWF$ is desirably 0.50, preferably 0.45, more preferably 0.40, still more preferably 0.35, and yet more preferably, 0.30.

Additional conditions are as follows. To lower the liquidus temperature by mixing rare earth components, thereby raising (maintaining) the stability of a glass with relatively good optical characteristics, it is desirable to pay attention to the ratio of $LaO_{1.5}$ to the total quantity of rare earth elements $\Sigma RE$, namely $LaO_{1.5}/\Sigma RE$. In Form A, which has the above-described desirable component structure, the upper limit of $LaO_{1.5}/\Sigma RE$ is desirably 0.75, preferably 0.7, more preferably 0.65, still more preferably 0.6, still more preferably 0.57, still more preferably 0.55, still more preferably 0.53, and yet more preferably, 0.52. Additionally, the lower limit of $LaO_{1.5}/\Sigma RE$ is desirably 0.30, preferably 0.4, more preferably 0.45, still more preferably 0.48, and yet more preferably, 0.49.

In particular, in Form A, in addition to essential rare earth components, it is desirable to preferentially incorporate Zr and Ta from among the high refractive index and high dispersion elements of Zr, Ta, Ti, Nb, W, and Bi. It is preferable to preferentially employ Zr over Ta to achieve both a high refractive index and low dispersion. Thus, optimization of the quantity of Zr incorporated in Form A is extremely effective for enhancing the optical characteristics and molding properties of the glass.

$TiO_2$ and $NbO_{2.5}$ can be further incorporated into Form A as optional components. $TiO_2$ and $NbO_{2.5}$ function to increase the refractive index while maintaining low dispersion. However, since they also increase dispersion, $TiO_2$ is set to 0 to 3 percent and $NbO_{2.5}$ to 0 to 3 percent.

Other high refractive index and high dispersion components can be incorporated to the extent that the effect of the present invention is not spoiled. The upper limit of the total quantity of high refractive index and high dispersion components such as $TiO_2$, $NbO_{2.5}$, $WO_3$, and $BiO_{1.5}$ is desirably 6 percent, preferably 5 percent, more preferably 4 percent, still more preferably 3 percent, still more preferably 2 percent, and yet more preferably, 1 percent. Optimally, they are not incorporated at all.

The incorporation of 2 percent or more of $SiO_2$ and maintenance of the ratio ($SiO_2/BO_{1.5}$) at 0.10 or higher are desirable in Form A. This makes it possible to increase the viscosity of the glass melt and enhances the inhibition of striae during molding.

The refractive index nd and the Abbé number vd in Form A desirably satisfy equation (1) below. The relation between the refractive index nd and the Abbé number vd is described further below.

$$nd-(2.25-0.01\times vd) \geq -0.01 \quad (1)$$

Form B is a glass suited to realizing optical constants in the form of a refractive index nd of 1.79 to 1.835 and an Abbé number vd of 42 to 48.

The facts that Form B is an optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; | as well as O and F, and that the F/O molar ratio of the F content to the O content is 0.01 to 0.30, are shared with optical glass of the first basic form of the present invention. A description of these compositions will be given further below with reference to Tables 1 and 2. Satisfying these conditions yields an optical glass having high refractive index and low dispersion characteristics, good thermal stability, and a low glass transition temperature, that is suited to precision press molding.

The fact that Form B is an optical glass comprising glass components in the form of cations including B and anions including O and F, such that the value of $B_B$—($B_O$—$B_B$) falls within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$, is shared with the optical glass of the second basic form of the present invention. Satisfying these conditions yields a quality optical glass containing glass components in the form of B, O, and F, that undergoes little volatilization in a melted state and exhibits little variation in various characteristics such as optical characteristics. However, in Form B, the upper limit of $B_B$—($B_O$—$B_B$) is +20. The reason for this is as follows. To raise the refractive index of Form B relative to that of Form C, large quantities of components with high melting points, such as rare earth elements, Zr, and Ta, are included among the glass components. This increases the liquidus temperature, and causes the temperature at which the glass flows out to increase. Accordingly, an upper limit, indicating the ratio of volatilizable bonding in the glass system, is set to inhibit volatilization of glass components at relatively high temperatures.

The fact of comprising

| | |
|---|---|
| $SiO_2$ | 0 to 20 percent; |
| $LiO_{0.5}$ | 0 to 20 percent; and |
| $GeO_2$ | 0 to 5 percent | is also shared with the optical glasses of the first and second basic forms of the present invention. The compositions thereof will be described further below with reference to Tables 1 and 2.

The fact of comprising

| | |
|---|---|
| ZnO | 0 to 25 percent; |
| $ZrO_2$ | 8 percent or less; |
| $TaO_{2.5}$ | 7 percent or less; and |
| $YbO_{1.5}$ | 0 to 3 percent | is a difference with the optical glasses of the first and second basic forms of the present invention.

ZnO is set to 0 to 25 percent because although the introduction of a large quantity of ZnO increases the refractive index somewhat in terms of optical characteristics, there is a problem in that dispersion increases (vd decreases). However, the object of Form B is to obtain a glass having a higher refractive index and a greater dispersion range than Form A, namely nd=1.79 to 1.835 and vd=42 to 48. Thus, the content permitted is greater than in the glass of Form A.

Both $ZrO_2$ and $TaO_{2.5}$ are components that raise the refractive index. The incorporation of suitable quantities thereof stabilizes the glass, lowers the liquidus temperature, and increases the viscosity of the glass melt. The quantity of $ZrO_2$ is set to 8 percent or less because when the content of $ZrO_2$ exceeds 8 percent, the liquidus temperature tends to increase. The upper limit of the $ZrO_2$ content is desirably 7 percent, preferably 6 percent, more preferably 5 percent, still more preferably 4.5 percent, and yet more preferably, 4 percent. The lower limit of the $ZrO_2$ content is desirably 0.5 percent, preferably 1 percent, and more preferably, 1.5 percent.

$TaO_{2.5}$ is set to 7 percent or less because when the content of $TaO_{2.5}$ exceeds 7 percent, it becomes difficult to maintain the desired dispersion and good stability. The upper limit of the $TaO_{2.5}$ content is desirably 6 percent or less, preferably 5 percent. The lower limit of the $TaO_{2.5}$ content is desirably 0.1 percent, preferably 0.3 percent, more preferably 0.5 percent, still more preferably 0.6 percent, still more preferably 1 percent, still more preferably 1.5 percent, still more preferably 1.8 percent, and yet more preferably, 2 percent.

$YbO_{1.5}$ is set to 0 to 3 percent because of high cost and because the introduction of an excessive quantity increases the liquidus temperature, indirectly fostering volatilization of glass components and compromising the homogeneity and molding properties of the glass. Further, this component absorbs radiation in the infrared region, rendering the glass unsuitable for use in highly sensitive optical systems of which sensitivity characteristics in the near infrared range are required, such as high-precision video cameras and surveillance cameras. However, since the glass of Form B has a high refractive index, it can be effectively limited to applications such as compact digital cameras that do not receive light in the infrared range. Thus, $YbO_{1.5}$ can be incorporated to an upper limit of 3 percent.

$(ZrO_2/(ZrO_2+TaO_{2.5}))$ is limited to from 0 to 0.7 to optimize the distribution of Zr and Ta employed in Form B and lower the liquidus temperature, thereby yielding a highly stable glass. $(ZrO_2+TaO_{2.5})$ is set to 3 to 10 to achieve a higher refractive index by using more Zr and Ta than in Form A. The total quantity of $(2LiO_{0.5}+ZnO+(F/2))$ is set to 20 percent or more to lower the (keep a low) glass transition temperature.

To further improve the stability of the glass and lower the liquidus temperature in Form B, $(ZrO_2/(ZrO_2+TaO_{2.5}))$ is desirably limited to 0.7 or lower. From the perspectives of improving the stability of the glass and lowering the liquidus temperature, the upper limit of $(ZrO_2/(ZrO_2+TaO_{2.5}))$ is desirably 0.6, preferably 0.55, more preferably 0.50, and still more preferably, 0.45.

The lower limit of $(ZrO_2/(ZrO_2+TaO_{2.5}))$ is desirably 0.00, preferably 0.10, more preferably 0.20, still more preferably 0.25, still more preferably 0.30, and yet more preferably, 0.35.

Instead of the above indicators, in glasses containing $TaO_{2.5}$, $(ZrO_2/TaO_{2.5})$ is desirably limited to 2.5 or lower. From the perspectives of improving glass stability and lowering the liquidus temperature, the upper limit of $(ZrO_2/TaO_{2.5})$ is desirably 1.8, preferably 1.6, more preferably 1.4, still more preferably 1.3, still more preferably 1.2, and yet more preferably, 1.1. The lower limit of $(ZrO_2+TaO_{2.5})$ is desirably 0.1, preferably 0.2, more preferably 0.3, still more preferably 0.4, and yet more preferably, 0.5.

In particular, as set forth above, since Form B is an optical glass having optical constants in the form of a refractive index nd of 1.79 to 1.835 and an Abbé number vd of 42 to 48, to achieve an optical glass achieving both this refractive index nd and Abbé number vd, it suffices to classify the glass components as follows in the same manner as in Form A and adjust their contents. That is, it suffices to adjust: (1) the total quantity NWF of glass forming components, such as $BO_{1.5}$, $SiO_2$, and $AlO_{1.5}$, an increase in the content of which has the effect of reducing the refractive index and increasing the Abbé number; (2) the total quantity ΣRE of rare earth components, such as $LaO_{1.5}$, $GdO_{1.5}$, and $YO_{1.5}$, an increase in the content of which has the effect of increasing the refractive index and slightly reducing the Abbé number, thereby increasing the refractive index and lowering the dispersion of the glass; (3) the total quantity $(ZrO_2+TaO_{2.5})$ of components, such as $ZrO_2$ and $TaO_{2.5}$, an increase in the content of which has the effect of greatly increasing the refractive index and slightly reducing the Abbé number; (4) the total quantity of high refractive index, high dispersion elements, such as $TiO_2$, $NbO_{2.5}$, $WO_3$, and $BiO_{1.5}$, an increase in the content of which has the effect of greatly increasing the refractive index and greatly reducing the Abbé number; (5) the total quantity of monovalent and divalent components, such as $LiO_{0.5}$ and ZnO, an increase in the content of which has the effects of lowering the melting temperature of the glass starting materials, enhancing the stability of the glass, lowering the liquidus temperature, lowering the glass transition temperature, and the like; and (6) the total quantity of components other than those listed above. Among these, the adjustment of (1) to (4) above is effective for adjusting optical characteristics.

Specifically, the following applies for important components (1) to (3) of the present invention. The upper limit of (1) NWF is desirably 60 percent, preferably 57 percent, more preferably 55 percent, still more preferably 54 percent, still more preferably 53 percent, still more preferably 52 percent, and yet more preferably, 51 percent. Additionally, the lower limit of NWF is desirably 35 percent, preferably 38 percent, more preferably 40 percent, still more preferably 41 percent, still more preferably 42 percent, still more preferably 43 percent, and yet more preferably, 44 percent. The upper limit of (2) ΣRE is desirably 42 percent, preferably 40 percent, more preferably 38 percent, still more preferably 37 percent, still more preferably 36 percent, still more preferably 35 percent, and yet more preferably, 34 percent. Additionally, the lower limit of ΣRE is desirably 20 percent, preferably 22 percent, more preferably 23 percent, still more preferably 25 percent, still more preferably 27 percent, still more preferably 28 percent, still more preferably 29 percent, and yet more preferably, 30 percent. The upper limit of (3) $(ZrO_2+TaO_{2.5})$ is desirably 10 percent, preferably 9 percent, more preferably 8 percent, still more preferably 7.5 percent, still more preferably 7 percent, still more preferably 6.5 percent, and yet more preferably, 6 percent. Additionally, the lower limit of $(ZrO_2+TaO_{2.5})$ is desirably 3 percent, preferably 3.5 percent, more preferably 4.0 percent, still more preferably 4.5 percent, and yet more preferably, 5.0 percent.

The quantities of ΣRE and NWF can be adjusted by referencing the ratio of ΣRE and NWF, namely, ΣRE/NWF. The upper limit of ΣRE/NWF is desirably 1.2, preferably 1.1, more preferably 1.0, still more preferably 0.95, still more preferably 0.9, still more preferably 0.85, and yet more preferably, 0.8. Additionally, the lower limit of ΣRE/NWF is desirably 0.35, preferably 0.40, more preferably 0.45, more preferably 0.50, still more preferably 0.55, still more preferably 0.60, and yet more preferably, 0.65.

Additional conditions are as follows. To lower the liquidus temperature by mixing rare earth components, thereby raising (maintaining) the stability of a glass with relatively good optical characteristics, it is desirable to pay attention to the ratio of $LaO_{1.5}$ to the total quantity of rare earth elements $\Sigma RE$, namely $LaO_{1.5}/\Sigma RE$. In Form B, which has the above-described desirable component structure into which suitable quantities of Zr and Ta have been introduced in this manner, a ratio in which a large amount of La is employed is effective. That is, the upper limit of $LaO_{1.5}/\Sigma RE$ is desirably 0.8, preferably 0.75, more preferably 0.70, still more preferably 0.67, still more preferably 0.65, still more preferably 0.63, and yet more preferably, 0.62. Additionally, the lower limit of $LaO_{1.5}/\Sigma RE$ is desirably 0.30, preferably 0.4, more preferably 0.45, still more preferably 0.5, still more preferably 0.55, still more preferably 0.58, and yet more preferably, 0.59.

In particular, in Form B, in addition to essential rare earth components, it is desirable to preferentially incorporate Zr and Ta from among the high refractive index and high dispersion elements of Zr, Ta, Ti, Nb, W, and Bi. It is desirable to incorporate an optimal quantity of Zr while optimizing the content of Ta to achieve a higher refractive index and higher dispersion than in Form A. Thus, optimization of the quantities and ratio of Ta and Zr incorporated in Form B is extremely effective for enhancing the optical characteristics and molding properties of the glass.

$TiO_2$ and $NbO_{2.5}$ can be further incorporated into Form B as optional components. $TiO_2$ and $NbO_{2.5}$ function to increase the refractive index while maintaining low dispersion. However, since they also increase dispersion, $TiO_2$ is set to 0 to 3 percent and $NbO_{2.5}$ to 0 to 3 percent.

Other high refractive index and high dispersion components can be incorporated to the extent that the effect of the present invention is not spoiled. The upper limit of the total quantity $(TiO_2+NbO_{2.5}+WO_3+BiO_{1.5})$ of high refractive index and high dispersion components such as $TiO_2$, $NbO_{2.5}$, $WO_3$, and $BiO_{1.5}$ is desirably 8 percent, preferably 6 percent, more preferably 5 percent, still more preferably 4 percent, still more preferably 3 percent, still more preferably 2 percent, and yet more preferably, 1 percent. Optimally, to achieve low dispersion, they are not incorporated at all.

In Form B, it is desirable for $(2LiO_{0.5}+ZnO+(F/2))$ to constitute 20 percent or more to lower the glass transition temperature.

In the optical glass of Form B, the refractive index nd and the Abbé number vd desirably satisfy equation (2) below. The relation between the refractive index nd and the Abbé number vd is described further below.

$$nd-(2.25-0.01\times vd) \geq -0.01 \qquad (2)$$

Form C is a glass that is suited to realizing optical constants in the form of a refractive index nd of 1.675 to 1.76 and an Abbé number vd of 51 to 58.

The fact that Form C, as denoted by cationic percentages, is an optical glass comprising:

| | |
|---|---|
| $BO_{1.5}$ | 20 to 70 percent; |
| $LaO_{1.5}$ | 6 to 30 percent; |
| $GdO_{1.5}$ | 4 to 25 percent; | as well as O and F, with the F/O molar ratio of the F content to the O content being 0.01 to 0.30, is shared with optical glasses of the first basic form of the present invention. These compositions will be described further below with reference to Tables 1 and 2. Satisfying these conditions yields an optical glass characterized by a high refractive index, low dispersion, good thermal stability, and a low glass transition temperature, that is suited to precision press molding.

Further, the fact that Form C is an optical glass comprising the glass components of cations including B and anions including O and F, and an optical glass in which the value of $B_B—(B_O—B_B)$ falls within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$, is shared with optical glasses of the second basic form of the present invention. Satisfying these conditions yields a quality optical glass comprising glass components in the form of B, O, and F, with little volatilization in a melted state, exhibiting little variation in various characteristics such as optical characteristics.

The fact that

| | |
|---|---|
| $SiO_2$ | 0 to 20 percent; |
| $LiO_{0.5}$ | 0 to 20 percent; and |
| $GeO_2$ | 0 to 5 percent | are also incorporated is shared with optical glasses of the first and second basic forms of the present invention. A description of these compositions will be given further below with reference to Tables 1 and 2.

The fact that

| | |
|---|---|
| $ZrO_2$ | 5 percent or less; |
| $TaO_{2.5}$ | 3 percent or less; and |
| $YbO_{1.5}$ | 0 to 3 percent | are incorporated differs from the optical glasses of the first and second basic forms of the present invention.

ZnO is set to 0 to 15 percent because when the ZnO content exceeds 15 percent, dispersion tends to increase, stability decreases, and the liquidus viscosity tends to diminish. The upper limit of the ZnO content is desirably 15 percent, preferably 10 percent, more preferably 8 percent, still more preferably 6 percent, still more preferably 4 percent, still more preferably 3 percent, and yet more preferably, 2 percent. The lower limit of the ZnO content is desirably 0 percent, preferably 0.5 percent, and more preferably, 1 percent. Thus, $2LiO_{0.5}/(2LiO_{0.5}+ZnO)$, which serves as a yardstick in the adjustment of components lowering the Tg, naturally assumes a somewhat high value. That is, the lower limit of $2LiO_{0.5}/(2LiO_{0.5}+ZnO)$ is desirably 0.65, preferably 0.7, more preferably 0.75, still more preferably 0.8, still more preferably 0.85, still more preferably 0.9, yet more preferably 0.95 and particularly preferably, 1.00.

$ZrO_2$ is set to 5 percent or less because when the $ZrO_2$ content exceeds 5 percent, dispersion tends to increase and the liquidus temperature tends to rise. The upper limit of the $ZrO_2$ content is desirably 5 percent, preferably 4 percent, more preferably 3 percent, still more preferably 2.5 percent, still more preferably 2 percent, still more preferably 1.5 percent, still more preferably 1 percent, and yet more preferably 0.5 percent. Optimally, no $ZrO_2$ is incorporated at all.

$TaO_{2.5}$ is set to 3 percent or less because when the content of $TaO_{2.5}$ exceeds 3 percent, it becomes difficult to maintain desired dispersion and good stability, and the cost of the starting materials increases. The upper limit of the $TaO_{2.5}$ content is desirably 3 percent or lower, preferably 2 percent, more preferably 1 percent, and yet more preferably, 0.5 percent. Optimally, no $TaO_2$ is incorporated at all.

$YbO_{1.5}$ is set to 0 to 3 percent because of high cost. Further, this component absorbs radiation in the infrared region, rendering the glass unsuitable for use in highly sensitive optical systems of which sensitivity characteristics in the near infrared range are required, such as high-precision video cameras and surveillance cameras. In particular, the optical glass of Form C can be of lower dispersion than that of Form A and the low dispersion of $YBO_{1.5}$ can be utilized to prepare a low-dispersion glass in which, for example, vd=55 or higher. Thus, $YbO_{1.5}$ can be incorporated up to a maximum of 3 percent.

In particular, as set forth above, Form C is an optical glass having optical constants in the form of a refractive index nd of 1.675 to 1.76 and an Abbé number vd of 51 to 58. Thus, to obtain an optical glass satisfying both this refractive index nd and Abbé number vd, it suffices to divide the glass components into the following categories in the same manner as in Form A and adjust the contents thereof. That is, it suffices to adjust: (1) the total quantity NWF of glass forming components, such as $BO_{1.5}$, $SiO_2$, and $AlO_{1.5}$, an increase in the content of which has the effect of reducing the refractive index and increasing the Abbé number; (2) the total quantity ΣRE of rare earth components, such as $LaO_{1.5}$, $GdO_{1.5}$, and $YO_{1.5}$, an increase in the content of which has the effect of increasing the refractive index and slightly reducing the Abbé number, thereby increasing the refractive index and lowering the dispersion of the glass; (3) the total quantity ($ZrO_2$+$TaO_{2.5}$) of components, such as $ZrO_2$ and $TaO_{2.5}$, an increase in the content of which has the effect of greatly increasing the refractive index and slightly reducing the Abbé number; (4) the total quantity of high refractive index, high dispersion elements, such as $TiO_2$, $NbO_{2.5}$, $WO_3$, and $BiO_{1.5}$, an increase in the content of which has the effect of greatly increasing the refractive index and greatly reducing the Abbé number; (5) the total quantity of monovalent and divalent components, such as $LiO_{0.5}$ and ZnO, an increase in the content of which has the effects of lowering the melting temperature of the glass starting materials, enhancing the stability of the glass, lowering the liquidus temperature, lowering the glass transition temperature, and the like; and (6) the total quantity of components other than those listed above. Among these, the adjustment of (1) to (4) above is effective for adjusting optical characteristics.

Specifically, the following applies for important components (1) to (3) of the present invention. The upper limit of (1) NWF is desirably 75 percent, preferably 72 percent, more preferably 70 percent, still more preferably 68 percent, still more preferably 66 percent, still more preferably 64 percent, and yet more preferably, 62 percent. Additionally, the lower limit of NWF is desirably 48 percent, preferably 50 percent, more preferably 52 percent, still more preferably 53 percent, still more preferably 54 percent, still more preferably 55 percent, and yet more preferably, 56 percent. The upper limit of (2) ΣRE is desirably 35 percent, preferably 34 percent, more preferably 33 percent, still more preferably 32 percent, still more preferably 31 percent, still more preferably 30 percent, and yet more preferably, 29 percent. Additionally, the lower limit of ΣRE is desirably 14 percent, preferably 16 percent, more preferably 17 percent, still more preferably 18 percent, still more preferably 20 percent, still more preferably 22 percent, still more preferably 23 percent, and yet more preferably, 24 percent. The upper limit of (3) ($ZrO_2$+$TaO_{2.5}$) is desirably 5 percent, preferably 4 percent, more preferably 3.5 percent, still more preferably 3 percent, still more preferably 2.5 percent, still more preferably 2 percent, still more preferably 1.5 percent, still more preferably 1 percent, and yet more preferably, 0.5 percent. Optimally, ($ZrO_2$+$TaO_{2.5}$) constitutes 0 percent.

The quantities of ΣRE and NWF can be adjusted by referencing the ratio of ΣRE and NWF, namely, ΣRE/NWF. The upper limit of ΣRE/NWF is desirably 0.8, preferably 0.75, more preferably 0.70, still more preferably 0.65, still more preferably 0.60, still more preferably 0.55, and yet more preferably, 0.50. Additionally, the lower limit of ΣRE/NWF is desirably 0.15, preferably 0.20, more preferably 0.25, still more preferably 0.30, still more preferably 0.35, still more preferably 0.40, and yet more preferably, 0.45.

Additional conditions are as follows. To lower the liquidus temperature by mixing rare earth components, thereby raising (maintaining) the stability of a glass with relatively good optical characteristics, it is desirable to pay attention to the ratio of $LaO_{1.5}$ to the total quantity of rare earth elements ΣRE, namely $LaO_{1.5}$/ΣRE. In Form C, which permits a total quantity of ΣRE that is smaller than that in Form A by limiting the quantities of Zr and Ta incorporated as set forth above, $LaO_{1.5}$/ΣRE assumes a wide range of values. That is, the upper limit of $LaO_{1.5}$/ΣRE is desirably 0.9, preferably 0.80, more preferably 0.70, still more preferably 0.60, still more preferably 0.57, and yet more preferably, 0.55. Additionally, the lower limit of $LaO_{1.5}$/ΣRE is desirably 0.30, preferably 0.4, more preferably 0.45, and yet more preferably, 0.48. In glasses in which the total amount of ΣRE is 20 or lower, $LaO_{1.5}$/ΣRE can be kept to 0.80 or higher.

In particular, in Form C, in addition to essential rare earth components, it is desirable to achieve a lower refractive index and lower dispersion than in Form A by not incorporating large amounts of the high refractive index and high dispersion components of Zr, Ta, Ti, Nb, W, and Bi. Limiting the quantities of Ta and Zr that are incorporated in Form C is extremely effective for enhancing the optical characteristics and molding properties of the glass.

$TiO_2$ and $NbO_{2.5}$ can be further incorporated into Form C as optional components. $TiO_2$ and $NbO_{2.5}$ function to increase the refractive index while maintaining low dispersion. However, since they also increase dispersion, $TiO_2$ is set to 0 to 2 percent and $NbO_{2.5}$ to 0 to 3 percent.

Other high refractive index and high dispersion components can be incorporated to the extent that the effect of the present invention is not spoiled. The upper limit of the total quantity ($TiO_2$+$NbO_{2.5}$+$WO_3$+$BiO_{1.5}$) of high refractive index and high dispersion components such as $TiO_2$, $NbO_{2.5}$, $WO_3$, and $BiO_{1.5}$ is desirably 4 percent, preferably 3 percent, still more preferably 2 percent, and yet more preferably, 1 percent. Optimally, none of these components is incorporated at all.

(ZnO+3$ZrO_2$+5$TaO_{2.5}$) is set to 15 percent or less to maintain low dispersion.

(2$LiO_{0.5}$+ZnO+(F/2)) is set to 25 percent or more because the ratio of NWF in Form C is greater than in Form A and the glass transition point (Tg) tends to be high. The increase in the quantity of these Tg-lowering components yields a lower glass transition temperature.

To achieve lower dispersion in Form C than in Forms A, B, and D, the ratio of NWF to ΣRE is greater, and a large quantity of $BO_{1.5}$ is incorporated. Thus, the upper limit of $B_B$—($B_O$—$B_B$) of +60 is a greater value than in Forms A, B, and D. As a result, by keeping F/O, which denotes the content of F, an element contributing to volatilization, to 0.21 or lower, it is possible to compensate for the reduction in the volatilization-inhibiting effect due to a high upper limit of $B_B-(B_O-B_B)$.

In the optical glass of Form C, the refractive index nd and the Abbé number vd desirably satisfy equation (3) below. The relation between the refractive index nd and the Abbé number vd is described further below.

$$nd-(2.25-0.01\times vd)\geq -0.01 \quad (3)$$

Form D is a glass suited to realizing optical constants in the form of a refractive index nd of 1.825 to 1.90 and an Abbé number vd of 35 to 43.

The facts that Form D is an optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; | as well as O and F, and that the F/O molar ratio of the F content to the O content is 0.01 to 0.30, are shared with the optical glass of the first basic form of the present invention. A description of these compositions will be given further below with reference to Tables 1 and 2. Satisfying these conditions yields an optical glass with high refractive index and low dispersion characteristics, good thermal stability, and a low glass transition temperature, that is suited to precision press molding.

The fact that Form D is an optical glass comprising glass components in the form of cations including B and anions including 0 and F, such that the value of $B_B-(B_O-B_B)$ falls within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$, is shared with the optical glass of the second basic form of the present invention. Satisfying these conditions yields a quality optical glass containing glass components in the form of B, O, and F, that undergoes little volatilization in a melted state and exhibits little variation in various characteristics such as optical characteristics. However, in Form D the upper limit of $B_B-(B_O-B_B)$ is 0. The reason for this is as follows. To raise the refractive index of Form D higher than in Forms A, B, and C, large quantities of components with high melting points, such as rare earth elements, Zr, and Ta, are included among the glass components. This increases the liquidus temperature, making it necessary to reduce NWF components that lower the refractive index. Thus, the liquidus temperature increases, and the temperature at which the glass flows out tends to rise. Accordingly, to inhibit the volatilization of glass components at this higher temperature, the value of the upper limit, indicating the ratio of volatilizable bonding in the glass system, is strictly limited.

The fact of comprising

| | |
|---|---|
| $SiO_2$ | 0 to 20 percent; |
| $ZrO_2$ | 0 to 8 percent; |
| $TaO_{2.5}$ | 0 to 10 percent; |
| $TiO_2$ | 0 to 8 percent; |
| $NbO_{2.5}$ | 0 to 8 percent; |
| $WO_3$ | 0 to 10 percent; and |
| $GeO_2$ | 0 to 5 percent | is also shared with the optical glasses of the first and second basic forms of the present invention. The compositions thereof will be described further below with reference to Tables 1 and 2.

The quantity of $ZrO_2$ is set to 8 percent or less because when the content of $ZrO_2$ exceeds 8 percent, dispersion and the liquidus temperature tend to increase. The upper limit of the $ZrO_2$ content is desirably 6 percent, preferably 5 percent, more preferably 4 percent, still more preferably 3.5 percent, and yet more preferably, 3 percent. The lower limit of the $ZrO_2$ content is desirably 0 percent, preferably 0.5 percent, more preferably 1 percent, still more preferably 1.5 percent, and yet more preferably, 2 percent.

The content of $TaO_{2.5}$ is limited to 10 percent or less because when the content of $TaO_{2.5}$ exceeds 10 percent, it becomes difficult to maintain the desired dispersion and good stability. The upper limit of the $TaO_{2.5}$ content is desirably 9 percent, preferably 8 percent, more preferably 7 percent, and still more preferably, 6 percent. The lower limit of the $TaO_{2.5}$ content is desirably 1 percent, preferably 2 percent, more preferably 3 percent, still more preferably 4 percent, and yet more preferably, 4.5 percent.

In particular, as set forth above, since Form D is an optical glass having optical constants in the form of a refractive index nd of 1.825 to 1.90 and an Abbé number vd of 35 to 43, to achieve an optical glass achieving both this refractive index nd and Abbé number vd, it suffices to classify the glass components as follows in the same manner as in Form A and adjust their contents. That is, it suffices to adjust: (1) the total quantity NWF of glass forming components, such as $BO_{1.5}$, $SiO_2$, and $AlO_{1.5}$, an increase in the content of which has the effect of reducing the refractive index and increasing the Abbé number; (2) the total quantity ΣRE of rare earth components, such as $LaO_{1.5}$, $GdO_{1.5}$, and $YO_{1.5}$, an increase in the content of which has the effect of increasing the refractive index and slightly reducing the Abbé number, thereby increasing the refractive index and lowering the dispersion of the glass; (3) the total quantity ($ZrO_2+TaO_{2.5}$) of components, such as $ZrO_2$ and $TaO_{2.5}$, an increase in the content of which has the effect of greatly increasing the refractive index and slightly reducing the Abbé number; (4) the total quantity of high refractive index, high dispersion elements, such as $TiO_2$, $NbO_{2.5}$, $WO_3$, and $BiO_{1.5}$, an increase in the content of which has the effect of greatly increasing the refractive index and greatly reducing the Abbé number; (5) the total quantity of monovalent and divalent components, such as $LiO_{0.5}$ and ZnO, an increase in the content of which has the effects of lowering the melting temperature of the glass starting materials, enhancing the stability of the glass, lowering the liquidus temperature, lowering the glass transition temperature, and the like; and (6) the total quantity of components other than those listed above. Among these, the adjustment of (1) to (4) above is effective for adjusting optical characteristics.

Specifically, the following applies for important components (1) to (3) of the present invention. The upper limit of (1) NWF is desirably 49 percent, preferably 46 percent, more preferably 44 percent, still more preferably 43 percent, still more preferably 42 percent, still more preferably 41 percent, and yet more preferably, 40 percent. Additionally, the lower limit of NWF is desirably 32 percent, preferably 33 percent, more preferably 34 percent, still more preferably 35 percent, still more preferably 36 percent, and yet more preferably, 37 percent. The upper limit of (2) ΣRE is desirably 36 percent, preferably 35 percent, more preferably 34 percent, still more preferably 33 percent, still more preferably 32 percent, still more preferably 31 percent, and yet more preferably, 30 percent. Additionally, the lower limit of ΣRE is desirably 21 percent, preferably 22 percent, more preferably 23 percent, still more preferably 24 percent, still more preferably 25 percent, and yet more preferably, 26 percent. The upper limit of (3) ($ZrO_2+TaO_{2.5}$) is desirably 12 percent, preferably 11 percent, more preferably 10 percent, still more preferably 9.5 percent, still more preferably 9 percent, still more preferably 8.5 percent, and yet more preferably, 8 percent. Additionally, the lower limit of ($ZrO_2+TaO_{2.5}$) is desirably 3 percent, preferably 4 percent, more preferably 5 percent, still more preferably 5.5 percent, still more preferably 6 percent, still more preferably 6.5 percent, and yet more preferably, 7 percent.

The quantities of $\Sigma RE$ and NWF can be adjusted by referencing the ratio of $\Sigma RE$ and NWF, namely, $\Sigma RE/NWF$. The upper limit of $\Sigma RE/NWF$ is desirably 1.2, preferably 1.1, more preferably 1.0, still more preferably 0.95, still more preferably 0.9, still more preferably 0.85, and yet more preferably, 0.8. Additionally, the lower limit of $\Sigma RE/NWF$ is desirably 0.45, preferably 0.50, more preferably 0.55, still more preferably 0.60, still more preferably 0.65, and yet more preferably, 0.70.

Additional conditions are as follows. To lower the liquidus temperature by mixing rare earth components, thereby raising (maintaining) the stability of a glass with relatively good optical characteristics, it is desirable to pay attention to the ratio of $LaO_{1.5}$ to the total quantity of rare earth elements $\Sigma RE$, namely $LaO_{1.5}/\Sigma RE$. In Form D, which has the above-described desirable component structure into which suitable quantities of Zr and Ta have been introduced in this manner, a ratio in which a large amount of La is employed is effective. That is, the upper limit of $LaO_{1.5}/\Sigma RE$ is desirably 0.9, preferably 0.85, more preferably 0.8, still more preferably 0.77, and yet more preferably, 0.75. Additionally, the lower limit of $LaO_{1.5}/\Sigma RE$ is desirably 0.5, preferably 0.55, still more preferably 0.60, still more preferably 0.65, and yet more preferably, 0.70.

In particular, in Form D, in addition to essential rare earth components, it is desirable to preferentially incorporate Zr and Ta from among the high refractive index and high dispersion elements of Zr, Ta, Ti, Nb, W, and Bi. It is also desirable to incorporate optimal quantities of Ti, Nb, W, and Bi to achieve a higher refractive index and greater dispersion than in Forms A, B, and C. Further, in addition to the quantities of Ta and Zr incorporated in Form D, based on the optical characteristics being sought, the incorporation of certain quantities of Ti, Nb, W, and Bi is extremely effective for enhancing the optical characteristics and molding properties of the glass.

The incorporation of $WO_3$ into Form D as an optional component is particularly effective to raise the refractive index and lower the liquidus temperature. The upper limit of $WO_3$ is desirably 10 percent, preferably 8 percent, more preferably 7 percent, still more preferably 6 percent, and yet more preferably, 5.5 percent. The lower limit is desirably 0 percent, preferably 1 percent, more preferably 2 percent, still more preferably 3 percent, and yet more preferably, 4 percent. The incorporation of 3 percent or more of $WO_3$, preferably 4 percent or more, is desirable when raising nd to 1.87 or higher.

$TiO_2$ and $NbO_{2.5}$ can be further incorporated into Form D as optional components. $TiO_2$ and $NbO_{2.5}$ function to increase the refractive index while maintaining low dispersion. However, since they also increase dispersion, $TiO_2$ is set to 0 to 5 percent and $NbO_{2.5}$ to 0 to 5 percent.

Other high refractive index and high dispersion components can be incorporated to the extent that the effect of the present invention is not spoiled. The upper limit of the total quantity ($TiO_2+NbO_{2.5}+WO_3+BiO_{1.5}$) of high refractive index and high dispersion components such as $TiO_2$, $NbO_{2.5}$, $WO_3$, and $BiO_{1.5}$ is desirably 12 percent, preferably 11 percent, more preferably 10 percent, still more preferably 9 percent, still more preferably 8 percent, still more preferably 7 percent, and yet more preferably, 6 percent. From the perspectives of maintaining the stability of the glass and raising the refractive index without markedly increasing the liquidus temperature, the lower limit of the total quantity ($TiO_2+NbO_{2.5}+WO_3+BiO_{1.5}$) of high refractive index and high dispersion components is desirably 1 percent, preferably 2 percent, more preferably 3 percent, still more preferably 4 percent, and yet more preferably, 5 percent.

The fact of comprising:

| | |
|---|---|
| $LiO_{0.5}$ | 0 to 10 percent; |
| ZnO | 0 to 28 percent; and |
| $YbO_{1.5}$ | 0 to 3 percent | differs from the optical glasses of the first and second basic forms of the present invention.

$LiO_{0.5}$ is set to 0 to 10 percent because when the content of $LiO_{0.5}$ exceeds 10 percent, the refractive index tends to decrease, the liquidus temperature rises, and the viscosity of the glass melt tends to decrease. Thus, the $LiO_{0.5}$ content is set to 10 percent or lower. The upper limit of the $LiO_{0.5}$ content is desirably 7 percent, preferably 5 percent, and more preferably, 4.5 percent. The lower limit of the $LiO_{0.5}$ content is desirably 1 percent, preferably 2 percent, and more preferably, 2.5 percent.

ZnO is set to 0 to 28 percent because, in terms of optical characteristics, the refractive index increases somewhat and there is a problem in the form of increased dispersion (a reduction in vd) when a large quantity of ZnO is incorporated. In Form D, the object is to obtain a glass having a higher refractive index of nd=1.825 to 1.90 and a higher dispersion range of vd=35 to 43 than in Forms A, B, and C. Thus, the content permitted has been increased relative to what it is in the glasses of Forms A, B, and C. Thus, $2LiO_{0.5}/(2LiO_{0.5}+ZnO)$, which serves as a yardstick for adjusting components that lower the Tg, naturally assumes a lower value. That is, the upper limit of $2LiO_{0.5}/(2LiO_{0.5}+ZnO)$ is desirably 0.7, preferably 0.6, more preferably 0.5, and still more preferably, 0.4. The lower limit of $2LiO_{0.5}/(2LiO_{0.5}+ZnO)$ is desirably 0, preferably 0.05, more preferably, 0.1, still more preferably 0.15, still more preferably 0.2, and yet more preferably, 0.25.

$YbO_{1.5}$ is set to 0 to 3 percent because of the high cost of $YbO_{1.5}$ and because the incorporation of an excessive quantity increases the liquidus temperature, indirectly fostering the volatilization of glass components and compromising the homogeneity and molding characteristics of the glass. Further, this component absorbs radiation in the infrared region, rendering the glass unsuitable for use in highly sensitive optical systems of which sensitivity characteristics in the near infrared range are required, such as high-precision video cameras and surveillance cameras. However, the glass of Form D has a high refractive index, so its use can be effectively limited to applications such as compact digital cameras that do not receive light in the infrared range. $YbO_{1.5}$ can be incorporated with 3 percent as the upper limit. The upper limit is set at 3 percent for $YbO_{1.5}$ because of its high cost and the fact that it absorbs infrared radiation.

($2LiO_{0.5}+ZnO+(F/2)$) is set to 20 percent or more to lower the glass transition temperature.

Further, in the optical glass of Form D, the refractive index nd and the Abbé number vd desirably satisfy equation (4).

The relation between the refractive index nd and the Abbé number vd is described further below.

$$nd-(2.25-0.01 \times vd) \geq -0.01 \quad (4)$$

The actions and effects of individual glass components will be described sequentially below. Tables 1-1 to 1-29 and 2-1 to 2-18 give the values of desirable upper limit and lower limit values for the ranges of physical properties and components. For both the upper limit and lower limit, the value indicated as number 1 is the outermost value of the numeric range. As the number indicated increases to 2, 3, 4, 5, 6, 7, or 8, the upper limit and the lower limit lie further inside the numeric range and increase in desirability. In the upper limit and lower limit fields of each table, the value indicated by the largest number is the most desirable value (upper limit value or lower limit value). The upper limit value and lower limit value of Tables 1-1 to 1-29 and 2-1 to 2-18 can be combined.

$BO_{1.5}$ is an essential component in the optical glass of the present invention that forms a glass network. Incorporating $BO_{1.5}$ into the optical glass of the present invention in a range of from 20 to 70 percent has the effect of enhancing glass stability. Incorporating 20 percent or more of $BO_{1.5}$ has the effects of enhancing low dispersion and lowering the liquidus temperature. It is undesirable for the content of $BO_{1.5}$ to exceed 70 percent because the refractive index decreases and the amount of volatilization tends to increase. From these perspectives, in the basic forms and in Forms A, B, C, and D of the present invention, the upper and lower limits of the $BO_{1.5}$ content are suitably set as indicated below. In particular, from the perspective of increasing the refractive index, the upper limit in Form D is set to a lower value than in the basic forms. The lower limit in Form C is set to a higher value than in the basic forms to increase vd.

TABLE 1-1

$BO_{1.5}$ (Cation %)

| Form | | Basic | A | B | C | D |
|---|---|---|---|---|---|---|
| Upper limit | 1 | 70 | 65 | 64 | 69 | 45 |
| | 2 | 65 | 60 | 57 | 65 | 43 |
| | 3 | 60 | 51 | 52 | 60 | 42 |
| | 4 | 55 | 48 | 48 | 55 | 41 |
| | 5 | 51 | 46 | 45 | 53 | 40 |
| | 6 | 48 | 44 | 43 | 51 | 39 |
| | 7 | 46 | 42 | 41 | 50 | 38 |
| | 8 | 44 | | 39 | | |
| | 9 | 42 | | | | |
| Lower limit | 1 | 20 | 25 | | 40 | 24 |
| | 2 | 30 | 28 | 24 | 42 | 26 |
| | 3 | 34 | 30 | 28 | 44 | 28 |
| | 4 | 36 | 34 | 31 | 46 | 29 |
| | 5 | 38 | 36 | 33 | | 30 |
| | 6 | 39 | 38 | 34 | | |
| | 7 | 40 | 39 | 35 | | |
| | 8 | | 40 | | | |

$SiO_2$ is an optional component in the optical glass of the present invention that forms a glass network. $SiO_2$ can be incorporated into the optical glass of the present invention within a range of 0 to 20 percent. This has the effect of markedly improving glass stability. Incorporating more than 0 percent of $SiO_2$ has the effects of increasing the melt viscosity, lowering the liquidus temperature, and enhancing mechanical strength. An $SiO_2$ content exceeding 20 percent is undesirable in that the refractive index tends to decrease and the glass transition temperature tends to rise. From these perspectives, the upper and lower limits of the $SiO_2$ content are suitably set as indicated below for the basic forms and Forms A, B, C, and D of the present invention.

TABLE 1-2

$SiO_2$ (Cation %)

| Form | | Basic | A | B | C | D |
|---|---|---|---|---|---|---|
| Upper limit | 1 | 20 | 17 | 16 | 17 | 15 |
| | 2 | 17 | 15 | 13 | 15 | 10 |
| | 3 | 15 | 13 | 11 | 13 | 8 |
| | 4 | 13 | 12 | 10 | 12 | 7 |
| | 5 | 12 | 11 | 9 | 11 | 6 |
| | 6 | 11 | | | | 5 |
| Lower limit | 1 | 0 | 2 | 0 | 2 | 1 |
| | 2 | 2 | 4 | 2 | 4 | 2 |
| | 3 | 5 | 5 | 4 | 5 | 3 |
| | 4 | 7 | 7 | 5 | 7 | |
| | 5 | 8 | 8 | 6 | 8 | |
| | 6 | 9 | 9 | 7 | 9 | |
| | 7 | 10 | | 8 | | |

The desirable range of the combined quantities of $BO_{1.5}$ and $SiO_2$ is given below.

Basic forms: 32 to 74 percent, preferably 36 to 70 percent.

Form A: 42 to 61 percent, 44 to 59 percent, 46 to 57 percent, 48 to 55 percent (increasing in desirability from left to right; identical below);

Form B: 39 to 57 percent, 41 to 55 percent, 43 to 53 percent, 45 to 51 percent;

Form C: 50 to 72 percent, 52 to 70 percent, 54 to 68 percent, 56 to 66 percent;

Form D: 30 to 46 percent, 32 to 45 percent, 34 to 44 percent, 35 to 43 percent.

$AlO_{1.5}$ and $GeO_2$ are components that function to form a glass network in a manner equivalent to $BO_{1.5}$ and $SiO_2$. When these components are incorporated into the optical glass of the present invention, the above total content ranges apply to $AlO_{1.5}$ and $GeO_2$ as well as to $BO_{1.5}$ and $SiO_2$. However, the effect of $AlO_{1.5}$ is inferior to that of $BO_{1.5}$ and $SiO_2$. Thus, the incorporation of $BO_{1.5}$ and $SiO_2$ is preferred to the incorporation of $AlO_{1.5}$. Since $GeO_2$ is expensive, the incorporation of $BO_{1.5}$ and $SiO_2$ is preferable to the incorporation of $GeO_2$.

$LaO_{1.5}$ is an essential component of the optical glass of the present invention that raises the refractive index. Incorporating $LaO_{1.5}$ within a range of 6 to 30 percent in the optical glass of the present invention has the effect of raising the refractive index. The incorporation of 6 percent or more of $LaO_{1.5}$ has the effects of maintaining low dispersion, enhancing chemical durability, and increasing mechanical strength. $LaO_{1.5}$ has a lower melting point than other rare earth components, and is advantageous in that it can be incorporated in large quantity. The incorporation of more than 30 percent of $LaO_{1.5}$ is undesirable in that the glass stability decreases, the liquidus temperature rises, and the glass transition temperature rises. From these perspectives, the upper and lower limits of the $LaO_{1.5}$ content are suitably set as indicated below for the basic forms and forms A, B, C, and D of the present invention. In particular, from the perspective of raising the refractive index, the lower limit in Form D is set higher than in the basic forms.

TABLE 1-3

$LaO_{1.5}$ (Cation %)

| Form | | Basic | A | B | C | D |
|---|---|---|---|---|---|---|
| Upper limit | 1 | 30 | 25 | | 24 | 27 |
| | 2 | 25 | 22 | 26 | 22 | 26 |
| | 3 | 22 | 20 | 24 | 20 | 24 |

TABLE 1-3-continued

| | | LaO$_{1.5}$ (Cation %) | | | | |
|---|---|---|---|---|---|---|
| Form | | Basic | A | B | C | D |
| | 4 | 20 | 18 | 23 | 18 | 22 |
| | 5 | 18 | 17 | 22 | 17 | |
| | 6 | 17 | 16 | 21 | 16 | |
| | 7 | 16 | | | | |
| Lower limit | 1 | 6 | 8 | 8 | 6 | 14 |
| | 2 | 8 | 9 | 11 | 8 | 16 |
| | 3 | 9 | 10 | 14 | 9 | 17 |
| | 4 | 10 | 11 | 16 | 10 | 18 |
| | 5 | 11 | 12 | 18 | 11 | |
| | 6 | 12 | | 19 | 12 | |

GdO$_{1.5}$ is an essential component of the optical glass of the present invention that raises the refractive index. Incorporating GdO$_{1.5}$ into the optical glass of the present invention within a range of 4 to 25 percent has the effect of raising the refractive index. The incorporation of 4 percent or more of GdO$_{1.5}$ has the effects of maintaining low dispersion, enhancing chemical durability, and increasing mechanical strength. GdO$_{1.5}$ affords an advantage in that it lowers the melting point and increases moldability when mixed with other rare earth components. The incorporation of a quantity of GdO$_{1.5}$ exceeding 25 percent is undesirable in that it decreases glass stability, raises the liquidus temperature, and raises the glass transition temperature. From such perspectives, the upper and lower limits of the GdO$_{1.5}$ content are suitably set as indicated below for the basic forms and Forms A, B, C, and D of the present invention. In particular, the upper limit in Form D is set to a lower value than in the basic forms from the perspective of setting a desirable LaO$_{1.5}$/ΣRE ratio that does not raise the liquidus temperature when high dispersion components are incorporated.

TABLE 1-4

| | | GdO$_{1.5}$ (Cation %) | | | | |
|---|---|---|---|---|---|---|
| Form | | Basic | A | B | C | D |
| Upper limit | 1 | 25 | 22 | 22 | 20 | 18 |
| | 2 | 22 | 20 | 20 | 18 | 16 |
| | 3 | 20 | 18 | 18 | 16 | 14 |
| | 4 | 18 | 16 | 16 | 15 | 12 |
| | 5 | 16 | 15 | 15 | 14 | 11 |
| | 6 | 15 | 14 | 14 | | 10 |
| | 7 | 14 | | | | |
| Lower limit | 1 | 4 | 6 | 6 | 6 | 5 |
| | 2 | 6 | 7 | 7 | 7 | 5.5 |
| | 3 | 7 | 8 | 8 | 8 | 6 |
| | 4 | 8 | 9 | 9 | 9 | 6.5 |
| | 5 | 9 | 10 | 10 | 10 | |
| | 6 | 10 | | | | |

YO$_{1.5}$ is an optional component in the optical glass of the present invention that raises the refractive index. The optical glass of the present invention can contain YO$_{1.5}$ within a range of 0 to 10 percent, which has the effect of raising the refractive index. the incorporation of more than 0 percent of YO$_{1.5}$ has the effects of maintaining low dispersion, enhancing chemical durability, and increasing mechanical strength. Further, YO$_{1.5}$ affords an advantage in that it lowers the melting point and increases moldability when mixed with other rare earth components. Still further, YO$_{1.5}$ has a high refractive index for its specific gravity, contributing to the reduction in weight of lenses comprised of the optical glass of the present invention. The incorporation of a quantity of YO$_{1.5}$ exceeding 10 percent is undesirable because it decreases glass stability, raises the liquidus temperature, and raises the glass transition temperature. From such perspectives, the upper and lower limits of the YO$_{1.5}$ content are suitably set as indicated below for the basic forms and Forms A, B, C, and D of the present invention. In particular, the upper limit in Form D is set to a lower value than in the basic forms from the perspectives of setting a desirable LaO$_{1.5}$/ΣRE ratio that does not raise the liquidus temperature when high dispersion components are incorporated, and of preferentially employing rare earth components with high refractive indexes.

TABLE 1-5

| | | YO$_{1.5}$ (Cation %) | | | | |
|---|---|---|---|---|---|---|
| Form | | Basic | A | B | C | D |
| Upper limit | 1 | 10 | 7 | 7 | 7 | 5 |
| | 2 | 7 | 5 | 5 | 5 | 3 |
| | 3 | 5 | 4 | 4 | 4 | 2 |
| | 4 | 4 | 3 | 3 | 3 | 1 |
| | 5 | 3 | | 2 | 2.5 | 0 |
| | 6 | | | | 2 | |
| | 7 | | | | 1.5 | |
| | 8 | | | | 1 | |
| | 9 | | | | 0.5 | |
| | 10 | | | | 0 | |
| Lower limit | 1 | 0 | 0 | 0 | | |
| | 2 | 0.5 | 0.5 | 0.5 | | |
| | 3 | 1 | 1 | 1 | | |
| | 4 | 1.5 | 1.5 | | | |
| | 5 | 2 | 2 | | | |
| | 6 | 2.5 | 2.5 | | | |

LiO$_{0.5}$ is an optional component of the optical glass of the present invention that lowers the glass transition temperature, sag temperature, and press molding temperature. LiO$_{0.5}$ can be incorporated into the optical glass of the present invention in a range of from 0 to 20 percent, having the effect of markedly lowering the glass transition temperature. The incorporation of more than 0 percent of LiO$_{0.5}$ yields a glass of higher density than other alkalis. As a result, it is possible to achieve an optical glass of higher refractive index than with other alkalis. The incorporation of more than 20 percent of LiO$_{0.5}$ lowers the melt viscosity, raises the liquidus temperature, and as a result, decreases glass stability. Further, the incorporation of more than 20 percent of LiO$_{0.5}$ is undesirable in that it lowers the refractive index. From such perspectives, the upper and lower limits of the LiO$_{0.5}$ contents are suitably set as indicated below for the basic forms and Forms A, B, C, and D of the present invention. The upper limit of Form D is set to a value that is lower than those of the basic forms because high dispersion is permitted and Li and Zn are employed as components that lower the Tg.

TABLE 1-6

| | | LiO$_{0.5}$ (Cation %) | | | | |
|---|---|---|---|---|---|---|
| Form | | Basic | A | B | C | D |
| Upper limit | 1 | 20 | 16 | 16 | 18 | 8 |
| | 2 | 16 | 13 | 13 | 16 | 7 |
| | 3 | 13 | 12 | 10 | 14 | 6 |
| | 4 | 12 | 11 | 7 | 13 | 5 |
| | 5 | 11 | 10 | 5 | 12 | |
| | 6 | 10 | | 4 | | |
| | 7 | | | | | |
| Lower limit | 1 | 0 | 2 | 0 | 2 | 0 |
| | 2 | 2 | 4 | 0.5 | 4 | 1 |
| | 3 | 4 | 5 | 1 | 5 | 2 |
| | 4 | 5 | 6 | 1.5 | 6 | 3 |
| | 5 | 6 | 7 | 2 | 7 | |

TABLE 1-6-continued

| | LiO$_{0.5}$ (Cation %) | | | | |
|---|---|---|---|---|---|
| Form | Basic | A | B | C | D |
| | 6 | 7 | 8 | 2.5 | 8 |
| | 7 | 8 | | 3 | 10 |

ZnO is an optional component in the optical glass of the present invention that lowers the glass transition temperature, sag temperature, and press molding temperature. The optical glass of the present invention can comprise ZnO within a range of 0 to 20 percent, thereby lowering the glass transition temperature. The incorporation of more than 0 percent of ZnO raises the refractive index, lowers the liquidus temperature, and suppresses volatilization more than Tg lowering components. The incorporation of more than 20 percent of ZnO is undesirable in that it increases dispersion (reduces vd) and lowers the nd relative to the specific gravity. From such perspectives, the upper and lower limits of the ZnO content are suitably set as indicated below for the basic forms and Forms A, B, C, and D of the present invention. From the perspective of increasing a low level of dispersion, the upper limit of Form C is set to a lower value than the basic forms. From the perspective of raising the refractive index, the lower limit of Form D is set to a value that is higher than that of the basic forms.

TABLE 1-7

| | ZnO (Cation %) | | | | |
|---|---|---|---|---|---|
| Form | Basic | A | B | C | D |
| Upper limit | 1 | 20 | 17 | 25 | 6 | 28 |
| | 2 | 17 | 14 | 20 | 4 | 26 |
| | 3 | 14 | 12 | 19 | 3 | 24 |
| | 4 | 12 | 10 | 18 | 2 | 22 |
| | 5 | 10 | 8 | 17 | 2 | 21 |
| | 6 | 8 | 7 | 16 | | 20 |
| | 7 | 7 | | 15 | | |
| | 8 | | | 14 | | |
| Lower limit | 1 | 0 | 1 | 0 | 0 | 5 |
| | 2 | 1 | 2 | 3 | 0.5 | 8 |
| | 3 | 2 | 3 | 5 | 1 | 10 |
| | 4 | 3 | 4 | 8 | | 12 |
| | 5 | 4 | 5 | 10 | | 13 |
| | 6 | 5 | | 11 | | 14 |
| | 7 | | | 12 | | 15 |

F is an essential component of the optical glass of the present invention that lowers the glass transition temperature, sag temperature, and press molding temperature. In the optical glass of the present invention, the molar ratio F/O of the F content to the O (oxygen) content is 0.01 to 0.30. Incorporating F within this range has the effect of lowering the glass transition temperature. Incorporating F in a quantity such that F/O is 0.01 or greater permits an increase in the quantity of rare earth components incorporated, enhances glass stability, and improves weatherability. The incorporation of F in a quantity such that F/O exceeds 0.30 is undesirable in that it promotes variation in characteristics due to volatilization, increases striae, lowers the refractive index, lowers the melt viscosity, and markedly diminishes the nd relative to the specific gravity. From such perspectives, the upper and lower limits of the F content are suitably set as indicated below for the basic forms and Forms A, B, C, and D of the present invention.

TABLE 1-8

| | F/O (Molar ratio) | | | | |
|---|---|---|---|---|---|
| Form | Basic | A | B | C | D |
| Upper limit | 1 | 0.30 | 0.24 | 0.27 | 0.24 | 0.20 |
| | 2 | 0.27 | 0.21 | 0.24 | 0.21 | 0.16 |
| | 3 | 0.24 | 0.18 | 0.22 | 0.18 | 0.14 |
| | 4 | 0.21 | 0.16 | 0.20 | 0.16 | 0.12 |
| | 5 | 0.18 | 0.14 | 0.18 | 0.14 | 0.10 |
| | 6 | 0.16 | 0.12 | 0.17 | 0.12 | 0.08 |
| | 7 | 0.14 | 0.11 | 0.16 | 0.11 | 0.07 |
| | 8 | 0.12 | | 0.15 | | |
| | 9 | 0.11 | | | | |
| Lower limit | 1 | 0.01 | 0.01 | 0.01 | 0.01 | 0.01 |
| | 2 | 0.02 | 0.02 | 0.03 | 0.02 | 0.02 |
| | 3 | 0.04 | 0.04 | 0.06 | 0.04 | 0.04 |
| | 4 | 0.06 | 0.06 | 0.08 | 0.06 | |
| | 5 | 0.08 | 0.08 | 0.09 | 0.08 | |
| | 6 | 0.09 | 0.09 | 0.10 | 0.09 | |

ZrO$_2$ is an optional component of the optical glass of the present invention that raises the refractive index. ZrO$_2$ can be incorporated in a quantity falling within a range of 0 to 8 percent in the optical glass of the present invention, having the effect of markedly raising the refractive index. The incorporation of a quantity of ZrO$_2$ of greater than zero percent has the effects of stabilizing the glass, lowering the liquidus temperature more than rare earth components, raising the viscosity, enhancing chemical durability, and increasing mechanical strength. The incorporation of a quantity of ZrO$_2$ exceeding 8 percent is undesirable in that it somewhat increases dispersion (reduces vd) and raises the glass transition temperature. From such perspectives, the upper and lower limits of ZrO$_2$ are suitably set as indicated below in the basic forms and Forms A, B, C, and D of the present invention. From the perspective of increasing vd, the upper limits of Forms A and C are set to lower values than in the basic forms.

TABLE 1-9

| | ZrO$_2$ (Cation %) | | | | |
|---|---|---|---|---|---|
| Form | Basic | A | B | C | D |
| Upper limit | 1 | 8 | 3.8 | | 5.0 | 6.0 |
| | 2 | 5 | 3.4 | 5 | 4.0 | 5.0 |
| | 3 | 4.5 | 3.0 | 4.5 | 3.0 | 4.0 |
| | 4 | 3.8 | 2.7 | 3.8 | 2.5 | 3.5 |
| | 5 | 3.4 | 2.5 | 3.4 | 2.0 | 3.0 |
| | 6 | 3 | | 3 | 1.5 | |
| | 7 | 2.7 | | 2.7 | 1.0 | |
| | 8 | 2.5 | | 2.5 | 0.5 | |
| Lower limit | 1 | 0 | 0 | 0 | | 0 |
| | 2 | 0.5 | 0.5 | 0.5 | | 0.5 |
| | 3 | 1 | 1 | 1 | | 1 |
| | 4 | 1.5 | 1.5 | 1.5 | | 1.5 |
| | 5 | 2 | 2 | 2 | | 2 |

TaO$_{2.5}$ is an optional component of the optical glass of the present invention that raises the refractive index. TaO$_{2.5}$ can be incorporated into the optical glass of the present invention within a range of 0 to 10 percent, having the effect of markedly raising the refractive index. Incorporating a quantity of TaO$_{2.5}$ of greater than zero percent has the effects of stabilizing the glass more than rare earth components, lowering the liquidus temperature more than rare earth components, raising the viscosity, enhancing chemical durability, and increasing mechanical strength. The incorporation of a quantity of TaO$_{2.5}$ exceeding 10 percent is undesirable in that it increases dispersion (lowers vd) somewhat and increases the cost of the glass. From such perspectives, the upper and lower limits of the $TaO_{2.5}$ content are suitably set as indicated below for the basic forms and Forms A, B, C, and D of the present invention. In particular, from the perspective of lowering dispersion, the upper limits of Forms A and C are set to lower values than for the basic forms.

TABLE 1-10

| | | $TaO_{2.5}$ (Cation %) | | | | |
|---|---|---|---|---|---|---|
| Form | | Basic | A | B | C | D |
| Upper limit | 1 | 10 | 5 | 10 | 3 | 10 |
| | 2 | 7 | 4 | 8 | 2 | 9 |
| | 3 | 5 | 3 | 7 | 1 | 8 |
| | 4 | 4 | 2 | 6 | 0.5 | 7 |
| | 5 | 3 | 1.5 | 5.5 | 0 | 6 |
| | 6 | 2 | 1.2 | 4.8 | | |
| | 7 | 1.5 | | 4.3 | | |
| | 8 | 1.2 | | 4 | | |
| Lower limit | 1 | 0 | 0 | 0 | | 0 |
| | 2 | 0.1 | 0.1 | 0.5 | | 1 |
| | 3 | 0.3 | 0.3 | 1.2 | | 2 |
| | 4 | 0.5 | 0.5 | 1.8 | | 3 |
| | 5 | 0.6 | 0.6 | 2.3 | | 4 |
| | 6 | | | 2.7 | | 5 |
| | 7 | | | 3 | | |

$WO_3$ is an optional component of the optical glass of the present invention that raises the refractive index. $WO_3$ can be incorporated into the optical glass of the present invention within a range of 0 to 10 percent, having the effect of markedly raising the refractive index. Incorporating a quantity of $WO_3$ of greater than zero percent has the effects of stabilizing the glass more than rare earth components, lowering the liquidus temperature more than rare earth components, and raising the viscosity somewhat. The incorporation of a quantity of $WO_3$ exceeding 10 percent is undesirable in that it markedly increases dispersion (lowers vd). From such a perspective, the upper and lower limits of the $WO_3$ content are suitably set as indicated below for the basic forms and Forms A, B, C, and D of the present invention. In particular, from the perspective of lowering dispersion, the upper limit of Form C is set to a lower value than for the basic forms. From the perspective of raising the refractive index, the lower limit of Form D is set to a higher value than for the basic Forms.

TABLE 1-11

| | | $WO_3$ (Cation %) | | | | |
|---|---|---|---|---|---|---|
| Form | | Basic | A | B | C | D |
| Upper limit | 1 | 10 | 5 | 5 | 2 | 10 |
| | 2 | 8 | 3 | 3 | 1 | 8 |
| | 3 | 5 | 2 | 2 | 0.5 | 7 |
| | 4 | 3 | 1 | 1 | 0 | 6 |
| | 5 | 2 | 0 | 0 | | 5.5 |
| | 6 | 1 | | | | |
| | 7 | 0 | | | | |
| Lower limit | 1 | 0 | | | | 0 |
| | 2 | | | | | 1 |
| | 3 | | | | | 2 |
| | 4 | | | | | 3 |
| | 5 | | | | | 4 |

$NbO_{2.5}$ is an optional component of the optical glass of the present invention that raises the refractive index. $NbO_{2.5}$ can be incorporated into the optical glass of the present invention within a range of 0 to 8 percent, having the effect of markedly raising the refractive index. Incorporating a quantity of $NbO_{2.5}$ of greater than zero percent has the effects of stabilizing the glass more than rare earth components, lowering the liquidus temperature more than rare earth components, and raising the viscosity somewhat. The incorporation of a quantity of $NbO_{2.5}$ exceeding 8 percent is undesirable in that it markedly increases dispersion (lowers vd). From such a perspective, the upper and lower limits of the $NbO_{2.5}$ content are suitably set as indicated below for the basic forms and Forms A, B, C, and D of the present invention. In particular, from the perspectives of lowering dispersion and the liquidus temperature, the upper limits of Forms A, B, and C are set to a lower value than for the basic forms.

TABLE 1-12

| | | $NbO_{2.5}$ (Cation %) | | | | |
|---|---|---|---|---|---|---|
| Form | | Basic | A | B | C | D |
| Upper limit | 1 | 8 | 3 | 2 | 2 | 5 |
| | 2 | 5 | 2 | 1 | 1 | 3 |
| | 3 | 3 | 1 | 0 | 0.5 | 2 |
| | 4 | 2 | 0 | | 0 | 1 |
| | 5 | 1 | | | | 0 |
| | 6 | 0 | | | | |
| Lower limit 1 | | 0 | | | | 0 |

$TiO_2$ is an optional component of the optical glass of the present invention that raises the refractive index. $TiO_2$ can be incorporated into the optical glass of the present invention within a range of 0 to 8 percent, having the effect of markedly raising the refractive index. Incorporating a quantity of $TiO_2$ of greater than zero percent has the effects of stabilizing the glass more than rare earth components, lowering the liquidus temperature more than rare earth components, and raising the viscosity somewhat. The incorporation of a quantity of $TiO_2$ exceeding 8 percent is undesirable in that it markedly increases dispersion (lowers vd). From such a perspective, the upper and lower limits of the $TiO_2$ content are suitably set as indicated below for the basic forms and Forms A, B, C, and D of the present invention. In particular, from the perspective of lowering dispersion, the upper limits of Forms A, B, and C are set to a lower value than for the basic forms.

TABLE 1-13

| | | $TiO_2$ (Cation %) | | | | |
|---|---|---|---|---|---|---|
| Form | | Basic | A | B | C | D |
| Upper limit | 1 | 8 | 3 | 5 | 2 | 5 |
| | 2 | 5 | 2 | 3 | 1 | 3 |
| | 3 | 3 | 1 | 2 | 0.5 | 2 |
| | 4 | 2 | 0 | 1 | 0 | 1 |
| | 5 | 1 | | 0 | | 0 |
| | 6 | 0 | | | | |
| Lower limit 1 | | 0 | | | | |

$AlO_{1.5}$ is an optional component of the optical glass of the present invention that forms a glass network. $AlO_{1.5}$ can be incorporated into the optical glass of the present invention within a range of 0 to 10 percent, having the effect of somewhat enhancing glass stability. Incorporating a quantity of $AlO_{1.5}$ of greater than zero percent has the effects of lowering dispersion, somewhat raising viscosity, enhancing chemical durability, and increasing mechanical strength. The incorporation of a quantity of $AlO_{1.5}$ exceeding 10 percent is undesirable in that it lowers the refractive index and tends to raise the glass transition temperature and liquidus temperature. From such perspectives, the upper and lower limits of the $AlO_{1.5}$ content are suitably set as indicated below for the basic forms and Forms A, B, C, and D of the present invention. In particular, from the perspective of raising the refractive index, the upper limit of Form D is set to a lower value than for the basic forms.

TABLE 1-14

$AlO_{1.5}$ (Cation %)

| Form | | Basic | A | B | C | D |
|---|---|---|---|---|---|---|
| Upper limit | 1 | 10 | 3 | 5 | 10 | 3 |
| | 2 | 7 | 2 | 3 | 7 | 2 |
| | 3 | 5 | 1 | 2 | 5 | 1 |
| | 4 | 3 | 0 | 1 | 3 | 0 |
| | 5 | 2 | | 0 | 2 | |
| | 6 | 1 | | | 1 | |
| | 7 | 0.5 | | | 0 | |
| | 8 | 0 | | | | |
| Lower limit | 1 | 0 | | | | |

$GeO_2$ is an optional component of the optical glass of the present invention that forms a glass network. $GeO_2$ can be incorporated into the optical glass of the present invention within a range of 0 to 5 percent, having the effect of somewhat increasing the stability of the glass. Incorporating a quantity of $GeO_2$ of greater than zero percent has the effects of somewhat increasing viscosity and raising the refractive index more than $SiO_2$. The incorporation of a quantity of $GeO_2$ exceeding 5 percent is undesirable in that it raises the cost of the glass. From such perspectives, the upper and lower limits of the $GeO_2$ content are suitably set as indicated below for the basic forms and Forms A, B, C, and D of the present invention. Although the use of $GeO_2$ is advantageous in terms of characteristics, it is quite expensive. Thus, the quantity of $GeO_2$ is desirably minimized to obtain an optical glass having desired characteristics.

TABLE 1-15

$GeO_2$ (Cation %)

| Form | | Basic | A | B | C | D |
|---|---|---|---|---|---|---|
| Upper limit | 1 | 5 | 5 | 5 | 5 | 5 |
| | 2 | 3 | 3 | 3 | 3 | 3 |
| | 3 | 2 | 2 | 2 | 2 | 2 |
| | 4 | 1 | 1 | 1 | 1 | 1 |
| | 5 | 0 | 0 | 0 | 0 | 0 |
| Lower limit | 1 | 0 | | | | |

$GaO_{1.5}$ is an undesirable component that forms a glass network and can be incorporated to the extent that characteristics are maintained. $GaO_{1.5}$ can be incorporated in the optical glass of the present invention in a range of 0 to 5 percent, having the effect of somewhat enhancing glass stability. The incorporation of a quantity of $GaO_{1.5}$ of greater than zero percent has the effects of somewhat increasing viscosity and raising the refractive index more than $SiO_2$. The incorporation of a quantity of $GaO_{1.5}$ exceeding 5 percent is undesirable in that it raises the cost of the glass. From such perspectives, the upper and lower limits of the $GaO_{1.5}$ content are suitably set as indicated below for the basic forms and Forms A, B, C, and D of the present invention.

TABLE 1-16

$GaO_{1.5}$ (Cation %)

| Form | | Basic | A | B | C | D |
|---|---|---|---|---|---|---|
| Upper limit | 1 | 5 | 3 | 3 | 3 | 3 |
| | 2 | 3 | 2 | 2 | 2 | 2 |
| | 3 | 2 | 1 | 1 | 1 | 1 |

TABLE 1-16-continued $GaO_{1.5}$ (Cation %)

| Form | | Basic | A | B | C | D |
|---|---|---|---|---|---|---|
| | 4 | 1 | 0 | 0 | 0 | 0 |
| | 5 | 0 | | | | |
| Lower limit | 1 | 0 | | | | |

$PO_{2.5}$ is an undesirable component that forms a glass network and can be incorporated to the extent that characteristics are maintained. $PO_{2.5}$ can be incorporated in the optical glass of the present invention in a range of from 0 to 5 percent. The incorporation of $PO_{2.5}$ in a quantity exceeding 5 percent is undesirable in that it compromises the stability of the glass. From such perspectives, the upper and lower limits of the $PO_{2.5}$ content is suitably determined as indicated below for the basic forms and Forms A, B, C, and D of the present invention.

TABLE 1-17

$PO_{2.5}$ (Cation %)

| Form | | Basic | A | B | C | D |
|---|---|---|---|---|---|---|
| Upper limit | 1 | 5 | 3 | 3 | 3 | 3 |
| | 2 | 3 | 2 | 2 | 2 | 2 |
| | 3 | 2 | 1 | 1 | 1 | 1 |
| | 4 | 1 | 0 | 0 | 0 | 0 |
| | 5 | 0 | | | | |
| Lower limit | 1 | 0 | | | | |

$NaO_{0.5}$, $KO_{0.5}$, $RbO_{0.5}$, and $CsO_{0.5}$ are modifying components that can be incorporated to the extent that characteristics are maintained. The optical glass of the present invention can contain a total quantity of $NaO_{0.5}$, $KO_{0.5}$, $RbO_{0.5}$, and $CsO_{0.5}$ falling within a range of 0 to 10 percent. A quantity exceeding 10 percent is undesirable in that the stability of the glass is lower than with $LiO_{0.5}$, the refractive index of the glass is reduced more than by $LiO_{0.5}$, and the glass transition temperature rises more than with $LiO_{0.5}$. From such perspectives, the upper and lower limits of the total quantity of $NaO_{0.5}$, $KO_{0.5}$, $RbO_{0.5}$, and $CsO_{0.5}$ are suitably set as indicated below.

TABLE 1-18

(Cation %)

| Form | | Basic | A | B | C | D |
|---|---|---|---|---|---|---|
| Upper limit | 1 | 10 | 5 | 5 | 7 | 5 |
| | 2 | 7 | 3 | 3 | 5 | 3 |
| | 3 | 5 | 2 | 2 | 3 | 2 |
| | 4 | 3 | 1 | 1 | 2 | 1 |
| | 5 | 2 | 0 | 0 | 1 | 0 |
| | 6 | 1 | | | 0 | |
| | 7 | 0 | | | | |
| Lower limit | 1 | 0 | | | | |

MgO, CaO, SrO, and BaO are modifying components that can be incorporated to the extent that characteristics are maintained. The optical glass of the present invention can contain a total quantity of MgO, CaO, SrO, and BaO falling within a range of 0 to 10 percent. A quantity exceeding 10 percent is undesirable in that the stability of the glass is lower than with ZnO, the refractive index of the glass is reduced more than by ZnO, the glass transition temperature rises more than with ZnO, and the liquidus temperature rises more than with ZnO. From such perspectives, the upper and lower limits of the total quantity of MgO, CaO, SrO, and BaO are suitably set as indicated below.

TABLE 1-19

(Cation %)

| Form | | Basic | A | B | C | D |
|---|---|---|---|---|---|---|
| Upper limit | 1 | 10 | 7 | 7 | 10 | 7 |
| | 2 | 7 | 5 | 5 | 7 | 5 |
| | 3 | 5 | 3 | 3 | 5 | 3 |
| | 4 | 3 | 2 | 2 | 3 | 2 |
| | 5 | 2 | 1 | 1 | 2 | 1 |
| | 6 | 1 | 0 | 0 | 1 | 0 |
| | 7 | 0 | | | 0 | |
| Lower limit | 1 | 0 | | | | |

$ScO_{1.5}$, $InO_{1.5}$, and $LuO_{1.5}$ are modifying components that can be incorporated to the extent that characteristics are maintained. The optical glass of the present invention can contain a total quantity of $ScO_{1.5}$, $InO_{1.5}$, and $LuO_{1.5}$ falling within a range of 0 to 10 percent. A quantity exceeding 10 percent is undesirable in that the stability of the glass is lowered more than by $LaO_{1.5}$ and $GdO_{1.5}$, the liquidus temperature is raised more than by $LaO_{1.5}$ and $GdO_{1.5}$, and the refractive index of the glass is reduced more than by $LaO_{1.5}$ and $GdO_{1.5}$ From such perspectives, the upper and lower limits of the total quantity of $ScO_{1.5}$, $InO_{1.5}$, and $LuO_{1.5}$ are suitably set as indicated below.

TABLE 1-20

(Cation %)

| Form | | Basic | A | B | C | D |
|---|---|---|---|---|---|---|
| Upper limit | 1 | 10 | 3 | 3 | 5 | 3 |
| | 2 | 7 | 2 | 2 | 3 | 2 |
| | 3 | 5 | 1 | 1 | 2 | 1 |
| | 4 | 3 | 0 | 0 | 1 | 0 |
| | 5 | 2 | | | 0 | |
| | 6 | 1 | | | | |
| | 7 | 0 | | | | |
| Lower limit | 1 | 0 | | | | |

$YbO_{1.5}$ is a modifying component the incorporation of which is to be avoided to the extent possible due to absorption in the infrared region. The optical glass of the present invention can contain 0 to 9 percent of $YbO_{1.5}$. A $YbO_{1.5}$ content in excess of 9 percent is undesirable in that the stability of the glass is lowered more than by $LaO_{1.5}$ and $GdO_{1.5}$, the liquidus temperature is raised more than by $LaO_{1.5}$ and $GdO_{1.5}$, the refractive index of the glass is lowered more than by $LaO_{1.5}$ and $GdO_{1.5}$, and there is absorption in the infrared region. From such perspectives, the upper and lower limits of the $YbO_{1.5}$ content are suitably set as indicated below for the basic forms and Forms A, B, C, and D of the present invention. In particular, from the above-mentioned perspectives of cost, liquidus temperature, and infrared absorption, the upper limit of Form A is set lower than in the basic forms.

TABLE 1-21

$YbO_{1.5}$ (Cation %)

| Form | | Basic | A | B | C | D |
|---|---|---|---|---|---|---|
| Upper limit | 1 | 9 | 0.5 | 3 | 3 | 3 |
| | 2 | 5 | 0.4 | 2 | 2 | 2 |
| | 3 | 3 | 0.2 | 1 | 1 | 1 |
| | 4 | 1 | 0.1 | 0.5 | 0.5 | 0.5 |
| | 5 | 0.4 | 0.0 | 0.4 | 0.4 | 0.4 |
| | 6 | 0.2 | | 0.2 | 0.2 | 0.2 |
| | 7 | 0.1 | | 0.1 | 0.1 | 0.1 |
| | 8 | 0 | | 0.0 | 0.0 | 0.0 |

TABLE 1-21-continued $YbO_{1.5}$ (Cation %)

| Form | | Basic | A | B | C | D |
|---|---|---|---|---|---|---|
| Lower limit | 1 | 0 | | | 0.1 | |
| | 2 | | | | 0.2 | |
| | 3 | | | | 0.4 | |

$BO_{1.5} \times F/O$ is an indicator of suppression of variation in characteristics due to volatilization. $BO_{1.5}$ is denoted as a cationic percentage and F/O is the molar ratio of F and O. $BO_{1.5} \times F/O$ falls within a range of 0.05 to 10.00. Volatilization of the glass is suppressed by reducing boron and fluorine. Accordingly, boron and fluorine compounds, and components produced by the reaction of such compounds with oxygen and water in the atmosphere, are thought to be the volatile components. Qualitatively, the quantity of such volatile components is proportional to the product of the boron concentration in the glass and the fluorine concentration in the glass. The smaller this value is, the lower the potential amount of volatilization from the glass. From such perspectives, the upper and lower limits of $BO_{1.5} \times F/O$ are suitably set as indicated below for the basic forms and Forms A, B, C, and D of the present invention. Further, the value of $BO_{1.5} \times F/O$ can be suitably adjusted by adjusting the quantities of each of the components of $BO_{1.5}$, F, and O incorporated into the optical glass. In particular, from the perspective of low dispersion, the upper limit for Form C is set higher than for the basic forms, and from the perspective of a high refractive index, the upper limit for Form D is set lower than for the basic forms. From the perspective of a high refractive index, the lower limit in Form B is set higher than for the basic forms.

The following components can be added to adjust the quantity of bubbles in the glass.

$CeO_2$ can be added within a range of 0 to 2 percent to the extent that the effect of the present invention is not spoiled. The quantity of $CeO_2$ added is desirably 0 to 1 percent, preferably falling within a range of 0 to 0.5 percent, more preferably 0 to 0.3 percent, still more preferably 0 to 0.1 percent, and yet more preferably, none is incorporated at all.

$SnO_2$ can be added within a range of 0 to 2 percent to the extent that the effect of the present invention is not spoiled. The quantity of $SnO_2$ added is desirably 0 to 1 percent, preferably 0 to 0.5 percent, more preferably 0 to 0.3 percent, still more preferably 0 to 0.1 percent, and yet more preferably, none is incorporated at all.

$SbO_{1.5}$ can be added within a range of 0 to 1 percent to the extent that the effect of the present invention is not spoiled. The quantity of $SbO_{1.5}$ added is desirably 0 to 0.5 percent, preferably falling within a range of 0 to 0.1 percent, more preferably falling within a range of 0 to 0.08 percent, still more preferably falling within a range of 0 to 0.05 percent. When $SbO_{1.5}$ is added, 0.01 to 0.02 percent is desirably incorporated.

To achieve the object of the present invention, the total quantity of $BO_{1.5}$, $SiO_2$, $GeO_2$, $AlO_{1.5}$, $LiO_{0.5}$, $NaO_{0.5}$, $KO_{0.5}$, MgO, CaO, SrO, BaO, ZnO, $LaO_{1.5}$, $GdO_{1.5}$, $YO_{1.5}$, $TiO_2$, $ZrO_2$, $TaO_{2.5}$, $NbO_{2.5}$, $WO_3$, $YbO_{1.5}$, $CeO_2$, $SnO_2$, and $SbO_{1.5}$ is desirably 95 percent or greater, preferably 96 percent or greater, more preferably 97 percent or greater, still more preferably 98 percent or greater, still more preferably 99 percent or greater, and still more preferably 99.5 percent or greater, with 100 percent being optimal.

To achieve the object of the present invention, the total quantity of $BO_{1.5}$, $SiO_2$, $GeO_2$, $AlO_{1.5}$, $LiO_{0.5}$, $NaO_{0.5}$, $KO_{0.5}$, MgO, CaO, SrO, BaO, ZnO, $LaO_{1.5}$, $GdO_{1.5}$, $YO_{1.5}$, $TiO_2$, $ZrO_2$, $TaO_{2.5}$, $NbO_{2.5}$, $WO_3$, $YbO_{1.5}$, $CeO_2$, $SnO_2$, $SbO_{1.5}$, $GaO_{1.5}$, $PO_{2.5}$, $ScO_{1.5}$, $InO_{1.5}$, and $LuO_{1.5}$ is desirably 98 percent or greater, preferably 99 percent or greater, more preferably 99.5 percent or greater, still more preferably 99.8 percent or greater, and still more preferably 99.9 percent or greater, with 100 percent being optimal.

TABLE 1-22

| | | $BO_{1.5} \times F/O$ | | | | |
|---|---|---|---|---|---|---|
| Form | | Basic | A | B | C | D |
| Upper limit | 1 | 10.00 | 8 | 10 | 15 | 5.0 |
| | 2 | 8.00 | 6 | 9 | 12 | 4.5 |
| | 3 | 6.00 | 5 | 8 | 10 | 4.0 |
| | 4 | 5.00 | 4.75 | 7.5 | 8 | 3.5 |
| | 5 | 4.75 | 4.5 | 7.25 | 6 | 3.0 |
| | 6 | 4.50 | 4.25 | 7 | 5 | 2.5 |
| | 7 | 4.25 | 4 | 6.75 | | 2.0 |
| | 8 | 4.00 | | 6.5 | | |
| Lower limit | 1 | 0.50 | 0.5 | 0.5 | 2 | 0 |
| | 2 | 1.00 | 1 | 2 | 2.5 | 0.5 |
| | 3 | 2.00 | 2 | 3.5 | 3 | 1.0 |
| | 4 | 2.50 | 2.5 | 4.5 | 3.5 | 1.5 |
| | 5 | 3.00 | | 5 | 4 | |
| | 6 | | | 5.5 | | |
| | 7 | | | 6 | | |

Excess B—O—B bonds: D $(=B_B-(B_O-B_B))$ is an indicator of the suppression of variation in characteristics due to volatilization, and falls within a range of −60 to +60. Among glass components, the volatilization of boron in particular affects the glass composition. The initial reaction marking the start of volatilization is thought to consist of the recombination of boron-oxygen bonds in the glass by fluorine ions. At that time, the number density of B—O bonds contributing to the reaction in the glass is though to be given by subtracting the number density of bridging bonds between cations other than boron within the glass from the number density of boron bonds in the glass, that is, is thought to be qualitatively proportional to the number density of excess boron bonds. Accordingly, the smaller this value becomes, the more the reaction between boron and fluorine is suppressed, and the more the volatilization rate is reduced. A particularly marked effect is achieved by reducing this value to below zero. Accordingly, the lower the fluorine content and the fewer the excess B—O—B bonds that are present, the greater the suppression effect on volatilization. When this value is lower than 0, that is, when the quantity of oxygen bonded to boron is smaller than the quantity of oxygen bonded to other components, the effect is particularly pronounced. It is not just B×F, but rather D×F, that is desirably low.

Figure 10:
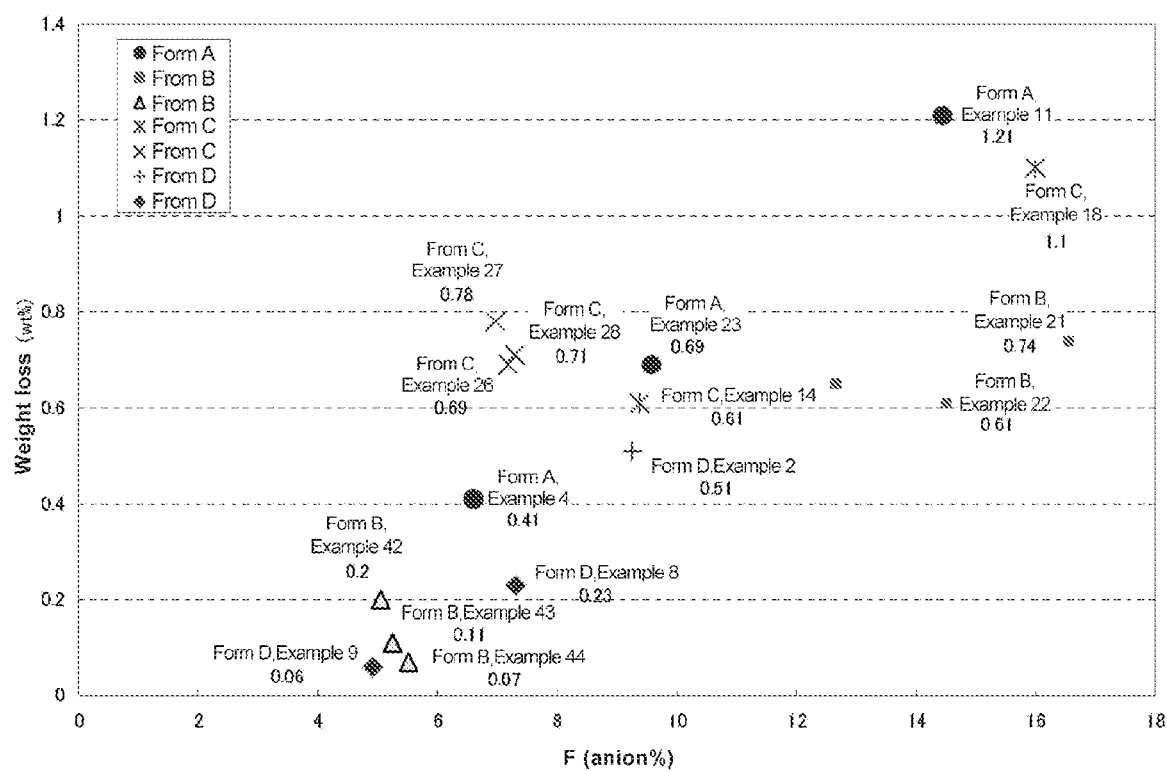
FIG. 10 shows change in weight reduction (volatilization) due to change in the F content for optical glasses of the present invention of Forms A to D, with the horizontal axis denoting the F content and the vertical axis denoting change in weight.
Figure 11:
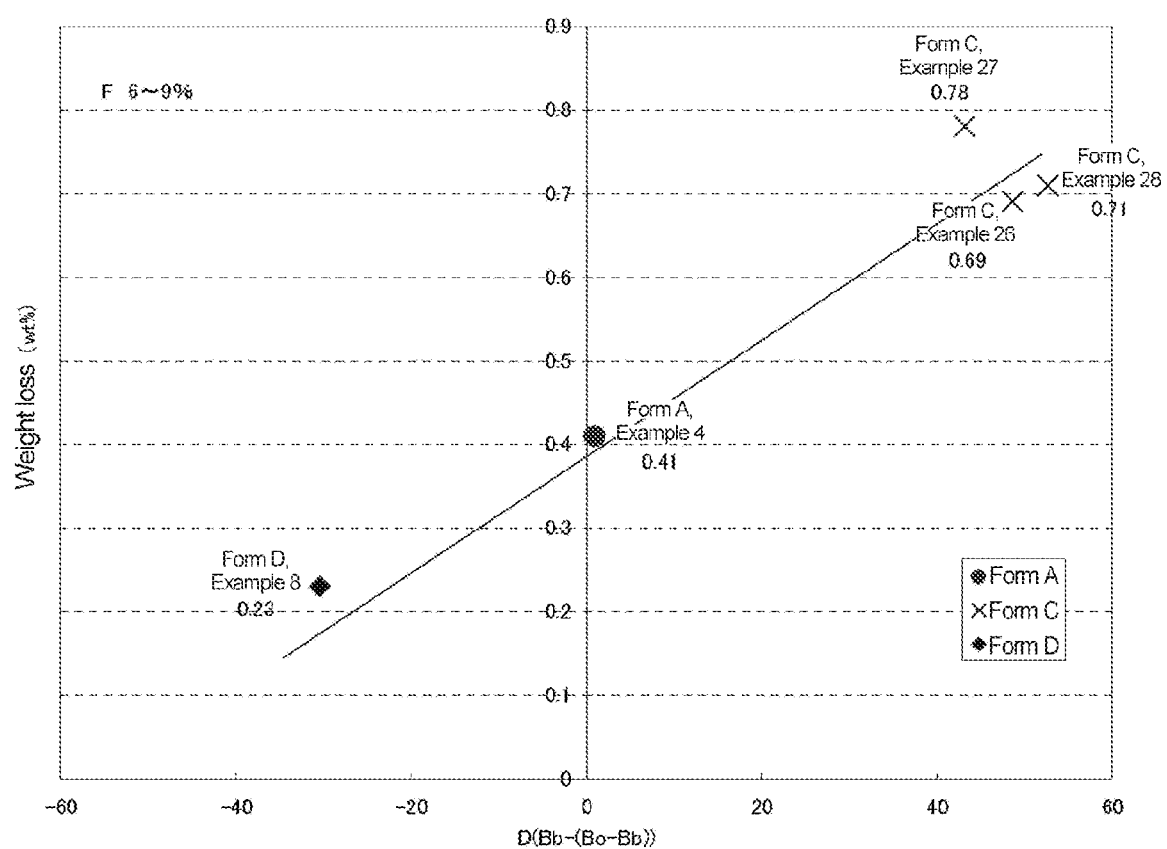
FIG. 11 shows the relation between the D value and the change in weight for glasses having an F content of 7 to 9 percent, with the horizontal axis denoting the D value and the vertical axis denoting change in weight.
Figure 12:
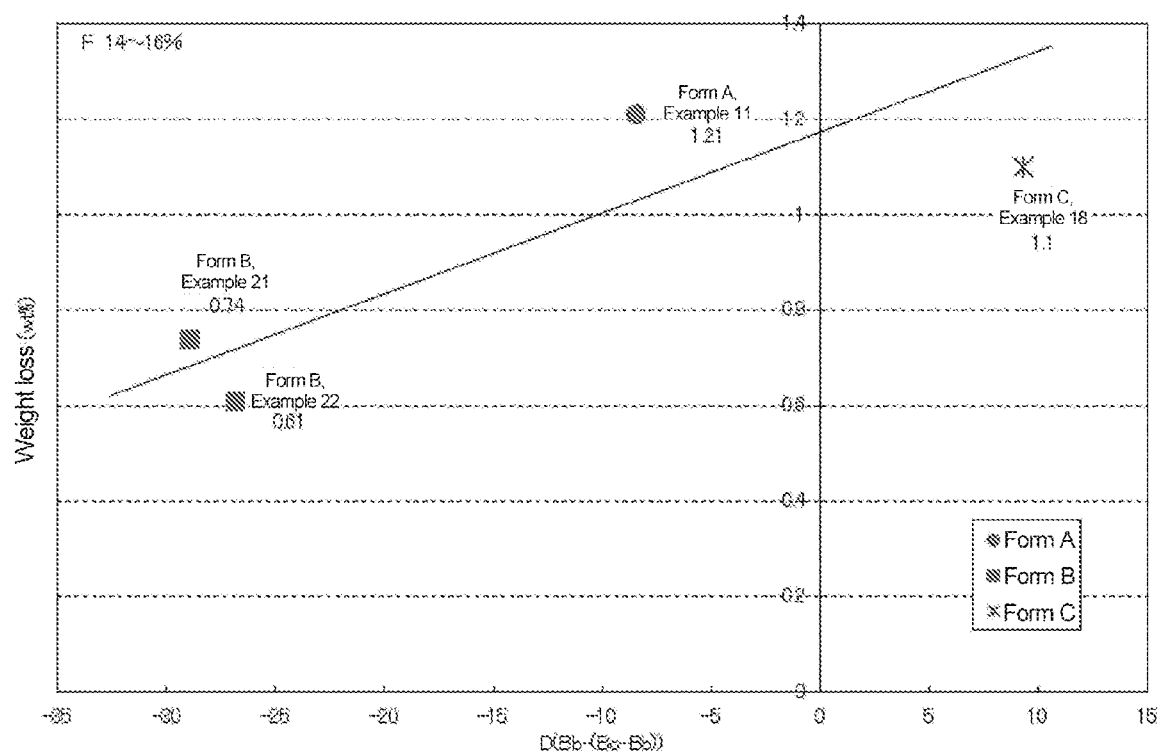
FIG. 12 shows the relation between the D value and the change in weight for glasses having an F content of 14 to 16 percent, with the horizontal axis denoting the D value and the vertical axis denoting change in weight.
Figure 13:
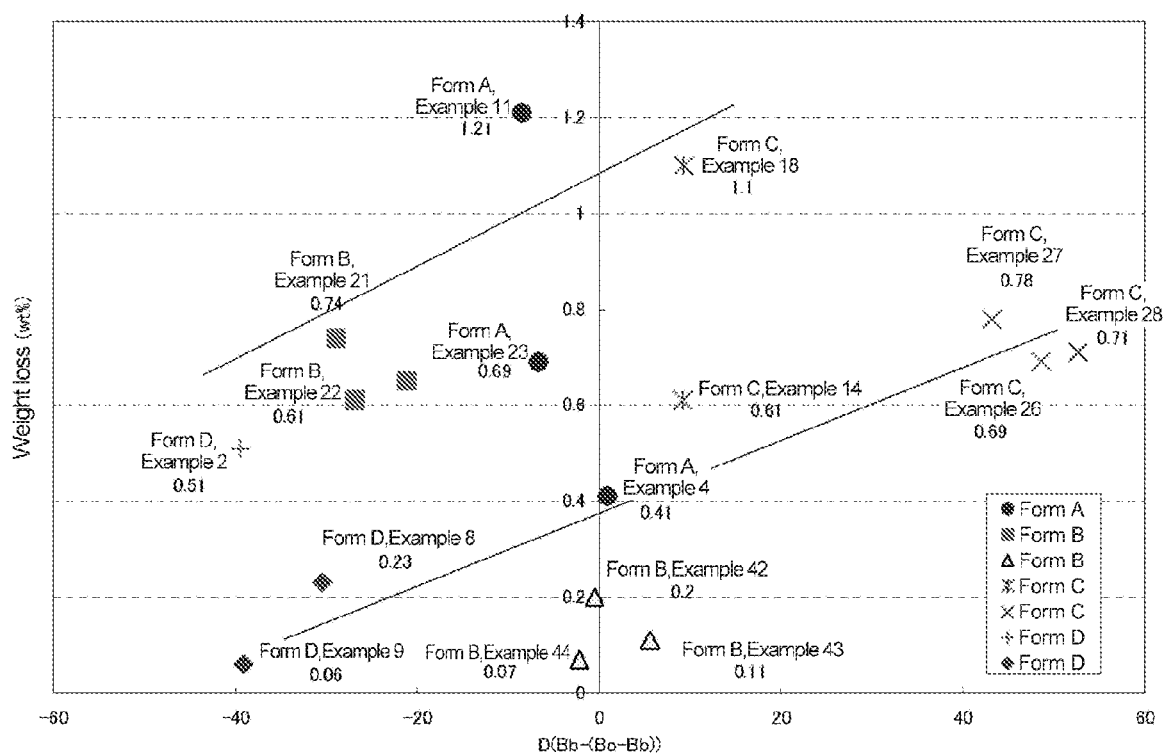
FIG. 13 is a combination of FIGS. 11 and 12.

FIG. 10 shows the change in weight reduction (volatilization) due to change in the F content in optical glasses of Forms A to D of the present invention, with the F content denoted by the horizontal axis and the change in weight denoted by the vertical axis. From this graph, it will be understood that the reduction in weight tends to increase as the F content increases. FIG. 11 shows the relation between the value of D and the reduction in weight for glasses with F contents of 7 to 9 percent, with the value of D denoted by the horizontal axis and the reduction in weight denoted by the vertical axis. FIG. 12 shows the relation between the value of D and the reduction in weight in optical glasses with F contents of 14 to 16 percent, with the value of D denoted by the horizontal axis and the reduction in weight denoted by the vertical axis. FIG. 14 combines FIGS. 12 and 13.

The reduction in weight is caused by volatilization from the glass melt, and is thus a quantitative indicator of volatilization. F sometimes volatizes alone, and sometimes cleaves the B—O—B bond formed in the glass network and volatizes in the form of molecules in which fluorine is bonded to other glass components, such as $BF_3$ and $BF_2^+$. It is primarily the latter which cause serious volatilization striae and changes in characteristics over time during molding of the glass.

In the volatilization produced by fluorine, fluorine compounds that do not contain boron, such as $SiF_4$, are also present. However, due to differences in their vapor pressure, most volatizing components can be thought of as being comprised of fluorine and boron (along with glass and atmospheric oxygen and hydrogen).

A comparison of the B—O—B bond with the B—O—X bond (where X denotes a cation other than B) in the glass network reveals that the probability of forming a volatile component in the B—O—B bond is greater when subjected to a replacement reaction of oxygen with fluorine caused by fluorine.

Since large numbers of B—O—B bonds present in glasses with high values of D, glasses with high values of D tend to undergo greater volatilization of components within the glass. However, despite the B network tending to cleave readily, volatile compounds tend not to be produced so long as the content of F is low.

Even when the F content is high, in a case when the value of D is low and cleavage of the B network tends not to occur, volatile compounds tend not to be produced.

Thus, the F content and the value of D are factors that greatly affect the level of volatilization.

Other than B, rare earth components, typified by La, are cations X that have a strong ability to retain both B and F within the glass without volatilization. Accordingly, as set forth further below, following the F content and the value of D, the value obtained by multiplying the $BO_{1.5}$ content by the F content and then dividing the product by the $LaO_{1.5}$ content—namely, $(BO_{1.5} \times F)/LaO_{1.5}$—is conceivable as an indicator affecting the level of volatilization. Reducing $(BO_{1.5} \times F)/LaO_{1.5}$ further suppresses volatilization.

From such perspectives, the upper and lower limits of excess B—O—B bonds: D are suitably set as indicated below for the basic forms and Forms A, B, C, and D of the present invention. The value of excess B—O—B bonds: D can be suitably adjusted by adjusting the quantities of $BO_{1.5}$, F, and other components that are incorporated into the optical glass.

(Computation Methods)

$B_B = $ (quantity of $BO_{1.5}) \times 1.5$ $B_O = $ total quantity of oxygen $D = B_B - (B_O - B_B)$ The quantity of $BO_{1.5}$ is the value when the content of $BO_{1.5}$ is denoted as a cationic percentage.

$B_O$ is the relative value of the quantity of O when the total quantity of all cations is adopted as 100.

TABLE 1-23

| | | $D (= B_B - (B_O - B_B))$ | | | | |
|---|---|---|---|---|---|---|
| Form | | Basic | A | B | C | D |
| Upper limit | 1 | 60 | 20 | | 60 | 0 |
| | 2 | 40 | 10 | | 50 | −10 |
| | 3 | 20 | 5 | 20 | 40 | −20 |
| | 4 | 10 | 0 | 10 | 30 | −25 |
| | 5 | 5 | −5 | 0 | 20 | −30 |
| | 6 | 0 | −10 | −10 | 15 | |
| | 7 | −5 | | −15 | | |
| | 8 | −10 | | −20 | | |

TABLE 1-23-continued

| | | \multicolumn{5}{c}{$D (= B_R - (B_O - B_R))$} | | | | |
| --- | --- | --- | --- | --- | --- |
| Form | | Basic | A | B | C | D |
| Lower limit | 1 | −60 | −60 | −60 | −20 | −45 |
| | 2 | −40 | −40 | −50 | −15 | −50 |
| | 3 | −30 | −30 | −40 | −10 | −55 |
| | 4 | −25 | −25 | −35 | −5 | −60 |
| | 5 | −20 | −20 | −30 | 0 | |

$BO_{1.5} \times F/LaO_{1.5}$

In the glass of the present invention, in which $LaO_{1.5}$ is an essential component, it is desirable to adjust $BO_{1.5} \times F/LaO_{1.5}$, which is an indicator obtained by multiplying $BO_{1.5}$ by F and dividing the product by $LaO_{1.5}$, to further adjust the level of volatilization while maintaining a high refractive index and low dispersion. The incorporation of $LaO_{1.5}$, which is capable of bonding both oxygen and fluorine, reduces the quantity of fluorine that actually contributes to volatilization. That is, the smaller $BO_{1.5} \times F/LaO_{1.5}$ is made, the less volatilization occurs. The value of $BO_{1.5} \times F/LaO_{1.5}$ can be suitably set by adjusting $BO_{1.5}$, F, $LaO_{1.5}$, and other components.

TABLE 1-24

| | | \multicolumn{4}{c}{$BO_{1.5} \times F/LaO_{1.5}$} | | | |
| --- | --- | --- | --- | --- | --- |
| Form | | A | B | C | D |
| Upper limit | 1 | 45 | 42 | 48 | 18 |
| | 2 | 42 | 40 | 45 | 15 |
| | 3 | 40 | 38 | 42 | 13 |
| | 4 | 38 | 35 | 40 | 11 |
| | 5 | 35 | 33 | 38 | |
| | 6 | 30 | 30 | 35 | |
| | 7 | 25 | 28 | 30 | |
| | 8 | | 25 | | |
| Lower limit | 1 | 5 | 3 | 8 | 1 |
| | 2 | 8 | 5 | 10 | 2 |
| | 3 | 10 | 8 | 14 | 3 |
| | 4 | 14 | 10 | 18 | 5 |
| | 5 | 18 | 14 | 22 | 8 |
| | 6 | | 18 | | |

$SiO_2/BO_{1.5}$, the ratio of the $SiO_2$ content to the $BO_{1.5}$ content, is an indicator of suppression of molding striae due to increased viscosity that desirably falls within a range of 0.10 to 0.40. Among glass network-forming components, the use of a large amount of viscosity-increasing $SiO_2$ raises the viscosity during molding and suppresses deterioration of the internal quality of the glass due to the generation of striae. From such a perspective, the upper and lower limits of $SiO_2/BO_{1.5}$ are suitably set as indicated below for the basic forms and Forms A, B, C, and D of the present invention. The value of $SiO_2/BO_{1.5}$ can be suitably set by adjusting the quantities of the components $SiO_2$ and $BO_{1.5}$ that are incorporated into the optical glass.

TABLE 1-25

| | | \multicolumn{5}{c}{$SiO_2/BO_{1.5}$} | | | | |
| --- | --- | --- | --- | --- | --- |
| Form | | Basic | A | B | C | D |
| Upper limit | 1 | 0.40 | 0.55 | 0.4 | 0.4 | 0.20 |
| | 2 | 0.36 | 0.50 | 0.36 | 0.36 | 0.18 |
| | 3 | 0.34 | 0.40 | 0.34 | 0.34 | 0.16 |
| | 4 | 0.32 | 0.36 | 0.32 | 0.32 | 0.14 |
| | 5 | 0.30 | 0.34 | 0.3 | 0.3 | 0.13 |
| | 6 | 0.28 | 0.32 | 0.28 | 0.28 | |
| | 7 | | 0.30 | 0.27 | 0.25 | |
| | 8 | | 0.28 | | | |

TABLE 1-25-continued

| | | \multicolumn{5}{c}{$SiO_2/BO_{1.5}$} | | | | |
| --- | --- | --- | --- | --- | --- |
| Form | | Basic | A | B | C | D |
| Lower limit | 1 | 0.10 | 0.1 | 0 | 0.05 | 0.03 |
| | 2 | 0.15 | 0.15 | 0.1 | 0.1 | 0.05 |
| | 3 | 0.17 | 0.17 | 0.15 | 0.15 | 0.07 |
| | 4 | 0.19 | 0.19 | 0.17 | 0.17 | 0.09 |
| | 5 | 0.21 | 0.21 | 0.19 | 0.19 | 0.1 |
| | 6 | 0.22 | 0.22 | 0.21 | 0.21 | 0.11 |
| | 7 | 0.23 | | 0.22 | | |
| | 8 | 0.23 | | | | |

$LaO_{1.5}/\Sigma Re$ ($\Sigma Re$=total quantity of rare earth components), the ratio of the content of $LaO_{1.5}$ to the total content of rare earth components, is an indicator of suppression of the formation of striae due to lowering of the liquidus temperature that desirably falls within a range of 0.30 to 0.80. Optimizing the ratio of rare earth components that raise the melting point of the glass lowers the melting point through an eutectic effect. This effect lowers the minimum temperature at which crystals precipitate out into the glass melt, or the liquidus temperature, thereby increasing the maximum viscosity at which the glass melt will flow out continuously. From such perspectives, the upper and lower limits of $LaO_{1.5}/\Sigma Re$ are suitably set as indicated below for the basic forms and Forms A, B, C, and D of the present invention. The value of $LaO_{1.5}/\Sigma Re$ can be suitably set by adjusting the quantities of $LaO_{1.5}$ and various rare earth components that are incorporated into the optical glass.

TABLE 1-26

| | | \multicolumn{5}{c}{$LaO_{1.5}/\Sigma Re$} | | | | |
| --- | --- | --- | --- | --- | --- |
| Form | | Basic | A | B | C | D |
| | 1 | 0.80 | 0.75 | 0.8 | 0.9 | 0.9 |
| | 2 | 0.70 | 0.7 | 0.75 | 0.8 | 0.85 |
| | 3 | 0.60 | 0.6 | 0.7 | 0.7 | 0.8 |
| | 4 | 0.57 | 0.57 | 0.67 | 0.6 | 0.77 |
| | 5 | 0.55 | 0.55 | 0.65 | 0.57 | 0.75 |
| | 6 | 0.53 | 0.53 | 0.63 | 0.55 | |
| | 7 | 0.52 | 0.52 | 0.62 | | |
| Lower limit | 1 | 0.30 | 0.3 | 0.3 | 0.3 | 0.5 |
| | 2 | 0.40 | 0.4 | 0.4 | 0.4 | 0.55 |
| | 3 | 0.45 | 0.45 | 0.5 | 0.45 | 0.6 |
| | 4 | 0.48 | 0.48 | 0.55 | 0.48 | 0.65 |
| | 5 | 0.49 | 0.49 | 0.58 | | 0.7 |
| | 6 | | | 0.59 | | |

$2LiO_{0.5}+ZnO+(F/2)$—the combined sum of twice the $LiO_{0.5}$ content, the ZnO content, and ½ the F content—is an indicator of enhanced precision press moldability due to a decrease in the glass transition temperature Tg that desirably falls within a range of 20 to 60. The effect of lowering the Tg of a glass by incorporating Li, Zn, and F is 2 for Li, 1 for Zn, and 0.5 for F per atomic percent. Thus, the sum thereof, $2LiO_{0.5}+ZnO+(F/2)$, is approximately linked to the glass transition temperature Tg of the glass. The magnitude of this indicator is an indicator of the ease of press molding. $LiO_{0.5}$ and ZnO are values denoted as cationic percentages. F is the relative value of the quantity of F when the total quantity of all cations is adopted as 100. From such a perspective, the upper and lower limits of $2LiO_{0.5}+ZnO+(F/2)$ are suitably set as indicated below for the basic forms and Forms A, B, C, and D of the present invention. The value of $2LiO_{0.5}+ZnO+(F/2)$ can be suitably set by adjusting the quantities of the components $LiO_{0.5}$, ZnO, and F that are incorporated into the optical glass.

Figure 5:
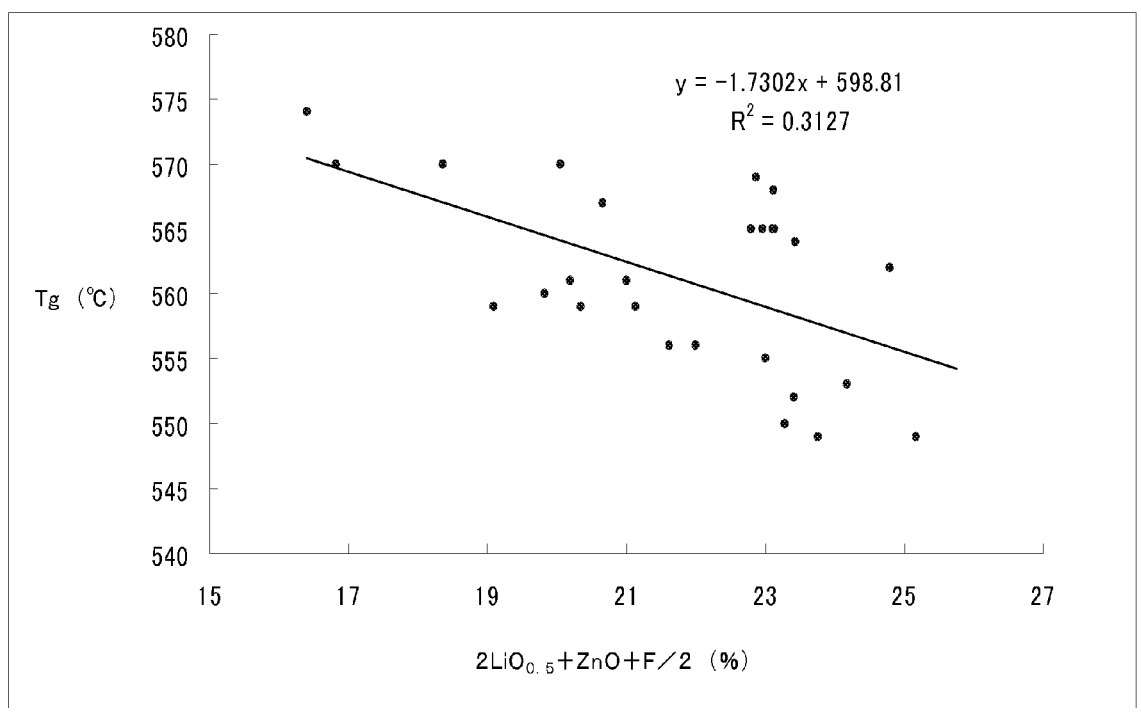
FIG. 5 shows the change in Tg resulting from change in $2LiO_{0.5}+ZnO+(F/2)$, with the horizontal axis denoting the value of $2LiO_{0.5}+ZnO+(F/2)$ and the vertical axis denoting the glass transition temperature Tg.

FIG. 5 shows how the Tg changes with change in $2LiO_{0.5}+ZnO+(F/2)$, with the value of $2LiO_{0.5}+ZnO+(F/2)$ be denoted by the horizontal axis and the value of the glass transition temperature Tg being denoted by the vertical axis. As will be clear from FIG. 5, the Tg can be lowered by increasing $2LiO_{0.5}+ZnO+(F/2)$ and the Tg can be raised by decreasing $2LiO_{0.5}+ZnO+(F/2)$.

TABLE 1-27

$2LiO_{0.5} + ZnO + (F/2)$

| Form | | Basic | A | B | C | D |
|---|---|---|---|---|---|---|
| Upper limit | 1 | 60 | 45 | | 45 | 40 |
| | 2 | 50 | 40 | 45 | 40 | 37 |
| | 3 | 45 | 37 | 40 | 37 | 35 |
| | 4 | 40 | 35 | 37 | 35 | 32 |
| | 5 | 37 | 34 | 35 | 34 | |
| | 6 | 35 | | 34 | | |
| | 7 | 34 | | | | |
| | 8 | | | | | |
| Lower limit | 1 | 20 | 25 | 20 | 25 | 20 |
| | 2 | 25 | 28 | 23 | 28 | 22 |
| | 3 | 28 | 29 | 26 | 29 | 24 |
| | 4 | 29 | 30 | 28 | 30 | 25 |
| | 5 | 30 | 31 | 29 | 31 | 26 |
| | 6 | 31 | | 30 | | 28 |

$2LiO_{0.5}/(2LiO_{0.5}+ZnO)$—the value of twice the $LiO_{0.5}$ content divided by the combined sum of twice the $LiO_{0.5}$ content and the ZnO content—contributes to enhancing glass characteristics (by the effects of suppressing a drop in νd and lowering the specific gravity) by adjusting Tg-lowering components and desirably falls within a range of 0.10 to 1.00. Among components that lower the glass transition temperature Tg of the glass, Li lowers νd less than Zn and has the effect of increasing the refractive index nd relative to the specific gravity of the glass obtained. It is thus employed to obtain a glass with a high refractive index, low dispersion, a low specific gravity, and a high kinematic viscosity. From such perspectives, the upper and lower limits of $2LiO_{0.5}/(2LiO_{0.5}+ZnO)$ are suitably set as indicated below for the basic forms and Forms A, B, C, and D of the present invention. Further, the value of $2LiO_{0.5}/(2LiO_{0.5}+ZnO)$ can be suitably set by adjusting the quantities of the components $LiO_{0.5}$ and ZnO that are incorporated into the optical glass.

TABLE 1-28

$2LiO_{0.5}/(2LiO_{0.5} + ZnO)$

| Form | | Basic | A | B | C | D |
|---|---|---|---|---|---|---|
| Upper limit | 1 | 1.00 | 1.0 | 1.0 | | 1.0 |
| | 2 | 0.90 | 0.9 | 0.9 | | 0.9 |
| | 3 | 0.85 | 0.85 | 0.8 | | 0.8 |
| | 4 | | | 0.7 | | 0.7 |
| | 5 | | | 0.6 | | 0.6 |
| | 6 | | | 0.5 | | 0.5 |
| | 7 | | | 0.45 | | 0.4 |
| | 8 | | | 0.4 | | |
| Lower limit | 1 | 0.10 | 0.1 | 0 | 0.75 | 0 |
| | 2 | 0.30 | 0.3 | 0.1 | 0.8 | 0.05 |
| | 3 | 0.40 | 0.4 | 0.15 | 0.85 | 0.1 |
| | 4 | 0.50 | 0.5 | 0.2 | 0.9 | 0.15 |
| | 5 | 0.60 | 0.6 | 0.25 | 0.95 | 0.2 |
| | 6 | 0.65 | 0.65 | 0.3 | 1 | 0.25 |
| | 7 | 0.70 | 0.7 | | | |
| | 8 | 0.75 | 0.75 | | | |

$ZnO+3ZrO_2+5TaO_{2.5}$, the combined sum of the Zn content, three times the $ZrO_2$ content, and 5 five times the $TaO_{2.5}$ content, is an indicator of the maintenance of low dispersion by controlling the quantities of high dispersion components that desirably falls within a range of 0 to 60.0. The effect of lowering the νd of a glass by incorporating Zn, Zr, and Ta into the glass is 1 for Zn, 3 for Zr, and 5 for Ta per atomic percent. Accordingly, the sum of $ZnO+3ZrO_2+5TaO_{2.5}$ is approximately linked to the νd of the glass, so the magnitude of this indicator is an indicator of how low the dispersion is. It is also possible to include indicators such as W, Nb, and Ti that lower dispersion even more than Ta. However, as set forth above, the incorporation of large quantities of W, Nb, and Ti is undesirable. From such perspectives, the upper and lower limits of $ZnO+3ZrO_2+5TaO_{2.5}$ are suitably set as indicated below for the basic forms and Forms A, B, C, and D of the present invention. The value of $ZnO+3ZrO_2+5TaO_{2.5}$ can be suitably set by adjusting the quantities of components ZnO, $ZrO_2$, and $TaO_{2.5}$ that are incorporated into the optical glass.

TABLE 1-29

$ZnO + 3ZrO_2 + 5TaO_{2.5}$

| Form | | Basic | A | B | C | D |
|---|---|---|---|---|---|---|
| Upper limit | 1 | 60.0 | 40 | 60 | 12 | 80 |
| | 2 | 40.0 | 30 | 50 | 8 | 70 |
| | 3 | 30.0 | 25 | 46 | 5 | 65 |
| | 4 | 25.0 | 22 | 43 | 3 | 60 |
| | 5 | 22.0 | 21 | 40 | 2 | 55 |
| | 6 | 21.0 | 20.5 | 39 | 1 | |
| | 7 | 20.5 | 20 | 38.5 | 0 | |
| | 8 | 20.0 | | 38 | | |
| Lower limit | 1 | 0.0 | 0 | | | 30 |
| | 2 | 1.0 | 1 | 10 | | 35 |
| | 3 | 6.0 | 6 | 20 | | 40 |
| | 4 | 10.0 | 10 | 30 | | 45 |
| | 5 | 14.0 | 14 | 34 | | 50 |
| | 6 | 16.0 | 16 | 36 | | |
| | 7 | 18.0 | 18 | 36.5 | | |

The glass transition temperature Tg (° C.) is an indicator of the degree of difficulty of precision press molding that desirably falls within a range of 200 to 590° C. A low glass transition temperature permits a low press molding temperature. It can be measured with a differential thermal analyzer DSC. From such perspectives, the upper and lower limits of the glass transition temperature Tg (° C.) are suitably set as indicated below for the basic forms and Forms A, B, C, and D of the present invention. The glass transition temperature Tg (° C.) can be suitably set primarily by adjusting the quantities of the components $LiO_{0.5}$, ZnO, and F that are incorporated into the optical glass. Further, microadjustment is possible by adjusting the quantities of the components $SiO_2$ and $TaO_{2.5}$ that are incorporated into the optical glass.

TABLE 2-1

Glass transition temperature Tg (° C.)

| Form | | Basic | A | B | C | D |
|---|---|---|---|---|---|---|
| Upper limit | 1 | 590 | 580 | 590 | 600 | 590 |
| | 2 | 580 | 575 | 580 | 590 | 580 |
| | 3 | 575 | 570 | 575 | 580 | 570 |
| | 4 | 570 | 565 | 570 | 575 | 565 |
| | 5 | 565 | 560 | 565 | 570 | 560 |
| | 6 | 560 | 555 | 560 | 565 | |
| | 7 | 555 | 550 | 555 | 560 | |
| | 8 | 550 | 540 | 550 | | |
| | 9 | 540 | | 540 | | |
| Lower limit | 1 | 200 | 200 | 200 | 200 | 200 |
| | 2 | 300 | 300 | 300 | 300 | 300 |
| | 3 | 400 | 400 | 400 | 400 | 400 |
| | 4 | | | | 500 | |
| | 5 | | | | 530 | |

The liquidus temperature LT (° C.) is an indicator of glass stability that desirably falls within a range of 500 to 1,140° C. The minimum temperature at which no precipitation of crystals is observed when a glass melt is maintained in a furnace is defined as the liquidus temperature (LT). The liquidus temperature LT (° C.) (when the furnace temperature is set in increments of 10° C.) can be measured by placing 30 cc of glass in a platinum crucible, melting the glass for 10 to 20 minutes in a furnace at 1,200 to 1,250° C., homogenizing the melt by stirring, cooling the obtained glass in the crucible to below the glass transition temperature Tg, placing a platinum cover on the crucible, and maintaining the crucible in a furnace set to 1,050 to 1,140° C. for two hours to observe the crystals precipitating on the surface of the glass, within the glass, and at the interface of the glass and the inner wall of the crucible. From such a perspective, the upper and lower limits of the liquidus temperature LT (° C.) are suitably set as indicated below for the basic forms and Forms A, B, C, and D of the present invention. The liquidus temperature LC (° C.) can be suitably set by adjusting the quantities of components that are incorporated into the optical glass, such as $BO_{1.5}$ and $SiO_2$, to enhance the thermal stability of the glass. The liquidus temperature can be lowered by improving the thermal stability of the glass. Within the composition ranges of the various forms, the liquidus temperature of the glass tends to decrease with improvement in thermal stability.

TABLE 2-2

| | | Liquidus temperature LT (° C.) | | | | |
|---|---|---|---|---|---|---|
| Form | | Basic | A | B | C | D |
| Upper limit | 1 | 1150 | 1120 | 1140 | 1120 | 1140 |
| | 2 | 1120 | 1100 | 1120 | 1100 | 1120 |
| | 3 | 1100 | 1090 | 1100 | 1090 | 1100 |
| | 4 | 1090 | 1080 | 1090 | 1080 | 1090 |
| | 5 | 1080 | 1070 | 1080 | 1070 | 1080 |
| | 6 | 1070 | 1060 | 1070 | 1060 | 1070 |
| | 7 | 1060 | 1050 | 1060 | 1050 | 1060 |
| | 8 | 1050 | | 1050 | | 1050 |
| Lower limit | 1 | 500 | 500 | 500 | 500 | 500 |
| | 2 | 600 | 600 | 600 | 600 | 600 |
| | 3 | 700 | | 700 | 700 | 700 |
| | 4 | | | | | 800 |

λ(lambda) 80, λ70, and λ5 (nm) are wavelengths (nm) at which 80 percent, 70 percent, and 5 percent transmittance to the exterior, respectively, are exhibited by a sample 10 mm in thickness. From the perspective of inhibiting specific wavelength dependence in a particular glass, at a minimum, the external transmittance from λ80 to 1,550 nm is desirably not lowered to 25 percent or below, preferably 50 percent or below, more preferably 70 percent or below, still more preferably 75 percent or below, and yet more preferably, 80 percent or below. The external transmittance at λ80, λ70, λ5 (nm), and the wavelength range of λ80 to 1,555 nm, can be suitably adjusted by adjusting the quantities of various components with different ultraviolet absorption edges that are incorporated into an optical glass; limiting the quantities of impurities in the form of such color-producing elements as Fe, Cr, Mn, Co, and Ni; incorporating various oxidizing gas components ($NO_3$ and the like); and reducing gas components ($NH_4$ and the like). Thus, it is desirable not to incorporate any Fe, Cr, Mn, Co, or Ni, and to limit the quantities of impurities in the form of Fe, Cr, Mn, Co, and Ni that are mixed in.

TABLE 2-3

| | | λ80 | | | |
|---|---|---|---|---|---|
| Form | Basic | A | B | C | D |
| Upper limit 1 | | 450 | 450 | 450 | 550 |
| 2 | | 400 | 400 | 400 | 500 |
| 3 | | 380 | 380 | 380 | 470 |
| 4 | | | | | 450 |
| Lower limit 1 | | 300 | 300 | 300 | 350 |
| 2 | | 330 | 330 | 330 | 370 |
| 3 | | 350 | 350 | 350 | 400 |

TABLE 2-4

| | | λ70 | | | |
|---|---|---|---|---|---|
| Form | Basic | A | B | C | D |
| Upper limit 1 | | 450 | 450 | 450 | 500 |
| 2 | | 400 | 400 | 400 | 450 |
| 3 | | 370 | 370 | 370 | 400 |
| 4 | | | | | 370 |
| Lower limit 1 | | 250 | 250 | 250 | 300 |
| 2 | | 300 | 300 | 300 | 330 |
| 3 | | 320 | 320 | 320 | 350 |
| | | | | | 350 |

TABLE 2-5

| | | λ5 | | | |
|---|---|---|---|---|---|
| Form | Basic | A | B | C | D |
| Upper limit 1 | | 350 | 350 | 350 | 450 |
| 2 | | 320 | 320 | 320 | 400 |
| 3 | | 290 | 290 | 290 | 350 |
| Lower limit 1 | | 200 | 200 | 200 | 250 |
| 2 | | 250 | 250 | 250 | 300 |
| 3 | | 270 | 270 | 270 | 320 |
| | | | | | 330 |

The value (kinematic viscosity) ($10^{-4}$ $m^2/s$=St) obtained by dividing the viscosity at the liquidus temperature by the density at room temperature is an indicator of the moldability of the glass melt that desirably falls within a range of 0.20 to 1,000 (St). It is obtained by dividing the viscosity at the liquidus temperature, $\eta(eta)_{LT}(P)$ by the specific gravity (g/cc). It corresponds to the flow rate as the glass flows out of a pipe or the like under its own weight, and serves as a yardstick of the ease with which the glass melt can be molded. Considering the specific gravity of the glass facilitates comparison of glasses with different specific gravities and their flow rates. From such perspectives, the upper and lower limits of the value obtained by dividing the viscosity at the liquidus temperature by the density at room temperature are suitably set as indicated below. The value of the kinematic viscosity can be suitably set by adjusting the quantities of the various components that are incorporated into the optical glass, such as $BO_{1.5}$, which has the effect of improving the thermal stability of the glass, and $SiO_2$, which has the effects of increasing the viscosity of the glass while similarly improving the thermal stability of the glass. Improving the thermal stability of the glass lowers the liquidus temperature and increases the viscosity at the liquidus temperature. As compared to rare earth components, $BO_{1.5}$ and $SiO_2$ have the additional function of reducing the specific gravity of the glass. Thus, increasing the quantities of $BO_{1.5}$ and $SiO_2$ that are incorporated increases the kinematic viscosity.

TABLE 2-6

| | | Kinematic viscosity at liquidus temperature (St) | | | | |
|---|---|---|---|---|---|---|
| Form | | Basic | A | B | C | D |
| Upper limit | 1 | 1000 | 30 | 30 | 30 | 30 |
| | 2 | 300 | 10 | 10 | 10 | 10 |
| | 3 | 100 | 3 | 3 | 3 | 3 |
| | 4 | 30 | 1 | 1 | 1 | 1 |
| | 5 | 10 | | | | |
| | 6 | 3 | | | | |
| | 7 | 1 | | | | |
| | 8 | | | | | |
| Lower limit | 1 | 0.2 | 0.4 | 0.4 | 0.4 | 0.2 |
| | 2 | 0.4 | 0.5 | 0.5 | 0.5 | 0.4 |
| | 3 | 0.5 | 0.55 | 0.55 | 0.55 | 0.5 |
| | 4 | 0.55 | 0.6 | 0.6 | 0.6 | 0.55 |
| | 5 | 0.6 | 0.65 | 0.65 | 0.65 | 0.6 |
| | 6 | 0.65 | 0.7 | 0.7 | 0.7 | 0.65 |
| | 7 | 0.7 | 0.75 | 0.75 | 0.75 | 0.7 |
| | 8 | 0.75 | | 0.8 | 0.8 | 0.8 |

The quantity of glass flowing per unit time, that is, the flow rate, is proportional to the density of the glass and is inversely proportional to the viscosity of the glass. Accordingly, the inverse of the value of the kinematic viscosity is proportional to the flow rate. Thus, the inverse of the kinematic viscosity is an indicator of the flow rate.

Figure 6:
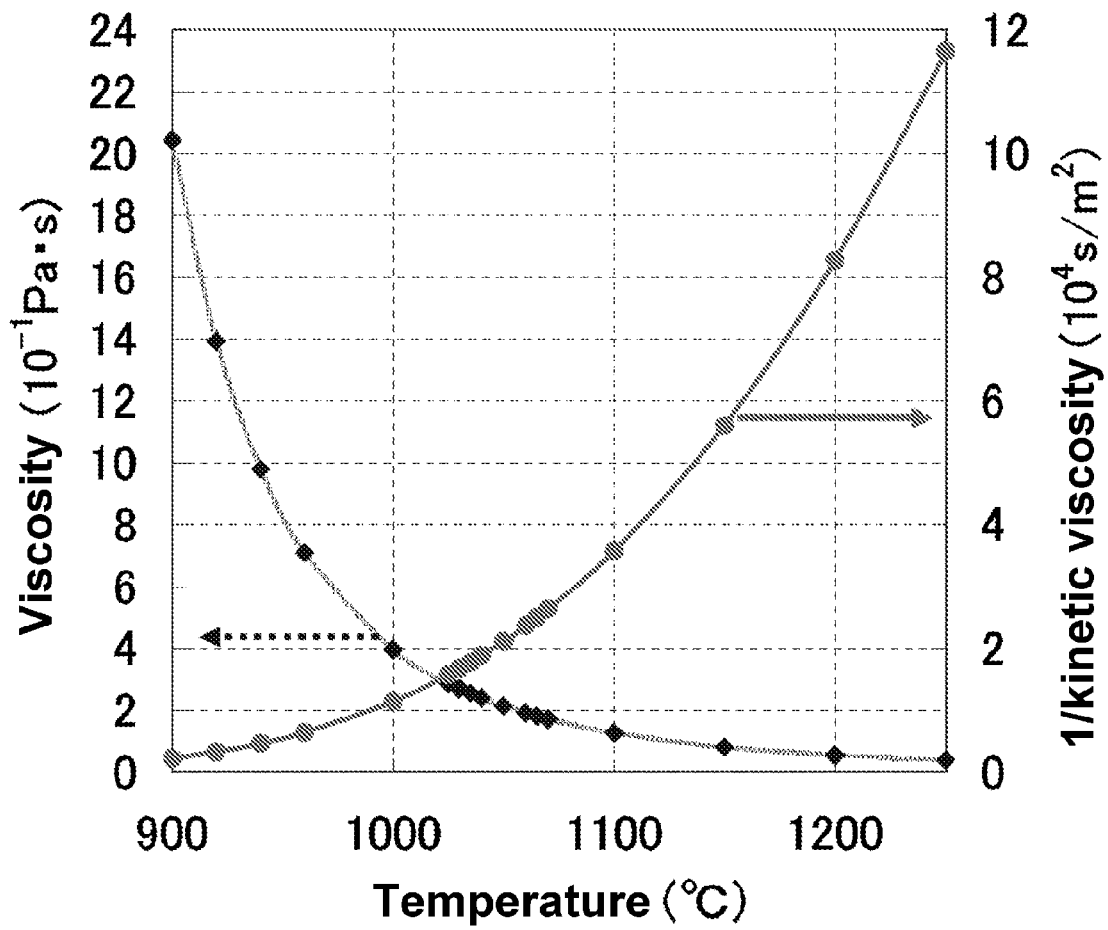
FIG. 6 shows change in the inverse of kinematic viscosity and change in viscosity corresponding to change in temperature in an example (Example 8 (nd=1.72686, vd=54.41) of Form C (Table 5)) of the optical glass of the present invention, with the horizontal axis denoting temperature, the left vertical axis denoting the viscosity of the glass, and the right vertical axis denoting the inverse of kinematic viscosity, an index of the flow rate.

FIG. 6 shows the change in the inverse of the kinematic viscosity and the change in the viscosity relative to the change in temperature in an example of the optical glass of the present invention, with temperature being denoted by the horizontal axis, viscosity of the glass being denoted by the left vertical axis, and the inverse of the kinematic viscosity, that is, an indicator of the flow rate, being denoted by the right vertical axis.

In FIG. 6, it will be understood that the amount of increase in the indicator of the flow rate (the inverse of the kinematic viscosity) due to a decrease of 1 dPa·s in viscosity was small in the region of relatively high viscosity (such as a viscosity of equal to or greater than 10 dPa·s, that is, at equal to or below 940° C.).

However, in the region of relatively low viscosity (such as a viscosity of 5 dPa·s, 3 dPa·s, or the like), the amount of increase in the indicator of the flow rate (the inverse of the kinematic viscosity) due to a decrease of 1 dPa·s in viscosity increased. Thus, even for a difference in the viscosity value of just 0.5 or 1.0 dPa·s, the corresponding change in the flow rate was substantial, greatly affecting glass moldability. In glasses with a liquidus temperature exceeding 1,050° C., or of 1,100° C. or higher, that is, in glasses in which the viscosity at the liquidus temperature is low like above, the reason a change of just 10° C. in liquidus temperature greatly affects moldability is due to such facts.

TABLE 2-7

| | | Viscosity at liquidus temperature (dPa·s) | | | | |
|---|---|---|---|---|---|---|
| Form | | Basic | A | B | C | D |
| Upper limit | 1 | 5000 | 5000 | 5000 | 5000 | 5000 |
| | 2 | 1500 | 1500 | 1500 | 1500 | 1500 |
| | 3 | 500 | 500 | 500 | 500 | 500 |
| | 4 | 150 | 150 | 150 | 150 | 150 |
| | 5 | 50 | 50 | 50 | 50 | 50 |
| | 6 | 15 | 15 | 15 | 15 | 15 |
| | 7 | 5 | 5 | 5 | 5 | 5 |

TABLE 2-7-continued

| | | Viscosity at liquidus temperature (dPa·s) | | | | |
|---|---|---|---|---|---|---|
| Form | | Basic | A | B | C | D |
| Lower limit | 1 | 1 | 1 | 1 | 1 | 1 |
| | 2 | 2 | 2 | 2 | 2 | 2 |
| | 3 | 2.5 | 2.5 | 2.5 | 2.5 | 2.5 |
| | 4 | 2.75 | 2.75 | 2.75 | 2.75 | 2.75 |
| | 5 | 3 | 3 | 3 | 3 | 3 |
| | 6 | 3.25 | 3.25 | 3.25 | 3.25 | 3.25 |
| | 7 | 3.5 | 3.5 | 3.5 | 3.5 | 3.5 |
| | 8 | 3.75 | 3.75 | 3.75 | 3.75 | 3.75 |

When the viscosity is low at the liquidus temperature, problems tend to occur in that striae tend to form, it becomes difficult to control the flow of glass, and the like. When the viscosity is high at the liquidus temperature, the glass flow rate drops, productivity decreases, or the holding time of the glass melt in the melting furnace becomes excessively long, causing variation in various characteristics.

The optical glass of the present invention is suited to lenses with large diameters that are employed in single-lens reflex cameras and the like. Thus, a low specific gravity is desirable. From such perspectives, the upper and lower limits of the specific gravity are suitably set as indicated below. The specific gravity can be measured by Archimedes' method. The specific gravity can be suitably set by adjusting the quantities of various components of relatively low molecular weight, such as $BO_{1.5}$ and $SiO_2$, and rare earth components of relatively high molecular weight that are incorporated into the optical glass.

TABLE 2-8

| | | Specific gravity | | | | |
|---|---|---|---|---|---|---|
| Form | | Basic | A | B | C | D |
| Upper limit | 1 | 6.00 | | 6 | 5.30 | 6 |
| | 2 | 5.50 | 5.5 | 5.8 | 5.10 | 5.9 |
| | 3 | 5.30 | 5.30 | 5.6 | 5.00 | 5.8 |
| | 4 | 5.10 | 5.10 | 5.5 | 4.90 | 5.7 |
| | 5 | 5.00 | 5.00 | 5.4 | 4.80 | 5.6 |
| | 6 | 4.90 | 4.90 | 5.3 | 4.70 | |
| | 7 | 4.80 | 4.80 | 5.2 | 4.60 | |
| | 8 | 4.70 | 4.70 | 5.1 | 4.5 | |
| Lower limit | 1 | 2.0 | 2.0 | 2 | 2.0 | |
| | 2 | 3.0 | 3.0 | 3 | 3.0 | 4 |
| | 3 | 4.0 | 4.0 | 4 | 3.5 | 4.5 |
| | 4 | 4.5 | 4.5 | 4.5 | 3.8 | 5 |
| | 5 | 4.6 | 4.6 | 5 | 4.0 | |

The degrees of the refractive index and dispersion: $nd-(2.25-0.01\times vd)$

The optical glass of the present invention is of high refractive index and low dispersion. The degrees thereof are desirably a refractive index that lies above and a dispersion that lies below a line drawn connecting (nd, vd)=(1.80, 45) and (1.75, 50) in a plot of nd–vd in which nd is denoted by the horizontal axis and vd is denoted by the vertical axis. Further, a certain quantity of glass forming components is required to maintain moldability of the glass. Thus, glass compositions in which the refractive index is so high and the dispersion so low that glass moldability is lost are undesirable. From such perspectives, the upper and lower limits of $nd-(2.25-0.01\times vd)$ are suitably set as indicated below for the basic forms and Forms A, B, C, and D of the present invention. $nd-(2.25-0.01\times vd)$ can be computed from the refractive index nd and the Abbé number vd. The value of $nd-(2.25-0.01\times vd)$ increases with the quantity of rare earth components and decreases with increases in the quantities of $BO_{1.5}$, ZnO, $ZrO_2$, $TaO_{2.5}$, and the like, and can thus be suitably set by adjusting the quantities of these components that are incorporated into the optical glass.

TABLE 2-9 nd – (2.25 – 0.01 × vd)

| Form | | Basic | A | B | C | D |
|---|---|---|---|---|---|---|
| Upper limit | 1 | 0.050 | 0.040 | 0.040 | 0.040 | 0.040 |
| | 2 | 0.040 | 0.030 | 0.030 | 0.030 | 0.030 |
| | 3 | 0.030 | 0.025 | 0.025 | 0.025 | 0.025 |
| | 4 | 0.025 | 0.022 | 0.022 | 0.022 | 0.022 |
| | 5 | 0.022 | 0.020 | 0.021 | | 0.019 |
| | 6 | 0.020 | | 0.020 | | 0.016 |
| | 7 | | | | | 0.014 |
| | 8 | | | | | 0.013 |
| Lower limit | 1 | | −0.010 | −0.010 | −0.010 | −0.010 |
| | 2 | | −0.005 | −0.005 | −0.005 | −0.005 |
| | 3 | 0.000 | 0.000 | 0.000 | 0.000 | 0.000 |
| | 4 | 0.005 | 0.005 | 0.005 | 0.005 | 0.002 |
| | 5 | 0.008 | 0.008 | 0.010 | 0.008 | 0.004 |
| | 6 | 0.010 | 0.010 | 0.012 | 0.010 | 0.006 |
| | 7 | 0.012 | 0.012 | 0.014 | 0.012 | 0.008 |
| | 8 | 0.013 | 0.013 | 0.016 | 0.013 | 0.009 |
| | 9 | 0.014 | 0.014 | 0.017 | 0.014 | |
| | 10 | 0.015 | | 0.018 | 0.015 | |

The shift away from the stoichiometric ratio (oxygen+fluorine/2)/cations (molar ratio)

Fluorine ions are primarily introduced into the glass by replacing a certain cationic percentage of oxides with fluorides. In this process, to inhibit coloration and the like due to lattice defects typified by oxygen defects and cation defects in the glass, the cations and anions in the glass are desirably introduced in a form that maintains charge neutrality in the glass. Accordingly, components employed to manufacture the glass are desirably incorporated so as to maintain the stoichiometric ratio of the glass by replacing one oxygen atom with two fluorine atoms, and so forth. From such perspectives, the upper and lower limits of the shift in the stoichiometric ratio are suitably set as indicated below. It can be calculated from the molar percentage of oxygen ions, the molar percentage of fluorine ions, and the total of cationic percentage. The shift away from the stoichiometric ratio can be suitably set by incorporating various oxidizing gas components (such as $NO_3$), reducing gas components (such as $NH_4$), and the like when transition metal oxides (such as $ZrO_2$, $TaO_{2.5}$, $TiO_2$, $NbO_{2.5}$, and $WO_3$) are being incorporated. Almost no shift away from the stoichiometric ratio occurs when incorporating typical metal oxides.

TABLE 2-10

| Desirable upper limit | Stoichiometric ratio ± 0.1 |
|---|---|
| Preferable upper limit | Stoichiometric ratio ± 0.05 |
| More preferable upper limit | Stoichiometric ratio ± 0.01 |
| Still more preferable upper limit | Substantially equal to stoichiometric ratio |

The molar percentage of oxygen ions defines the unit oxygen number (for example: the oxygen number of $BO_{1.5}$ is 1.5) per cation contained in the chemical formula of each component for introducing cations. The oxygen ion/cation (molar ratio) is the cationic percentages in the glass multiplied by the sum of the unit oxygen, divided by the sum of the cationic percentages, expressed as a percentage. Similarly, the molar percentage of fluorine ions is the sum of the ion percentages of the fluorine incorporated into the glass, divided by the sum of the cationic percentages, expressed as a percentage. From such perspectives, the upper and lower limits are suitably set as indicated below. They can be calculated from the molar percentage of oxygen ions and from the cationic percentages. The oxygen ion/cation (molar ratio) can be suitably set by incorporating various oxidizing gas components (such as $NO_3$), reducing gas components (such as $NH_4$), and the like when incorporating glass components in the form of transition metal oxides (such as $ZrO_2$, $TaO_{2.5}$, $TiO_2$, $NbO_{2.5}$, and $WO_3$). The oxygen ion/cation (molar ratio) increases with the quantity of cations of high valence that are included among the glass components, but tends to decrease as the F/O ratio increases.

TABLE 2-11

Oxygen ion/cation (molar ratio)

| Form | | Basic | A | B | C | D |
|---|---|---|---|---|---|---|
| Upper limit | 1 | 2.0 | 2.0 | 2.0 | 2.0 | 2.0 |
| | 2 | 1.8 | 1.8 | 1.8 | 1.8 | 1.8 |
| | 3 | 1.7 | 1.7 | 1.7 | 1.7 | 1.7 |
| | 4 | 1.6 | 1.6 | 1.6 | 1.6 | 1.6 |
| | 5 | 1.5 | 1.5 | 1.5 | 1.5 | 1.5 |
| Lower limit | 1 | 0.5 | 0.5 | 0.5 | 0.5 | 0.5 |
| | 2 | 0.8 | 0.8 | 0.8 | 0.8 | 0.8 |
| | 3 | 1.0 | 1.0 | 1.0 | 1.0 | 1.0 |
| | 4 | 1.1 | 1.1 | 1.1 | 1.1 | 1.1 |
| | 5 | 1.2 | 1.2 | 1.2 | 1.2 | 1.2 |
| | 6 | 1.3 | 1.3 | 1.3 | 1.3 | 1.3 |

The change in nd over time: $\Delta(DELTA)nd(/hr)$

The change in the refractive index over time is a measurement value obtained from various measured values of the refractive index and a sampling time interval by sampling the glass melt during melting, measuring the refractive index nd of the glass sample, allowing a prescribed interval of time to elapse following the sampling, sampling the glass melt again, measuring the refractive index nd of the glass sample, and repeating this operation. The change in the refractive index over time can be reduced by reducing excess B—O—B bonds and reducing $BO_{1.5} \times F/O$, which is the quantity of volatile components. From such perspectives, the upper and lower limits of the change in the refractive index over time, $\Delta nd(/hr)$, are suitably set as indicated below. The change in nd over time is caused by the change, albeit slight, in the glass composition due to volatilization from the glass melt Inhibiting this volatilization can reduce the change in refractive index nd over time. The level of volatilization can be adjusted by adjusting the quantities of various components incorporated into the optical glass, including $BO_{1.5}$ and F. The quantities of $BO_{1.5}$ and F that are incorporated into the optical glass have the greatest effect on the level of volatilization.

TABLE 2-12

| Form | | Basic | A | B | C | D |
|---|---|---|---|---|---|---|
| Upper limit | 1 | 0.00200 | 0.00200 | 0.00200 | 0.00200 | 0.00200 |
| | 2 | 0.00100 | 0.00100 | 0.00100 | 0.00100 | 0.00100 |
| | 3 | 0.00080 | 0.00080 | 0.00080 | 0.00080 | 0.00080 |
| | 4 | 0.00060 | 0.00060 | 0.00060 | 0.00060 | 0.00060 |
| | 5 | 0.00040 | 0.00040 | 0.00040 | 0.00040 | 0.00040 |
| | 6 | 0.00030 | 0.00030 | 0.00030 | 0.00030 | 0.00030 |
| | 7 | 0.00020 | 0.00020 | 0.00020 | 0.00020 | 0.00020 |
| | 8 | 0.00010 | 0.00010 | 0.00010 | 0.00010 | 0.00010 |
| | 9 | 0.00005 | 0.00005 | 0.00005 | 0.00005 | 0.00005 |
| Lower limit | 1 | 0.00000 | 0.00000 | 0.00000 | 0.00000 | 0.00000 |

The change in Tg over time: $\Delta(DELTA)Tg$ (° C./hr)

The change in Tg over time is a measurement value obtained from various measured values of the glass transition temperature Tg and a sampling time interval by sampling the glass melt during melting, measuring the glass transition temperature Tg of the glass sample, allowing a prescribed interval of time to elapse following the sampling, sampling the glass melt again, measuring the glass transition temperature Tg of the glass sample, and repeating this operation. The change in Tg over time can be reduced by reducing excess B—O—B bonds and reducing $BO_{1.5} \times F/O$, which is the quantity of volatile components. From such perspectives, the upper and lower limits of the change in Tg over time, ΔTg (° C./hr), are suitably set as indicated below. The change in Tg over time is caused by the change, albeit slight, in the glass composition due to volatilization from the glass melt Inhibiting this volatilization can reduce the change in the glass transition temperature Tg over time. The level of volatilization can be adjusted by adjusting the quantities of various components incorporated into the optical glass, including $BO_{1.5}$ and F. The quantities of $BO_{1.5}$ and F that are incorporated into the optical glass have the greatest effect on the level of volatilization.

TABLE 2-13

| Form | | Basic | A | B | C | D |
|---|---|---|---|---|---|---|
| Upper limit | 1 | 5 | 5 | 5 | 5 | 5 |
| | 2 | 3 | 3 | 3 | 3 | 3 |
| | 3 | 2 | 2 | 2 | 2 | 2 |
| | 4 | 1 | 1 | 1 | 1 | 1 |
| | 5 | 0.8 | 0.8 | 0.8 | 0.8 | 0.8 |
| | 6 | 0.5 | 0.5 | 0.5 | 0.5 | 0.5 |
| | 7 | 0.3 | 0.3 | 0.3 | 0.3 | 0.3 |
| | 8 | 0.1 | 0.1 | 0.1 | 0.1 | 0.1 |
| Lower limit 1 | | 0.00000 | 0.00000 | 0.00000 | 0.00000 | 0.00000 |

The change in specific gravity over time: Δ(DELTA)specific gravity(/hr)

The change in specific gravity over time is a measurement value obtained from various measured values of the specific gravity and a sampling time interval by sampling the glass melt during melting, measuring the specific gravity of the glass sample, allowing a prescribed interval of time to elapse following the sampling, sampling the glass melt again, measuring the specific gravity of the glass sample, and repeating this operation. The change in specific gravity over time can be reduced by reducing excess B—O—B bonds and reducing $BO_{1.5} \times F/O$, which is the quantity of volatile components. From such perspectives, the upper and lower limits of the change in specific gravity over time, Δspecific gravity(/hr), are suitably set as indicated below. The change in specific gravity over time is caused by the change, albeit slight, in the glass composition due to volatilization from the glass melt Inhibiting this volatilization can reduce the change in specific gravity over time. The level of volatilization can be adjusted by adjusting the quantities of various components incorporated into the optical glass, including $BO_{1.5}$ and F. The quantities of $BO_{1.5}$ and F that are incorporated into the optical glass have the greatest effect on the level of volatilization.

TABLE 2-14

| Form | | Basic | A | B | C | D |
|---|---|---|---|---|---|---|
| Upper limit | 1 | 0.01 | 0.01 | 0.01 | 0.01 | 0.01 |
| | 2 | 0.008 | 0.008 | 0.008 | 0.008 | 0.008 |
| | 3 | 0.005 | 0.005 | 0.005 | 0.005 | 0.005 |
| | 4 | 0.003 | 0.003 | 0.003 | 0.003 | 0.003 |
| | 5 | 0.002 | 0.002 | 0.002 | 0.002 | 0.002 |
| | 6 | 0.0015 | 0.0015 | 0.0015 | 0.0015 | 0.0015 |
| | 7 | 0.001 | 0.001 | 0.001 | 0.001 | 0.001 |
| | 8 | 0.0005 | 0.0005 | 0.0005 | 0.0005 | 0.0005 |
| Lower limit 1 | | 0.00000 | 0.00000 | 0.00000 | 0.00000 | 0.00000 |

The change in the liquidus temperature over time: Δ(DELTA) LT(° C./hr)

The change in the liquidus temperature over time is a measurement value obtained from various measured values of the liquidus temperature and a sampling time interval by sampling the glass melt during melting, measuring the liquidus temperature of the glass sample, allowing a prescribed interval of time to elapse following the sampling, sampling the glass melt again, measuring the liquidus temperature of the glass sample, and repeating this operation. The change in liquidus temperature over time can be reduced by reducing excess B—O—B bonds and reducing $BO_{1.5} \times F/O$, which is the quantity of volatile components. From such perspectives, the upper and lower limits of the change in liquidus temperature over time, ΔLT (° C./hr), are suitably set as indicated below. The change in liquidus temperature over time is caused by the change, albeit slight, in the glass composition due to volatilization from the glass melt Inhibiting this volatilization can reduce the change in the liquidus temperature over time. The level of volatilization can be adjusted by adjusting the quantities of various components incorporated into the optical glass, including $BO_{1.5}$ and F. The quantities of $BO_{1.5}$ and F that are incorporated into the optical glass have the greatest effect on the level of volatilization.

TABLE 2-15

| Form | | Basic | A | B | C | D |
|---|---|---|---|---|---|---|
| Upper limit | 1 | 10 | 10 | 10 | 10 | 10 |
| | 2 | 8 | 8 | 8 | 8 | 8 |
| | 3 | 6 | 6 | 6 | 6 | 6 |
| | 4 | 4 | 4 | 4 | 4 | 4 |
| | 5 | 3 | 3 | 3 | 3 | 3 |
| | 6 | 2 | 2 | 2 | 2 | 2 |
| | 7 | 1 | 1 | 1 | 1 | 1 |
| Lower limit 1 | | 0.00000 | 0.00000 | 0.00000 | 0.00000 | 0.00000 |

The change in kinematic viscosity over time: Δ(DELTA)kinematic viscosity ($m^3$/s/hr)

The change in the kinematic viscosity over time is a measurement value obtained from various measured values of the kinematic viscosity and a sampling time interval by sampling the glass melt during melting, measuring the kinematic viscosity of the glass sample, allowing a prescribed interval of time to elapse following the sampling, sampling the glass melt again, measuring the kinematic viscosity of the glass sample, and repeating this operation. The change in kinematic viscosity over time can be reduced by reducing excess B—O—B bonds and reducing $BO_{1.5} \times F/O$, which is the quantity of volatile components. From such perspectives, the upper and lower limits of the change in kinematic viscosity over time, Δkinematic viscosity ($m^3$/s/hr), are suitably set as indicated below. The change in kinematic viscosity over time is caused by the change, albeit slight, in the glass composition due to volatilization from the glass melt Inhibiting this volatilization can reduce the change in the kinematic viscosity over time. The level of volatilization can be adjusted by adjusting the quantities of various components incorporated into the optical glass, including $BO_{1.5}$ and F. The quantities of $BO_{1.5}$ and F that are incorporated into the optical glass have the greatest effect on the level of volatilization.

TABLE 2-16

| Form | | Basic | A | B | C | D |
|---|---|---|---|---|---|---|
| Upper limit | 1 | 1.0 | 1.0 | 1.0 | 1.0 | 1.0 |
| | 2 | 0.8 | 0.8 | 0.8 | 0.8 | 0.8 |
| | 3 | 0.6 | 0.6 | 0.6 | 0.6 | 0.6 |
| | 4 | 0.4 | 0.4 | 0.4 | 0.4 | 0.4 |
| | 5 | 0.2 | 0.2 | 0.2 | 0.2 | 0.2 |
| | 6 | 0.1 | 0.1 | 0.1 | 0.1 | 0.1 |
| | 7 | 0.05 | 0.05 | 0.05 | 0.05 | 0.05 |
| | 8 | 0.02 | 0.02 | 0.02 | 0.02 | 0.02 |
| | 9 | 0.01 | 0.01 | 0.01 | 0.01 | 0.01 |
| Lower limit | 1 | 0.00000 | 0.00000 | 0.00000 | 0.00000 | 0.00000 |

The refractive index in the present invention is represented by the refractive index nd in the d line. The fraction is represented by the Abbé number, vd.

The lower limit of the refractive index in the first and second basic forms of the present invention is, in order of increasing desirability, 1.70, 1.73, 1.75, 1.76, and 1.765. Achieving a high refractive index facilitates the achievement of high functionality and compactness in optical elements. The upper limit of the refractive index nd in the first and second basic forms of the present invention is, in order of increasing desirability, 1.90, 1.87, 1.83, 1.81, 1.79, and 1.78. Not employing an excessively high refractive index facilitates the maintaining of a low glass transition temperature and the maintaining of a glass with good thermal stability.

The lower limit of the Abbé number vd in the first and second basic forms of the present invention is, in order of increasing desirability, 36, 39, 43, 46, 48, 49, and 49.3. The use of a glass with low dispersion permits the realization of an optical glass that is better suited to the correction of chromatic aberration. The lower upper limit of the Abbé number vd in basic optical glasses of the first and second forms of the present invention is, in order of increasing desirability, 55, 54, 53, 52, 51, 50.5, 50, and 49.8. This is because an excessively high Abbé number tends to make it difficult to maintain the thermal stability of the glass and low glass transition temperature characteristics.

Form A is an optical glass having a refractive index nd of 1.75 to 1.81 and an Abbé number vd of 48 to 52.

Form B is an optical glass having a refractive index nd of 1.79 to 1.835 and an Abbé number vd of 42 to 48.

Form C is an optical glass having a refractive index nd of 1.675 to 1.76 and an Abbé number vd of 51 to 58.

Form D is an optical glass having a refractive index nd of 1.825 to 1.90 and an Abbé number vd of 35 to 43.

Desirable refractive indexes nd and Abbé numbers vd for the various forms are indicated below.

TABLE 2-17

| | | Refractive index nd | | | |
|---|---|---|---|---|---|
| Form | | A | B | C | D |
| Upper limit | 1 | 1.81 | 1.835 | 1.76 | 1.90 |
| | 2 | 1.80 | 1.825 | 1.755 | 1.895 |
| | 3 | 1.795 | 1.82 | 1.75 | 1.89 |
| | 4 | 1.79 | 1.815 | 1.745 | 1.885 |
| | 5 | 1.785 | 1.81 | 1.74 | |
| | 6 | 1.78 | 1.805 | 1.735 | |
| Lower limit | 1 | 1.750 | 1.79 | 1.675 | 1.825 |
| | 2 | 1.755 | 1.795 | 1.680 | 1.83 |
| | 3 | 1.76 | 1.8 | 1.690 | 1.835 |
| | 4 | 1.765 | 1.802 | 1.700 | 1.84 |
| | 5 | | 1.803 | 1.710 | 1.845 |
| | 6 | | | 1.720 | 1.855 |
| | 7 | | | 1.725 | 1.865 |
| | 8 | | | | 1.875 |

TABLE 2-18

| | | Abbé number vd | | | |
|---|---|---|---|---|---|
| Form | | A | B | C | D |
| Upper limit | 1 | 52.0 | 48 | 58.0 | 43.0 |
| | 2 | 51.0 | 47.5 | 57.0 | 42.0 |
| | 3 | 50.5 | 47 | 56.0 | 41.5 |
| | 4 | 50.0 | 46.8 | 55.0 | 41.0 |
| | 5 | 49.8 | 46.7 | 54.7 | 40.5 |
| | 6 | | 46.6 | 54.4 | 40 |
| | | | | 54.2 | 39 |
| | 7 | | | | 38 |
| Lower limit | 1 | 48 | 42 | 51 | 35 |
| | 2 | 48.5 | 44 | 52 | 35.5 |
| | 3 | 49 | 45 | 52 | 36 |
| | 4 | 49.3 | 45.5 | 53 | 36.5 |
| | 5 | | 46 | 53 | 37 |
| | 6 | | 46.3 | 54 | |

Both the above desirable refractive indexes and Abbé numbers can be realized in optical glasses that suitably combine any of the composition ranges specified in Tables 1-1 to 1-28 above and any of the characteristic ranges specified in Tables 2-1 to 2-18.

The optical glasses of the first basic form, second basic form, and Forms A, B, C, and D of the present invention can be obtained by procuring starting materials such as boric acid, oxides, and as needed, carbonates, nitrates, sulfates, and hydroxides; weighing out to achieve the desired characteristics, blending, and thoroughly stirring the various starting materials; charging the mixture to a melting vessel such as a platinum crucible; heating, melting, clarifying, and homogenizing the mixture; and molding the melt. To obtain a homogeneous glass, a melting temperature of, for example, 1,100 to 1,400° C. is desirable.

Alternatively, starting materials such as boric acid, oxides, and as needed, carbonates, nitrates, sulfates, and hydroxides can be rough melted to fabricate various cullets; the cullets can be blended to obtain desired characteristics, heated, melted, clarified, and homogenized; and the melt can be molded.

[The Preform for Precision Press-Molding]

The present invention includes a preform for precision press molding that is comprised of an optical glass of the first basic form, second basic form, or Form A, B, C, or D of the present invention.

A precision press-molding preform is a premolded glass material for use in the widely known precision press molding method.

The "precision press-molding preform" will sometimes be referred to simply as a "preform" hereinafter. The term "preform" refers to a premolded glass member that is heated for use in precision press molding. Here, the term "precision press-molding" is the method of forming the optically functional surfaces of an optical element by transfer from the molding surfaces of a pressing mold, also called mold optics molding, as is widely known. In optics, the term "optically functional surface" means a surface that refracts, reflects, diffracts, or permits the entering or exiting of, light that is being controlled. The surface of a lens or the like corresponds to such an optically functional surface.

During precision press molding, to permit good extension of the glass along the molding surface while preventing reaction and fusion of the glass to the pressing mold, the surface of the preform is desirably coated with a mold release film. Mold release films come in the form of noble metals (platinum, platinum alloys), oxides (oxides of Si, Al, Zr, La, Y, and the like), nitrides (nitrides of B, Si, Al, and the like), and carbon-containing films. A carbon-containing film comprised chiefly of carbon (in which the carbon content is greater than the content of other elements when the contents of the elements in the film are denoted as atomic percentages) is desirable as a carbon-containing film. Specific examples are carbon films and hydrocarbon films. A known method employing carbon as starting material, such as vacuum deposition, sputtering, and ion plating; or a known method employing a hydrocarbon or the like as the material gas, such as thermal decomposition, may be employed to form a carbon-containing film. Other films may be formed by deposition, sputtering, ion plating, the sol gel method, or the like.

The method of fabricating the preform of the present invention is not limited. However, it is desirably manufactured by the following methods utilizing the advantageous properties of the above-described glasses.

The first method of manufacturing a precision press-molding preform (referred to as preform manufacturing method I) is a method for manufacturing a precision press-molding preform by melting a glass starting material, causing the glass melt obtained to flow out, separating a glass melt gob, and molding the glass melt gob in a cooling step, and is characterized by the molding of a preform comprised of the above-described optical glass.

The second method of manufacturing a precision press-molding preform (referred to as preform manufacturing method II) is a method for manufacturing a precision press-molding preform by melting a glass starting material, molding the glass melt obtained to fabricate a molded glass member, and processing the molded member to fabricate a preform comprised of the optical glass of the present invention.

Both preform manufacturing methods I and II share the step of fabricating a homogenous glass melt from a glass starting material. For example, glass starting materials blended to yield desired characteristics are charged to a melting vessel made of platinum, and heated, melted, clarified, and homogenized to prepare a homogeneous glass melt. The glass melt is then caused to flow out of an outflow nozzle or an outflow pipe made of platinum or a platinum alloy the temperature of which has been adjusted. It is also possible to rough melt the glass starting materials to fabricate cullets; blend the cullets obtained; heat, melt, clarify, and homogenize to obtain a homogeneous glass melt; and cause the glass melt to flow out through the above-mentioned outflow nozzle or outflow pipe.

When forming small preforms or spherical preforms, the glass melt is made to drip out of the outflow nozzle in the form of a glass melt droplet of desired weight. This is then received in a preform-forming mold and molded into a preform. Alternatively, a glass melt droplet of desired weight is similarly made to drip out through an outflow nozzle into liquid nitrogen or the like to form a preform. When fabricating medium- or large-sized preforms, a glass melt flow is made to flow out of an outflow pipe, the front end of the glass melt flow is received by a preform-forming mold, a constriction is formed between the nozzle of the glass melt flow and the preform-forming mold, and the preform-forming mold is quickly lowered directly downward, allowing the surface tension of the glass melt to separate the glass melt flow at the site of the constriction. A glass melt gob of prescribed weight is then received in a receiving member and molded into a preform.

In order to fabricate a preform having a smooth surface that is free of scratches, grime, wrinkles, surface deformation, and the like, such as a free surface, it is possible to employ a method such as molding a glass melt gob into a preform while it is being floated by air pressure on a preform-forming mold or the like, or a method in which a glass melt droplet is placed in a medium such as liquid nitrogen that has been rendered liquid by cooling a gaseous material at the ordinary temperature and pressure, whereby a preform is molded.

When molding a glass melt gob into a preform while it is being floated, a gas (referred to as a "floating gas") is blown onto the glass melt gob to apply upward air pressure. In this process, if the viscosity of the glass melt gob is excessively low, the floating gas penetrates into the glass, forming bubbles that remain in the preform. However, imparting a viscosity of 3 to 60 dPa·s to the glass melt gob floats the glass gob without the floating gas penetrating into the glass.

Examples of gases that can be employed in the course of blowing floating gas onto a preform are: air, $N_2$ gas, $O_2$ gas, Ar gas, He gas, steam and the like. The air pressure is not specifically limited other than that it be adequate to float the preform without it coming into contact with solid objects such as the surface of the forming mold.

The precision press-molded article (such as an optical element) that is fabricated from a preform will often have an axis of rotational symmetry such as is found in a lens. Thus, the shape of the preform desirably has an axis of rotational symmetry. Specific examples are spheres and items having a single axis of rotational symmetry. Examples of shapes having a single axis of rotational symmetry are items having smooth contour lines, free of edges and pits, in a cross-section containing the axis of rotational symmetry, such as an item having an ellipse the short axis of which conforms to the axis of rotational symmetry in the above cross-section. A shape in the form of an oblate sphere (a shape in which one axis running through the center of the sphere is established, and the dimensions are contracted in the direction of this axis) is another example.

In preform manufacturing method 1, the glass is molded within a temperature range permitting plastic deformation. Thus, a preform can be manufactured by press molding a glass gob. In that case, the shape of the preform can be set relatively freely, and can thus approximate the shape of the targeted optical element. For example, molding is possible where one of two opposing surfaces is made convex and the other concave, both surfaces are made concave, one surface is made flat and the other convex, one surface is made flat and the other concave, and both surfaces are made convex.

The surface of a preform thus fabricated can be coated with a carbon-containing film. However, the fluorine-containing optical glass of the present invention has a low glass transition temperature, permitting a low press molding temperature. Thus, it is not necessary to apply a carbon-containing film.

In preform manufacturing method 2, for example, after molding the glass melt by casting in a casting mold, strain of the molded member is removed by annealing, the molded member is cut or severed to split it into prescribed dimensions or shapes, multiple glass pieces are fabricated, and the glass pieces are polished to render their surfaces smooth, yielding preforms comprised of a prescribed weight of glass. The surface of a preform thus fabricated is also desirably coated with a carbon-containing film for use. Preform manufacturing method 2 is suited to the manufacturing of spherical preforms, platelike preforms, and the like that can be readily ground and polished.

In both of these manufacturing methods, the thermal stability of the optical glass employed is good. This permits the stable manufacturing of high-quality preforms with a tendency not to produce products that are defective because of glass devitrification, striae, or the like, and enhances the overall large-quantity production properties of the process of manufacturing optical elements.

Preforms that are preferred because they enhance the large-quantity production properties of optical elements by precision press molding will be described next.

From the aspect of a glass material, the optical glass of the present invention provides excellent precision press-molding properties. Reducing the amount of deformation of the glass in precision press molding permits lowering the temperature of the glass and the pressing mold during precision press molding, reducing the time required for press molding, and reducing the pressure applied during pressing. As a result, reactivity between the glass and the surface of the pressing mold decreases, the above problems occurring during precision press molding decrease, and large-quantity production properties improve.

The preforms that are desirably employed when precision press molding lenses have mutually opposing pressed surfaces (surfaces that are pressed by opposing molding surfaces in the mold during precision press molding). Preforms having an axis of rotational symmetry that runs through the center of the two pressed surfaces are preferred. Among such preforms, those that are suited to the precision press molding of meniscus lenses are those in which one pressed surface is convex and the other is concave, flat, or convex having a curvature that is less than the first convex surface.

In preforms that are suited to the precision press molding of biconcave lenses, one pressed surface is convex, concave, or flat, and the other surface is convex, concave, or flat.

In preforms that are suited to the precision press molding of biconvex lenses, one pressed surface is convex and the other surface is convex or flat.

In both cases, a preform with a shape approximating the shape of the article being precision press molded is desirable.

When molding a glass melt gob into a preform with a preform-forming mold, the lower surface of the glass on the pressing mold is approximately determined by the shape of the molding surface of the pressing mold. Additionally, the shape of the upper surface of the glass is determined by the surface tension of the glass melt and the weight of the glass itself. To reduce the amount of deformation of the glass during precision press molding, it is necessary to also control the shape of the upper surface of the glass during molding in the preform-forming mold. The shape of the upper surface of the glass determined by the surface tension of the glass melt and the weight of the glass itself is a free surface that is convex in shape. However, pressure can be applied to the upper surface of the glass to render it flat, concave, or convex with less curvature than the free surface. Specifically, the upper surface of the glass is molded to the desired shape by pressing with a pressing mold having a molding surface of desired shape, or by applying air pressure to the upper surface of the glass. In the course of pressing the upper surface of the glass with a pressing mold, multiple gas blow-holes can be provided in the molding surface of the forming mold, gas can be blown through the gas blow-holes to form a gas cushion between the molding surface and the upper surface of the glass, and the upper surface of the glass can be pressed through this gas cushion. Alternatively, when it is desirable to mold the upper surface of the glass into a surface of greater curvature than the free surface, negative pressure can be generated in the vicinity of the upper surface of the glass to mold the upper surface in a more mounded fashion.

A preform with a polished surface is also desirable to obtain a preform with a shape more closely approximating the shape of the article being precision press molded. For example, a preform in which one pressed surface is polished to be either flat or partially spherical, and the other pressed surface is polished so as to be partially spherical or flat, is desirable. The partially spherical portion of the surface can be either convex or concave. Whether to make it convex or concave is desirably determined based on the shape of the article being precision press molded, as set forth above.

The various preforms described above are desirable for molding lenses with diameters of 10 mm or greater and preferred for molding lenses with diameters of 20 mm or greater. They are also desirable for molding lenses with a center thickness exceeding 2 mm.

[The Optical Element]

The optical element of the present invention will be described next.

The optical element of the present invention is comprised of the optical glass of the above-described first basic form, second basic form, or Form A, B, C, or D.

The type of optical element itself is not specifically limited. Examples of typical elements are lenses such as aspherical lenses, spherical lenses, plano-concave lenses, plano-convex lenses, biconcave lenses, biconvex lenses, convex meniscus lenses, and concave meniscus lenses; microlenses; lens arrays; lenses with diffraction gratings; prisms; and prisms with lens functions. Examples of desirable optical elements are lenses such as convex meniscus lenses, concave meniscus lenses, biconvex lenses, biconcave lenses, plano-convex lenses, and plano-concave lenses; prisms; and diffraction gratings. Each of these lenses may be asymmetrical or spherical. As required, an antireflective coating, partially reflective coating with wavelength selecting properties, or the like may be provided on the surface.

The optical element of the present invention is comprised of glass with a high refractive index and low dispersion characteristics. It can thus be combined with optical elements comprised of other glasses to achieve good correction of chromatic aberration. Since the optical element of the present invention is comprised of a glass of high refractive index, it can be employed in image pickup optical systems, projection optical systems, and the like to render the optical system more compact.

The method of manufacturing the optical element of the present invention will be described next.

The optical element of the present invention can be manufactured by precision press molding the above-described preform of the present invention with a pressing mold.

A desirable form of the method of manufacturing the optical element of the present invention is the method of large-quantity production of optical elements by repeating the step of precision press molding the above-described preform of the present invention in a single pressing mold.

To prevent oxidation of the mold release film provided on the molding surfaces of the pressing mold or the molded surfaces, the step of heating the pressing mold and preform and the precision press molding step are desirably conducted in a non-oxidizing gas atmosphere such as nitrogen gas or a mixed gas of nitrogen gas and hydrogen gas. In a non-oxidizing gas atmosphere, the carbon-containing film coated on the preform surface will remain on the surface of the precision press molded article without oxidizing. This film is eventually to be removed. To relatively easily and completely remove the carbon-containing film, it suffices to heat the precision press molded article in an oxidizing atmosphere, such as air. The oxidation and removal of the carbon-containing film is to be conducted at a temperature at which the precision press molded article will not be deformed by heating. Specifically, this is desirably conducted within a temperature range below the glass transition temperature.

A pressing mold the molding surfaces of which have been processed with high precision into desired shapes in advance is employed in precision press molding. A mold release film can be formed on the molding surfaces to prevent fusion of the glass during pressing. Examples of the mold release film are carbon-containing films, nitride films, and noble metal films. Hydrogenated carbon films, carbon films, and the like are desirable as carbon-containing films.

More specifically, in addition to SiC molds, superhard molds such as WC, molds made of cermets, and the like can be employed as the pressing mold in precision press molding because the glass transition temperature of the optical glass of the present invention is low. As needed, the molding surfaces made of an SiC mold can be coated with a carbon film. As needed, the molding surfaces of a mold made of a superhard material such as WC can be coated with a noble metal film or noble metal alloy film.

The method of manufacturing the optical element comprises the following two forms.

In the first form of the method of manufacturing an optical element by precision press molding (referred to as optical element manufacturing method I), a preform is introduced into the pressing mold and the preform and the pressing mold are heated together. In the second form of the method of manufacturing an optical element by precision press molding (referred to as optical element manufacturing method II), a heated preform is introduced into a preheated pressing mold.

In optical element manufacturing method I, the preform is positioned between a pair of opposing upper and lower molds the molding surfaces of which have been processed into precise shapes, after which both the pressing molds and the preform are heated to a temperature corresponding to a glass viscosity of $10^5$ to $10^9$ dPa·s to soften the preform. The preform is then press molded to precisely transfer the molding surfaces of the pressing molds to the glass. Optical element manufacturing method I is recommended when the focus is on improving molding precision such as surface precision and eccentric precision.

In optical element manufacturing method II, a preform that has been preheated to a temperature corresponding to a glass viscosity of $10^4$ to $10^8$ dPa·s is positioned between a pair of opposing upper and lower molds the molding surfaces of which have been processed into precise shapes and press molded to precisely transfer the molding surfaces of the pressing molds to the glass. Optical element manufacturing method II is recommended when the focus is on increasing productivity.

The pressure and duration of pressing can be suitably determined taking into account the viscosity and the like of the glass. For example, a pressure of about 5 to 15 MPa and a pressing time of 10 to 300 seconds can be employed. Pressing conditions such as the pressing time and pressure can be suitably set to within known ranges in accordance with the shape and dimensions of the molded product.

Subsequently, the pressing mold and precision press molded product are cooled, desirably to a temperature below the strain point, the molds are separated, and the precision press-molded product is removed. To achieve optical characteristics conforming precisely to desired values, it suffices to suitably adjust the annealing conditions of the molded product during cooling, such as the annealing rate.

The optical element of the present invention can be fabricated without a press molding step. For example, a homogeneous glass melt can be cast in a casting mold to form a glass block and annealed to remove strain. Optical characteristics can be adjusted by regulating the annealing conditions to achieve a desired value for the refractive index of the glass. Subsequently, the glass block can be cut or severed to obtain glass pieces, which can then be ground and polished to obtain finished glass elements.

The lens unit of the present invention is assembled into a body of equipment in the form of an optical system comprising optical elements of the present invention, preferably asymmetrical or symmetrical lenses. It can be an interchangeable lens in a single-lens reflex camera, a lens unit built into a compact camera, or the like.

The image pickup device of the present invention is equipped with the above-described optical element of the present invention. Since the optical element of the present invention is comprised of the optical glass having a high refractive index and low dispersion characteristics, a lens with a high dispersion characteristic can be combined with a lens in the form of the optical element of the present invention to provide an image pickup device having a compact image pickup optical system capable of good correction of chromatic aberration. Image sensors such as CCDs and CMOSs can be employed as the image pickup elements constituting the image pickup device.

That is, the image pickup device of the present invention is equipped with at least the above lens unit and image sensors such as CCDs or CMOSs. As needed, a mechanism having a focusing (focus adjusting) function can be provided.

EXAMPLES

The present invention will be described in greater detail below through examples.

Examples

Examples 1 to 33 in Table 3 are mainly examples of Form A. Examples 1 to 44 in Table 4 are mainly examples of Form B. Examples 1 to 28 in Table 5 are mainly examples of Form C. And Examples 1 to 9 in Table 6 are mainly examples of Form D.

Glass starting materials were dispensed in the form of boric acid or boric anhydride, oxides, fluorides, and, as needed, carbonates, nitrates, and the like in a manner calculated to yield optical glasses having the compositions indicated in Tables 3 to 6; charged to a platinum crucible; heated in air, desirably with a platinum cover in place; melted, clarified and homogenized for 1.5 to 3 hours at 1,150 to 1,250° C.; charged to a preheated casting mold; molded; and gradually cooled to obtain glass blocks. No crystal precipitation or striae were observed in the glass. The glass thus obtained was used to measure the various characteristics of glass by the methods outlined in a separate table. The results obtained are given in Tables 3 to 6. The reduction in weight of Example 14 of Table 5, which was of Form C, was 0.61 weight percent. Similarly, the reduction in weight of Example 18 of Table 5 was 1.1 weight percent.

Examples 32 and 33 (Form A) of Table 3 are the glass characteristics obtained by melting for two and a half hours and the various characteristics of other examples given in Tables 3 to 6 are glass characteristics obtained by melting for two hours.

TABLE 3

|  | Example | | | | | |
|---|---|---|---|---|---|---|
|  | Example 1 | Example 2 | Example 3 | Example 4 | Example 5 | Example 6 |
| $BO_{1.5}$ | 49.73 | 49.73 | 47.80 | 46.62 | 45.46 | 43.48 |
| $SiO_2$ | 5.52 | 5.52 | 7.55 | 7.36 | 6.99 | 8.45 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 11.05 | 11.05 | 10.06 | 9.82 | 9.32 | 8.45 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 4.42 | 4.42 | 5.03 | 4.91 | 6.41 | 7.25 |
| $LaO_{1.5}$ | 13.27 | 13.27 | 12.58 | 13.50 | 13.41 | 14.49 |
| $GdO_{1.5}$ | 12.15 | 12.15 | 12.58 | 13.50 | 14.57 | 14.49 |
| $YO_{1.5}$ | 0.00 | 0.00 | 0.00 | 0.00 | 0.00 | 0.00 |
| $TiO_2$ | 0.00 | 0.00 | 0.00 | 0.00 | 0.00 | 0.00 |
| $ZrO_2$ | 3.31 | 3.31 | 3.77 | 3.68 | 2.91 | 2.42 |
| $TaO_{2.5}$ | 0.55 | 0.55 | 0.63 | 0.61 | 0.93 | 0.97 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 8.84 | 17.68 | 5.03 | 9.82 | 13.99 | 14.49 |
| O (Note 3) | 137.285 | 132.865 | 141.2 | 138.945 | 136.36 | 137.085 |
| F/O(Molar ratio) | 0.064 | 0.133 | 0.036 | 0.071 | 0.103 | 0.106 |
| Glass transition temperature Tg (° C.) | 562 | 548 | 578 | 568 | 557 | 558 |
| Liquidus temperature LT (° C.) | 1080 | 1070 | 1090 | 1090 | 1070 | 1060 |
| Specific gravity | 4.66 | 4.66 | 4.67 | 4.61 | 4.88 | 4.91 |
| Viscosity at liquidus temperature (dPa · s) | 2.5 | 3.0 | 2.4 | 2.4 | 2.9 | 3.3 |
| Refractive index nd | 1.76662 | 1.75392 | 1.77209 | 1.77448 | 1.77356 | 1.77270 |
| Abbé number νd | 49.91 | 50.84 | 49.24 | 49.30 | 49.40 | 49.44 |
| nd − (2.25 − 0.01 × νd) | 0.016 | 0.012 | 0.014 | 0.017 | 0.018 | 0.017 |
| λ80 (nm) | 367 | 364 | 366 | 366 | 362 | 365 |
| λ70 (nm) | 345 | 343 | 344 | 344 | 340 | 344 |
| λ5 (nm) | 276 | 275 | 277 | 276 | 278 | 280 |
| $BO_{1.5}$ × F/O | 3.20 | 6.62 | 1.70 | 3.29 | 4.66 | 4.60 |
| Excess B—O—B Bonding:D (BBO1.5-(Boxygen-BBO1.5)) | 11.9 | 16.3 | 2.2 | 0.9 | 0.0 | −6.6 |
| $SiO_2/BO_{1.5}$ | 0.111 | 0.111 | 0.158 | 0.158 | 0.154 | 0.194 |
| NWF ($BO_{1.5} + SiO_2 + AlO_{1.5} + GeO_2$) | 55.25 | 55.25 | 55.35 | 53.98 | 52.45 | 51.93 |
| ΣRE | 25.41 | 25.41 | 25.16 | 27.00 | 27.97 | 28.98 |
| $LaO_{1.5}$/ΣRE | 0.522 | 0.522 | 0.500 | 0.500 | 0.479 | 0.500 |
| ΣRE/NWF | 0.460 | 0.460 | 0.455 | 0.500 | 0.533 | 0.558 |
| $2LiO_{0.5} + ZnO + (F/2)$ | 30.94 | 35.36 | 27.67 | 29.46 | 32.04 | 31.40 |
| $2LiO_{0.5}/(2LiO_{0.5} + ZnO)$ | 0.833 | 0.833 | 0.800 | 0.800 | 0.744 | 0.700 |
| $ZnO + 3ZrO_2 + 5TaO_{2.5}$ | 17.10 | 17.10 | 19.49 | 19.00 | 19.79 | 19.36 |
| Volatilization peak Tv (° C.) (Note 4) |  |  |  |  |  |  |
| Weight loss (wt %) (Note 5) |  |  |  | 0.41 |  |  |
| $BO_{1.5}$ × F/$LaO_{1.5}$ | 16.56 | 33.13 | 9.56 | 16.96 | 23.71 | 21.74 |
| $ZrO_2/(ZrO_2 + TaO_{2.5})$ | 0.86 | 0.86 | 0.86 | 0.86 | 0.76 | 0.71 |
| $ZrO_2 + TaO_{2.5}$ | 3.86 | 3.86 | 4.40 | 4.29 | 3.84 | 3.39 |

|  | Example | | | | | |
|---|---|---|---|---|---|---|
|  | Example 7 | Example 8 | Example 9 | Example 10 | Example 11 | Example 12 |
| $BO_{1.5}$ | 42.97 | 43.22 | 39.74 | 41.50 | 41.42 | 52.94 |
| $SiO_2$ | 8.35 | 8.40 | 11.54 | 10.06 | 7.84 | 3.53 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 5.97 | 7.20 | 11.54 | 10.06 | 4.48 | 4.71 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 11.93 | 7.20 | 6.41 | 8.81 | 13.44 | 6.47 |
| $LaO_{1.5}$ | 14.32 | 15.31 | 13.46 | 13.21 | 15.68 | 15.29 |
| $GdO_{1.5}$ | 14.32 | 15.31 | 13.46 | 13.21 | 15.68 | 12.94 |
| $YO_{1.5}$ | 0.00 | 0.00 | 0.00 | 0.00 | 0.00 | 0.00 |

TABLE 3-continued

|  |  |  |  |  |  |  |
|---|---|---|---|---|---|---|
| $TiO_2$ | 0.00 | 0.00 | 0.00 | 0.00 | 0.00 | 0.00 |
| $ZrO_2$ | 1.19 | 2.40 | 3.21 | 2.52 | 0.56 | 3.53 |
| $TaO_{2.5}$ | 0.95 | 0.96 | 0.64 | 0.63 | 0.90 | 0.59 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 14.32 | 19.21 | 7.69 | 7.55 | 22.4 | 14.12 |
| O (Note 3) | 136.625 | 135.955 | 139.425 | 138.68 | 132.7 | 139.115 |
| F/O (Molar ratio) | 0.105 | 0.141 | 0.055 | 0.054 | 0.169 | 0.101 |
| Glass transition temperature Tg (° C.) | 562 | 564 | 563 | 559 | 555 | 579 |
| Liquidus temperature LT (° C.) | 1070 | 1060 | 1120 | 1070 | 1050 | 1070 |
| Specific gravity | 4.95 | 4.99 | 4.75 | 4.77 | 5.10 | 4.87 |
| Viscosity at liquidus temperature (dPa · s) | 3.0 | 3.4 | 1.9 | 2.9 | 3.7 | 3.0 |
| Refractive index nd | 1.77221 | 1.77473 | 1.77021 | 1.77113 | 1.77039 | 1.77960 |
| Abbé number νd | 49.31 | 49.60 | 48.93 | 49.09 | 49.70 | 49.61 |
| nd − (2.25 − 0.01 × νd) | 0.015 | 0.021 | 0.010 | 0.012 | 0.017 | 0.026 |
| λ80 (nm) | 366 | 366 | 363 | 362 | 364 | 366 |
| λ70 (nm) | 343 | 344 | 342 | 342 | 342 | 344 |
| λ5 (nm) | 279 | 277 | 277 | 278 | 278 | 275 |
| $BO_{1.5}$ × F/O | 4.50 | 6.11 | 2.19 | 2.26 | 6.99 | 5.37 |
| Excess B—O—B Bonding:D (BBO1.5-(Boxygen-BBO1.5)) | −7.7 | −6.3 | −20.2 | −14.2 | −8.4 | 19.7 |
| $SiO_2/BO_{1.5}$ | 0.194 | 0.194 | 0.290 | 0.242 | 0.189 | 0.067 |
| NWF ($BO_{1.5}$ + $SiO_2$ + $AlO_{1.5}$ + $GeO_2$) | 51.32 | 51.62 | 51.28 | 51.56 | 49.26 | 56.47 |
| ΣRE | 28.64 | 30.62 | 26.92 | 26.42 | 31.36 | 28.23 |
| $LaO_{1.5}$/ΣRE | 0.500 | 0.500 | 0.500 | 0.500 | 0.500 | 0.542 |
| ΣRE/NWF | 0.558 | 0.593 | 0.525 | 0.512 | 0.637 | 0.500 |
| $2LiO_{0.5}$ + ZnO + (F/2) | 31.03 | 31.20 | 33.34 | 32.70 | 33.60 | 22.95 |
| $2LiO_{0.5}/(2LiO_{0.5}$ + ZnO) | 0.500 | 0.667 | 0.783 | 0.695 | 0.400 | 0.593 |
| ZnO + $3ZrO_2$ + $5TaO_{2.5}$ | 20.25 | 19.20 | 19.24 | 19.52 | 19.62 | 20.01 |
| Volatilization peak Tv (° C.) (Note 4) |  |  |  |  |  |  |
| Weight loss (wt %) (Note 5) |  |  |  |  | 1.21 |  |
| $BO_{1.5}$ × F/$LaO_{1.5}$ | 21.49 | 27.11 | 11.35 | 11.86 | 29.59 | 24.44 |
| $ZrO_2/(ZrO_2$ + $TaO_{2.5})$ | 0.56 | 0.71 | 0.83 | 0.80 | 0.38 | 0.86 |
| $ZrO_2$ + $TaO_{2.5}$ | 2.14 | 3.36 | 3.85 | 3.15 | 1.46 | 4.12 |

|  | Example | | | | | |
|---|---|---|---|---|---|---|
|  | Example 13 | Example 14 | Example 15 | Example 16 | Example 17 | Example 18 |
| $BO_{1.5}$ | 43.47 | 43.48 | 42.46 | 45.46 | 45.46 | 42.71 |
| $SiO_2$ | 8.45 | 3.62 | 8.25 | 6.99 | 6.99 | 8.30 |
| $GeO_2$ | 0.00 | 4.83 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 8.45 | 8.45 | 2.36 | 8.16 | 8.16 | 2.37 |
| $NaO_{0.5}$ | 0.00 | 0.00 | 0.00 | 1.17 | 0.00 | 0.00 |
| $KO_{0.5}$ | 0.00 | 0.00 | 0.00 | 0.00 | 1.17 | 0.00 |
| MgO | 0.00 | 0.00 | 0.00 | 0.00 | 0.00 | 0.00 |
| CaO | 0.00 | 0.00 | 0.00 | 0.00 | 0.00 | 1.19 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 7.25 | 7.25 | 16.51 | 6.41 | 6.41 | 13.05 |
| $LaO_{1.5}$ | 12.08 | 14.49 | 14.74 | 13.40 | 13.40 | 15.42 |
| $GdO_{1.5}$ | 12.08 | 14.49 | 14.74 | 14.57 | 14.57 | 15.42 |
| $YO_{1.5}$ | 4.83 | 0.00 | 0.00 | 0.00 | 0.00 | 0.00 |
| $TiO_2$ | 0.00 | 0.00 | 0.00 | 0.00 | 0.00 | 0.00 |
| $ZrO_2$ | 2.42 | 2.42 | 0.00 | 2.91 | 2.91 | 0.59 |
| $TaO_{2.5}$ | 0.97 | 0.97 | 0.94 | 0.93 | 0.93 | 0.95 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 14.49 | 14.49 | 16.51 | 13.99 | 13.99 | 18.98 |
| O (Note 3) | 137.085 | 137.085 | 136.195 | 136.35 | 136.35 | 136.415 |
| F/O (Molar ratio) | 0.106 | 0.106 | 0.121 | 0.103 | 0.103 | 0.139 |
| Glass transition temperature Tg (° C.) | 560 | 558 | 566 | 554 | 553 | 569 |
| Liquidus temperature LT (° C.) | 1110 | 1060 | 1060 | 1060 | 1060 | 1060 |
| Specific gravity | 4.76 | 5.00 | 5.04 | 4.84 | 4.86 | 5.06 |
| Viscosity at liquidus temperature (dPa · s) | 2.0 | 3.1 | 3.4 | 3.2 | 3.2 | 3.4 |

TABLE 3-continued

|  | | | | | | |
|---|---|---|---|---|---|---|
| Refractive index nd | 1.76758 | 1.78220 | 1.77393 | 1.76819 | 1.77085 | 1.77450 |
| Abbé number vd | 49.61 | 48.02 | 49.07 | 49.42 | 49.44 | 49.46 |
| nd − (2.25 − 0.01 × vd) | 0.014 | 0.012 | 0.015 | 0.012 | 0.015 | 0.019 |
| λ80 (nm) | 364 | 364 | 368 | 367 | 367 | 367 |
| λ70 (nm) | 343 | 341 | 346 | 345 | 346 | 345 |
| λ5 (nm) | 277 | 276 | 276 | 277 | 278 | 276 |
| $BO_{1.5}$ × F/O | 4.59 | 4.60 | 5.15 | 4.66 | 4.66 | 5.94 |
| Excess B—O—B Bonding:D ($BBO_{1.5}$-($B_{oxygen}$-$BBO_{1.5}$)) | −6.7 | −6.6 | −8.8 | 0.0 | 0.0 | −8.3 |
| $SiO_2/BO_{1.5}$ | 0.194 | 0.083 | 0.194 | 0.154 | 0.154 | 0.194 |
| NWF ($BO_{1.5}$ + $SiO_2$ + $AlO_{1.5}$ + $GeO_2$) | 51.92 | 51.93 | 50.71 | 52.45 | 52.45 | 51.01 |
| ΣRE | 28.99 | 28.98 | 29.48 | 27.97 | 27.97 | 30.84 |
| $LaO_{1.5}$/ΣRE | 0.417 | 0.500 | 0.500 | 0.479 | 0.479 | 0.500 |
| ΣRE/NWF | 0.558 | 0.558 | 0.581 | 0.533 | 0.533 | 0.605 |
| $2LiO_{0.5}$ + ZnO + (F/2) | 31.40 | 31.40 | 29.48 | 29.72 | 29.72 | 27.28 |
| $2LiO_{0.5}$/($2LiO_{0.5}$ + ZnO) | 0.700 | 0.700 | 0.222 | 0.718 | 0.718 | 0.266 |
| ZnO + $3ZrO_2$ + $5TaO_{2.5}$ | 19.36 | 19.36 | 21.21 | 19.79 | 19.79 | 19.57 |
| Volatilization peak Tv (° C.) (Note 4) | | | | | | |
| Weight loss (wt %) (Note 5) | 0.18 | 0.52 | | | | |
| $BO_{1.5}$ × F/$LaO_{1.5}$ | 26.07 | 21.74 | 23.78 | 23.73 | 23.73 | 26.29 |
| $ZrO_2$/($ZrO_2$ + $TaO_{2.5}$) | 0.71 | 0.71 | 0.00 | 0.76 | 0.76 | 0.38 |
| $ZrO_2$ + $TaO_{2.5}$ | 3.39 | 3.39 | 0.94 | 3.84 | 3.84 | 1.54 |

|  | Example | | | | | |
|---|---|---|---|---|---|---|
|  | Example 19 | Example 20 | Example 21 | Example 22 | Example 23 | Example 24 |
| $BO_{1.5}$ | 42.71 | 44.27 | 42.34 | 44.56 | 43.48 | 40.76 |
| $SiO_2$ | 8.30 | 8.61 | 9.96 | 8.66 | 8.45 | 7.93 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 2.37 | 9.23 | 9.34 | 8.66 | 8.45 | 2.27 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 1.19 | 0.00 | 0.00 | 0.00 | 0.00 | 0.00 |
| ZnO | 13.05 | 6.15 | 6.23 | 7.43 | 7.25 | 13.59 |
| $LaO_{1.5}$ | 15.42 | 16.61 | 14.32 | 13.61 | 15.94 | 19.25 |
| $GdO_{1.5}$ | 15.42 | 11.69 | 14.32 | 10.64 | 10.14 | 14.72 |
| $YO_{1.5}$ | 0.00 | 0.00 | 0.00 | 2.97 | 2.90 | 0.00 |
| $TiO_2$ | 0.00 | 0.00 | 0.00 | 0.00 | 0.00 | 0.00 |
| $ZrO_2$ | 0.59 | 2.46 | 2.49 | 2.48 | 2.42 | 0.57 |
| $TaO_{2.5}$ | 0.95 | 0.98 | 1.00 | 0.99 | 0.97 | 0.91 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 18.98 | 12.3 | 12.45 | 14.85 | 14.49 | 27.18 |
| O (Note 3) | 136.415 | 138.06 | 138.545 | 136.76 | 137.085 | 132.505 |
| F/O (Molar ratio) | 0.139 | 0.089 | 0.09 | 0.109 | 0.106 | 0.205 |
| Glass transition temperature Tg (° C.) | 569 | 561 | 563 | 559 | 562 | 563 |
| Liquidus temperature LT (° C.) | 1060 | 1120 | 1080 | 1050 | 1070 | 1070 |
| Specific gravity | 5.08 | 4.79 | 4.84 | 4.69 | 4.76 | 5.18 |
| Viscosity at liquidus temperature (dPa · s) | 3.4 | 1.9 | 2.7 | 3.6 | 2.9 | 3.0 |
| Refractive index nd | 1.77379 | 1.77235 | 1.77142 | 1.76321 | 1.77105 | 1.77567 |
| Abbé number vd | 49.45 | 49.48 | 48.48 | 49.93 | 49.57 | 49.66 |
| nd − (2.25 − 0.01 × vd) | 0.018 | 0.017 | 0.006 | 0.012 | 0.017 | 0.022 |
| λ80 (nm) | 368 | 362 | 363 | 364 | 367 | 367 |
| λ70 (nm) | 347 | 342 | 342 | 343 | 344 | 346 |
| λ5 (nm) | 277 | 277 | 278 | 278 | 279 | 275 |
| $BO_{1.5}$ × F/O | 5.94 | 3.94 | 3.80 | 4.84 | 4.60 | 8.36 |
| Excess B—O—B Bonding:D ($BBO_{1.5}$-($B_{oxygen}$-$BBO_{1.5}$)) | −8.3 | −5.2 | −11.5 | −3.1 | −6.6 | −10.2 |
| $SiO_2/BO_{1.5}$ | 0.194 | 0.194 | 0.235 | 0.194 | 0.194 | 0.195 |
| NWF ($BO_{1.5}$ + $SiO_2$ + $AlO_{1.5}$ + $GeO_2$) | 51.01 | 52.88 | 52.30 | 53.22 | 51.93 | 48.69 |
| ΣRE | 30.84 | 28.30 | 28.64 | 27.22 | 28.98 | 33.97 |
| $LaO_{1.5}$/ΣRE | 0.500 | 0.587 | 0.500 | 0.500 | 0.550 | 0.567 |
| ΣRE/NWF | 0.605 | 0.535 | 0.548 | 0.512 | 0.558 | 0.698 |
| $2LiO_{0.5}$ + ZnO + (F/2) | 27.28 | 30.76 | 31.14 | 32.18 | 31.40 | 31.72 |
| $2LiO_{0.5}$/($2LiO_{0.5}$ + ZnO) | 0.266 | 0.750 | 0.750 | 0.700 | 0.700 | 0.250 |
| ZnO + $3ZrO_2$ + $5TaO_{2.5}$ | 19.57 | 18.43 | 18.70 | 19.82 | 19.36 | 19.85 |
| Volatilization peak Tv (° C.) (Note 4) | | | | | | |
| Weight loss (wt %) (Note 5) | | | | | 0.69 | |

TABLE 3-continued

| | | | | | | |
|---|---|---|---|---|---|---|
| $BO_{1.5} \times F/LaO_{1.5}$ | 26.29 | 16.39 | 18.41 | 24.31 | 19.76 | 28.78 |
| $ZrO_2/(ZrO_2 + TaO_{2.5})$ | 0.38 | 0.72 | 0.71 | 0.71 | 0.71 | 0.39 |
| $ZrO_2 + TaO_{2.5}$ | 1.54 | 3.44 | 3.49 | 3.47 | 3.39 | 1.48 |

| | Example | | | | | |
|---|---|---|---|---|---|---|
| | Example 25 | Example 26 | Example 27 | Example 28 | Example 29 | Example 30 |
| $BO_{1.5}$ | 40.76 | 42.34 | 42.34 | 41.57 | 41.57 | 41.51 |
| $SiO_2$ | 7.93 | 9.96 | 9.96 | 9.78 | 9.78 | 10.06 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 2.27 | 9.34 | 9.34 | 8.56 | 8.56 | 10.06 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 13.59 | 6.23 | 6.23 | 7.33 | 7.33 | 8.81 |
| $LaO_{1.5}$ | 14.72 | 9.34 | 19.30 | 13.21 | 14.67 | 11.32 |
| $GdO_{1.5}$ | 19.25 | 19.30 | 9.34 | 13.20 | 11.74 | 11.32 |
| $YO_{1.5}$ | 0.00 | 0.00 | 0.00 | 2.93 | 2.93 | 3.77 |
| $TiO_2$ | 0.00 | 0.00 | 0.00 | 0.00 | 0.00 | 0.00 |
| $ZrO_2$ | 0.57 | 2.49 | 2.49 | 2.44 | 2.44 | 2.52 |
| $TaO_{2.5}$ | 0.91 | 1.00 | 1.00 | 0.98 | 0.98 | 0.63 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 27.18 | 12.45 | 12.45 | 14.67 | 14.67 | 7.55 |
| O (Note 3) | 132.505 | 138.545 | 138.545 | 137.53 | 137.53 | 138.68 |
| F/O(Molar ratio) | 0.205 | 0.09 | 0.09 | 0.107 | 0.107 | 0.054 |
| Glass transition temperature Tg (° C.) | 565 | 567 | 557 | 560 | 559 | 553 |
| Liquidus temperature LT (° C.) | 1090 | 1100 | 1100 | 1070 | 1070 | 1080 |
| Specific gravity | 5.26 | 4.94 | 4.76 | 4.83 | 4.80 | 4.65 |
| Viscosity at liquidus temperature (dPa·s) | 2.5 | 2.2 | 2.2 | 3.0 | 3.0 | 2.7 |
| Refractive index nd | 1.77441 | 1.77058 | 1.77366 | 1.76989 | 1.77068 | 1.76737 |
| Abbé number νd | 49.80 | 49.59 | 49.34 | 49.41 | 49.36 | 49.36 |
| nd − (2.25 − 0.01 × νd) | 0.022 | 0.016 | 0.017 | 0.014 | 0.014 | 0.011 |
| λ80 (nm) | 368 | 366 | 364 | 364 | 364 | 362 |
| λ70 (nm) | 347 | 346 | 342 | 344 | 343 | 341 |
| λ5 (nm) | 277 | 278 | 274 | 276 | 276 | 278 |
| $BO_{1.5} \times F/O$ | 8.36 | 3.80 | 3.80 | 4.43 | 4.43 | 2.26 |
| Excess B—O—B Bonding:D (BBO1.5-(Boxygen-BBO1.5)) | −10.2 | −11.5 | −11.5 | −12.8 | −12.8 | −14.2 |
| $SiO_2/BO_{1.5}$ | 0.195 | 0.235 | 0.235 | 0.235 | 0.235 | 0.242 |
| NWF ($BO_{1.5} + SiO_2 + AlO_{1.5} + GeO_2$) | 48.69 | 52.30 | 52.30 | 51.35 | 51.35 | 51.57 |
| ΣRE | 33.97 | 28.64 | 28.64 | 29.33 | 29.34 | 26.41 |
| $LaO_{1.5}$/ΣRE | 0.433 | 0.326 | 0.674 | 0.450 | 0.500 | 0.429 |
| ΣRE/NWF | 0.698 | 0.548 | 0.548 | 0.571 | 0.571 | 0.512 |
| $2LiO_{0.5} + ZnO + (F/2)$ | 31.72 | 31.14 | 31.14 | 31.78 | 31.78 | 32.70 |
| $2LiO_{0.5}/(2LiO_{0.5} + ZnO)$ | 0.250 | 0.750 | 0.750 | 0.700 | 0.700 | 0.695 |
| $ZnO + 3ZrO_2 + 5TaO_{2.5}$ | 19.85 | 18.70 | 18.70 | 19.55 | 19.55 | 19.52 |
| Volatilization peak Tv (° C.) (Note 4) | | | | | | |
| Weight loss (wt %) (Note 5) | | | | | | |
| $BO_{1.5} \times F/LaO_{1.5}$ | 37.63 | 28.22 | 13.66 | 23.08 | 20.79 | 13.84 |
| $ZrO_2/(ZrO_2 + TaO_{2.5})$ | 0.39 | 0.71 | 0.71 | 0.71 | 0.71 | 0.80 |
| $ZrO_2 + TaO_{2.5}$ | 1.48 | 3.49 | 3.49 | 3.42 | 3.42 | 3.15 |

| | Example | | |
|---|---|---|---|
| | Example 31 | Example 32 | Example 33 |
| $BO_{1.5}$ | 41.72 | 45.51 | 46.62 |
| $SiO_2$ | 8.11 | 7.19 | 7.36 |
| $GeO_2$ | 0.00 | 0.00 | 0.00 |
| $AlO_{1.5}$ | 0.00 | 0.00 | 0.00 |
| $LiO_{0.5}$ | 4.63 | 9.58 | 9.82 |
| $NaO_{0.5}$ | 0.00 | 0.00 | 0.00 |
| $KO_{0.5}$ | 0.00 | 0.00 | 0.00 |
| MgO | 0.00 | 0.00 | 0.00 |
| CaO | 0.00 | 0.00 | 0.00 |
| SrO | 0.00 | 0.00 | 0.00 |
| BaO | 0.00 | 0.00 | 0.00 |

TABLE 3-continued

|   |   |   |   |
|---|---|---|---|
| ZnO | 13.90 | 4.79 | 4.91 |
| $LaO_{1.5}$ | 13.90 | 14.37 | 13.49 |
| $GdO_{1.5}$ | 12.75 | 14.37 | 13.50 |
| $YO_{1.5}$ | 3.48 | 0.00 | 0.00 |
| $TiO_2$ | 0.00 | 0.00 | 0.00 |
| $ZrO_2$ | 0.58 | 2.99 | 3.07 |
| $TaO_{2.5}$ | 0.93 | 1.20 | 1.23 |
| $NbO_{2.5}$ | 0.00 | 0.00 | 0.00 |
| $WO_3$ | 0.00 | 0.00 | 0.00 |
| $YbO_{1.5}$ | 0.00 | 0.00 | 0.00 |
| $CeO_2$ | 0.00 | 0.00 | 0.00 |
| $SnO_2$ | 0.00 | 0.00 | 0.00 |
| $SbO_{1.5}$ | 0.00 | 0.00 | 0.00 |
| Total (Note 1) | 100.00 | 100.00 | 100.00 |
| F (Note 2) | 23.17 | 14.37 | 9.82 |
| O (Note 3) | 132.11 | 137.13 | 139.26 |
| F/O(Molar ratio) | 0.175 | 0.105 | 0.071 |
| Glass transition temperature Tg (° C.) | 548 | 562 | 566 |
| Liquidus temperature LT (° C.) | 1140 | 1090 | 1100 |
| Specific gravity | 4.93 | 4.89 | 4.89 |
| Viscosity at liquidus temperature (dPa·s) | 1.6 | 2.5 | 2.4 |
| Refractive index nd | 1.76871 | 1.77470 | 1.77700 |
| Abbé number vd | 49.65 | 49.34 | 49.21 |
| nd − (2.25 − 0.01 × vd) | 0.015 | 0.018 | 0.019 |
| λ80 (nm) | 364 | 364 | 367 |
| λ70 (nm) | 343 | 342 | 346 |
| λ5 (nm) | 278 | 277 | 279 |
| $BO_{1.5}$ × F/O | 7.32 | 4.77 | 3.29 |
| Excess B—O—B Bonding:D (BBO1.5-(Boxygen-BBO1.5)) | −6.9 | −0.6 | 0.6 |
| $SiO_2/BO_{1.5}$ | 0.194 | 0.158 | 0.158 |
| NWF ($BO_{1.5} + SiO_2 + AlO_{1.5} + GeO_2$) | 49.83 | 52.70 | 53.98 |
| ΣRE | 30.13 | 28.74 | 27.00 |
| $LaO_{1.5}$/ΣRE | 0.461 | 0.500 | 0.500 |
| ΣRE/NWF | 0.605 | 0.545 | 0.500 |
| $2LiO_{0.5}$ + ZnO + (F/2) | 34.75 | 31.14 | 29.46 |
| $2LiO_{0.5}/(2LiO_{0.5} + ZnO)$ | 0.400 | 0.800 | 0.800 |
| ZnO + $3ZrO_2$ + $5TaO_{2.5}$ | 20.29 | 19.76 | 20.27 |
| Volatilization peak Tv (° C.) (Note 4) |  |  |  |
| Weight loss (wt %) (Note 5) |  |  |  |
| $BO_{1.5}$ × F/$LaO_{1.5}$ | 34.77 | 22.76 | 16.97 |
| $ZrO_2/(ZrO_2 + TaO_{2.5})$ | 0.38 | 0.71 | 0.71 |
| $ZrO_2 + TaO_{2.5}$ | 1.51 | 4.19 | 4.30 |

(Note 1) The contents of $BO_{1.5}$ to $SbO_{1.5}$ are given as cationic percentages.
(Note 2) F is the relative quantity (in moles) of fluorine ions for the total quantity of cations, denoted as 100.
(Note 3) O is the relative quantity (in moles) of oxygen ions for the total quantity of cations, denoted as 100.
(Note 4) Volatilization peak Tv is the temperature (° C.) of the endothermic peak accompanying change in the discontinuous weight reduction rate of the glass when heated to 1,200° C. at 10° C./min.
(Note 5) The weight reduction was the amount of weight reduction (wt %) when 100 mg of glass was heated from 400° C. to 1,200° C. at 10° C./min.

TABLE 4

|  | Example | | | | | | |
|---|---|---|---|---|---|---|---|
|  | Example 1 | Example 2 | Example 3 | Example 4 | Example 5 | Example 6 | Example 7 |
| $BO_{1.5}$ | 47.60 | 42.10 | 44.56 | 40.07 | 36.46 | 35.11 | 32.92 |
| $SiO_2$ | 4.80 | 6.32 | 3.96 | 7.38 | 10.55 | 10.16 | 10.65 |
| $GeO_2$ | 0.00 | 0.00 | 0.00 | 0.00 | 0.00 | 0.00 | 0.00 |
| $AlO_{1.5}$ | 0.00 | 0.00 | 0.00 | 0.00 | 0.00 | 0.00 | 0.00 |
| $LiO_{0.5}$ | 4.80 | 5.26 | 7.92 | 7.38 | 8.63 | 10.16 | 9.69 |
| $NaO_{0.5}$ | 0.00 | 0.00 | 0.00 | 0.00 | 0.00 | 0.00 | 0.00 |
| $KO_{0.5}$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 11.40 | 12.63 | 11.88 | 8.43 | 7.67 | 9.24 | 9.69 |
| $LaO_{1.5}$ | 15.20 | 15.79 | 14.85 | 18.98 | 18.99 | 18.29 | 19.18 |
| $GdO_{1.5}$ | 9.50 | 10.53 | 9.90 | 11.28 | 11.41 | 10.99 | 11.53 |
| $YO_{1.5}$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $ZrO_2$ | 2.90 | 3.16 | 2.97 | 2.90 | 2.64 | 2.54 | 2.66 |
| $TaO_{2.5}$ | 3.80 | 4.21 | 3.96 | 3.58 | 3.65 | 3.51 | 3.68 |
| $NbO_{2.5}$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |

TABLE 4-continued

|  |  |  |  |  |  |  |  |
|---|---|---|---|---|---|---|---|
| $YbO_{1.5}$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $SbO_{1.5}$ | 0.00 | 0.00 | 0.00 | 0.00 | 0.00 | 0.00 | 0.00 |
| Total (Note 1) | 100.00 | 100.00 | 100.00 | 100.00 | 100.00 | 100.00 | 100.00 |
| F (Note 2) | 8.00 | 8.42 | 7.92 | 16.87 | 15.35 | 14.78 | 15.50 |
| O (Note 3) | 143.15 | 143.17 | 139.61 | 138.69 | 140.11 | 137.69 | 138.05 |
| F/O(Molar ratio) | 0.056 | 0.059 | 0.057 | 0.122 | 0.110 | 0.107 | 0.112 |
| Glass transition temperature Tg (° C.) | 574 | 570 | 549 | 567 | 562 | 550 | 551 |
| Liquidus temperature LT (° C.) | 1070 | 1090 | 1090 | 1090 | 1130 | 1130 | 1120 |
| Specific gravity | 4.96 | 5.11 | 5.02 | 5.14 | 5.10 | 5.08 | 5.17 |
| Viscosity at liquidus temperature (dPa · s) | 5.8 | 4.6 | 4.0 | 3.3 | 2.4 | 2.3 | 2.6 |
| Refractive index nd | 1.80178 | 1.81460 | 1.80670 | 1.80453 | 1.80188 | 1.80034 | 1.80547 |
| Abbé number νd | 45.87 | 44.88 | 45.24 | 46.34 | 46.35 | 46.21 | 45.92 |
| nd − (2.25 − 0.01 × νd) | 0.010 | 0.013 | 0.009 | 0.018 | 0.015 | 0.012 | 0.015 |
| λ80 (nm) | 380 | 382 | 379 | 376 | 376 | 373 | 378 |
| λ70 (nm) | 356 | 356 | 354 | 352 | 352 | 349 | 352 |
| λ5 (nm) | 285 | 284 | 283 | 282 | 281 | 280 | 281 |
| $BO_{1.5} \times F/O$ | 2.67 | 2.48 | 2.54 | 4.89 | 4.01 | 3.76 | 3.69 |
| Excess B—O—B Bonding:D ($BBO_{1.5}$-(Boxygen-$BBO_{1.5}$)) | −0.3 | −16.9 | −5.9 | −18.5 | −30.7 | −32.4 | −39.3 |
| $SiO_2/BO_{1.5}$ | 0.101 | 0.150 | 0.089 | 0.184 | 0.289 | 0.289 | 0.324 |
| NWF ($BO_{1.5} + SiO_2 + AlO_{1.5} + GeO_2$) | 52.40 | 48.42 | 48.52 | 47.45 | 47.01 | 45.27 | 43.57 |
| ΣRE | 24.70 | 26.32 | 24.75 | 30.26 | 30.40 | 29.28 | 30.71 |
| $LaO_{1.5}$/ΣRE | 0.615 | 0.600 | 0.600 | 0.627 | 0.625 | 0.625 | 0.625 |
| ΣRE/NWF | 0.471 | 0.544 | 0.510 | 0.638 | 0.647 | 0.647 | 0.705 |
| $2LiO_{0.5} + ZnO + (F/2)$ | 25.00 | 27.36 | 31.68 | 31.62 | 32.60 | 36.95 | 36.82 |
| $2LiO_{0.5}/(2LiO_{0.5} + ZnO)$ | 0.457 | 0.454 | 0.571 | 0.636 | 0.692 | 0.687 | 0.667 |
| $ZnO + 3ZrO_2 + 5TaO_{2.5}$ | 39.10 | 43.16 | 40.59 | 35.03 | 33.84 | 34.41 | 36.07 |
| Volatilization peak Tv (° C.) (Note 4) | >1200 | >1200 | 1104 | 1164 | 1084 | 1150 | 1128 |
| Weight loss (wt %) (Note 5) |  |  |  |  |  |  |  |
| $BO_{1.5} \times F/LaO_{1.5}$ | 12.53 | 11.22 | 11.88 | 17.81 | 14.74 | 14.19 | 13.30 |
| $ZrO_2/(ZrO_2 + TaO_{2.5})$ | 0.43 | 0.43 | 0.43 | 0.45 | 0.42 | 0.42 | 0.42 |
| $ZrO_2 + TaO_{2.5}$ | 6.70 | 7.37 | 6.93 | 6.48 | 6.29 | 6.05 | 6.34 |

|  | Example | | | | | |
|---|---|---|---|---|---|---|
|  | Example 8 | Example 9 | Example 10 | Example 11 | Example 12 | Example 13 |
| $BO_{1.5}$ | 34.34 | 35.38 | 49.05 | 49.59 | 47.39 | 46.86 |
| $SiO_2$ | 11.14 | 10.24 | 1.09 | 1.10 | 1.10 | 1.08 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 8.35 | 8.38 | 3.26 | 3.29 | 3.30 | 3.30 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 9.28 | 9.31 | 13.08 | 13.23 | 13.22 | 13.08 |
| $LaO_{1.5}$ | 18.84 | 18.90 | 15.69 | 15.21 | 15.87 | 15.69 |
| $GdO_{1.5}$ | 11.74 | 11.78 | 10.47 | 10.14 | 10.58 | 10.46 |
| $YO_{1.5}$ | 0.00 | 0.00 | 0.00 | 0.00 | 0.00 | 0.00 |
| $TiO_2$ | 0.00 | 0.00 | 0.00 | 0.00 | 0.00 | 0.00 |
| $ZrO_2$ | 2.97 | 2.56 | 3.00 | 3.03 | 3.03 | 2.99 |
| $TaO_{2.5}$ | 3.34 | 3.45 | 4.36 | 4.41 | 4.41 | 4.36 |
| $NbO_{2.5}$ | 0.00 | 0.00 | 0.00 | 0.00 | 0.00 | 0.00 |
| $WO_3$ | 0.00 | 0.00 | 0.00 | 0.00 | 1.10 | 2.18 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 14.85 | 14.90 | 17.44 | 17.64 | 17.63 | 17.43 |
| O (Note 3) | 139.98 | 139.37 | 137.89 | 137.75 | 139.40 | 141.11 |
| F/O(Molar ratio) | 0.106 | 0.107 | 0.126 | 0.128 | 0.126 | 0.124 |
| Glass transition temperature Tg (° C.) | 561 | 560 | 569 | 568 | 565 | 565 |
| Liquidus temperature LT (° C.) | 1110 | 1090 | 1090 | 1090 | 1080 | 1100 |
| Specific gravity | 5.13 | 5.14 | 5.18 | 5.15 | 5.27 | 5.31 |
| Viscosity at liquidus temperature (dPa · s) | 3.1 | 3.9 | 3.0 | 2.9 | 3.3 | 2.7 |
| Refractive index nd | 1.80431 | 1.80417 | 1.81301 | 1.81036 | 1.82374 | 1.82991 |
| Abbé number νd | 46.25 | 46.27 | 45.32 | 45.25 | 43.52 | 42.30 |

TABLE 4-continued

| | | | | | | |
|---|---|---|---|---|---|---|
| nd − (2.25 − 0.01 × vd) | 0.017 | 0.017 | 0.016 | 0.013 | 0.009 | 0.003 |
| λ80 (nm) | 375 | 375 | 380 | 376 | 389 | 396 |
| λ70 (nm) | 350 | 350 | 353 | 349 | 364 | 370 |
| λ5 (nm) | 280 | 280 | 280 | 279 | 330 | 336 |
| $BO_{1.5}$ × F/O | 3.64 | 3.79 | 6.18 | 6.35 | 5.97 | 5.81 |
| Excess B—O—B Bonding:D ($BBO1.5-(Boxygen-BBO1.5)$) | −37.0 | −33.2 | 9.3 | 11.0 | 2.8 | −0.5 |
| $SiO_2/BO_{1.5}$ | 0.324 | 0.289 | 0.022 | 0.022 | 0.023 | 0.023 |
| NWF ($BO_{1.5} + SiO_2 + AlO_{1.5} + GeO_2$) | 45.48 | 45.62 | 50.14 | 50.69 | 48.49 | 47.94 |
| ΣRE | 30.58 | 30.68 | 26.16 | 25.35 | 26.45 | 26.15 |
| $LaO_{1.5}$/ΣRE | 0.616 | 0.616 | 0.600 | 0.600 | 0.600 | 0.600 |
| ΣRE/NWF | 0.672 | 0.673 | 0.522 | 0.500 | 0.545 | 0.545 |
| $2LiO_{0.5} + ZnO + (F/2)$ | 33.40 | 33.52 | 28.32 | 28.63 | 28.63 | 28.40 |
| $2LiO_{0.5}/(2LiO_{0.5} + ZnO)$ | 0.643 | 0.643 | 0.333 | 0.332 | 0.333 | 0.335 |
| $ZnO + 3ZrO_2 + 5TaO_{2.5}$ | 34.89 | 34.24 | 43.88 | 44.37 | 44.36 | 43.85 |
| Volatilization peak Tv (° C.) (Note 4) | 1036 | 1171 | 1115 | 1105 | 1114 | 1094 |
| Weight loss (wt %) (Note 5) | | | | | | |
| $BO_{1.5}$ × F/$LaO_{1.5}$ | 13.53 | 13.95 | 27.26 | 28.76 | 26.32 | 26.03 |
| $ZrO_2/(ZrO_2 + TaO_{2.5})$ | 0.47 | 0.43 | 0.41 | 0.41 | 0.41 | 0.41 |
| $ZrO_2 + TaO_{2.5}$ | 6.31 | 6.01 | 7.36 | 7.44 | 7.44 | 7.35 |

| | Example | | | | | |
|---|---|---|---|---|---|---|
| | Example 14 | Example 15 | Example 16 | Example 17 | Example 18 | Example 19 |
| $BO_{1.5}$ | 47.37 | 46.84 | 48.43 | 45.57 | 48.45 | 47.31 |
| $SiO_2$ | 1.11 | 1.09 | 0.00 | 2.28 | 0.00 | 2.28 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 3.30 | 3.30 | 3.38 | 3.43 | 3.37 | 3.41 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 13.23 | 13.08 | 13.53 | 13.67 | 13.86 | 14.35 |
| $LaO_{1.5}$ | 15.87 | 15.69 | 16.23 | 16.41 | 16.23 | 16.41 |
| $GdO_{1.5}$ | 10.58 | 10.46 | 10.82 | 10.94 | 10.82 | 10.94 |
| $YO_{1.5}$ | 0.00 | 0.00 | 0.00 | 0.00 | 0.00 | 0.00 |
| $TiO_2$ | 1.10 | 2.18 | 0.00 | 0.00 | 0.00 | 0.00 |
| $ZrO_2$ | 3.03 | 3.00 | 3.10 | 3.14 | 2.76 | 2.45 |
| $TaO_{2.5}$ | 4.41 | 4.36 | 4.51 | 4.56 | 4.51 | 2.85 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 17.64 | 17.44 | 18.04 | 18.23 | 18.03 | 18.23 |
| O (Note 3) | 138.30 | 138.94 | 136.90 | 137.89 | 136.58 | 135.52 |
| F/O(Molar ratio) | 0.128 | 0.126 | 0.132 | 0.132 | 0.132 | 0.135 |
| Glass transition temperature Tg (° C.) | 565 | 565 | 562 | 565 | 557 | 549 |
| Liquidus temperature LT (° C.) | 1100 | 1100 | 1100 | 1100 | 1100 | 1100 |
| Specific gravity | 5.21 | 5.20 | 5.25 | 5.25 | 5.25 | 5.12 |
| Viscosity at liquidus temperature (dPa · s) | 2.6 | 2.7 | 2.5 | 2.7 | 2.5 | 2.7 |
| Refractive index nd | 1.82431 | 1.83253 | 1.82100 | 1.81848 | 1.81804 | 1.79861 |
| Abbé number vd | 43.48 | 42.05 | 44.77 | 44.82 | 44.90 | 46.78 |
| nd − (2.25 − 0.01 × vd) | 0.009 | 0.003 | 0.019 | 0.017 | 0.017 | 0.016 |
| λ80 (nm) | 394 | 407 | 380 | 377 | 377 | 372 |
| λ70 (nm) | 363 | 370 | 351 | 349 | 349 | 346 |
| λ5 (nm) | 329 | 335 | 279 | 279 | 278 | 278 |
| $BO_{1.5}$ × F/O | 6.06 | 5.90 | 6.39 | 6.02 | 6.40 | 6.39 |
| Excess B—O—B Bonding:D ($BBO1.5-(Boxygen-BBO1.5)$) | 3.8 | 1.6 | 8.4 | −1.2 | 8.8 | 6.4 |
| $SiO_2/BO_{1.5}$ | 0.023 | 0.023 | 0.000 | 0.050 | 0.000 | 0.048 |
| NWF ($BO_{1.5} + SiO_2 + AlO_{1.5} + GeO_2$) | 48.48 | 47.93 | 48.43 | 47.85 | 48.45 | 49.59 |
| ΣRE | 26.45 | 26.15 | 27.05 | 27.35 | 27.05 | 27.35 |
| $LaO_{1.5}$/ΣRE | 0.600 | 0.600 | 0.600 | 0.600 | 0.600 | 0.600 |
| ΣRE/NWF | 0.546 | 0.546 | 0.558 | 0.572 | 0.558 | 0.552 |
| $2LiO_{0.5} + ZnO + (F/2)$ | 28.65 | 28.40 | 29.31 | 29.64 | 29.61 | 30.29 |
| $2LiO_{0.5}/(2LiO_{0.5} + ZnO)$ | 0.333 | 0.335 | 0.333 | 0.334 | 0.327 | 0.322 |
| $ZnO + 3ZrO_2 + 5TaO_{2.5}$ | 44.37 | 43.88 | 45.38 | 45.89 | 44.69 | 35.95 |
| Volatilization peak Tv (° C.) (Note 4) | 1121 | 1043 | 1157 | 1140 | 1036 | 1176 |
| Weight loss (wt %) (Note 5) | | | | | | |

TABLE 4-continued

| | | | | | | |
|---|---|---|---|---|---|---|
| $BO_{1.5} \times F/LaO_{1.5}$ | 26.33 | 26.03 | 26.92 | 25.31 | 26.91 | 26.28 |
| $ZrO_2/(ZrO_2 + TaO_{2.5})$ | 0.41 | 0.41 | 0.41 | 0.41 | 0.38 | 0.46 |
| $ZrO_2 + TaO_{2.5}$ | 7.44 | 7.36 | 7.61 | 7.70 | 7.27 | 5.30 |

| | Example | | | | | |
|---|---|---|---|---|---|---|
| | Example 20 | Example 21 | Example 22 | Example 23 | Example 24 | Example 25 |
| $BO_{1.5}$ | 36.57 | 35.58 | 36.82 | 36.81 | 36.82 | 36.82 |
| $SiO_2$ | 7.41 | 8.60 | 8.47 | 8.47 | 8.47 | 8.47 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 2.78 | 3.23 | 3.17 | 1.06 | 3.17 | 3.17 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 11.67 | 13.55 | 13.33 | 15.45 | 13.33 | 13.33 |
| $LaO_{1.5}$ | 22.08 | 19.84 | 19.52 | 19.52 | 25.87 | 22.70 |
| $GdO_{1.5}$ | 14.72 | 13.23 | 13.02 | 13.02 | 6.67 | 9.84 |
| $YO_{1.5}$ | 0.00 | 0.00 | 0.00 | 0.00 | 0.00 | 0.00 |
| $TiO_2$ | 0.00 | 0.00 | 0.00 | 0.00 | 0.00 | 0.00 |
| $ZrO_2$ | 1.99 | 2.31 | 2.28 | 2.28 | 2.28 | 2.28 |
| $TaO_{2.5}$ | 2.78 | 3.66 | 3.39 | 3.39 | 3.39 | 3.39 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 34.26 | 26.88 | 23.28 | 23.28 | 23.28 | 23.28 |
| O (Note 3) | 131.74 | 135.67 | 137.29 | 138.34 | 137.29 | 137.29 |
| F/O(Molar ratio) | 0.260 | 0.198 | 0.170 | 0.168 | 0.170 | 0.170 |
| Glass transition temperature Tg (° C.) | 553 | 561 | 558 | 578 | 566 | 568 |
| Liquidus temperature LT (° C.) | 1080 | 1070 | 1070 | 1070 | 1120 | 1120 |
| Specific gravity | 5.39 | 5.34 | 5.30 | 5.34 | 5.18 | 5.24 |
| Viscosity at liquidus temperature (dPa·s) | 1.7 | 3.4 | 4.0 | 4.4 | 2.3 | 2.3 |
| Refractive index nd | 1.79496 | 1.80384 | 1.80542 | 1.80975 | 1.80677 | 1.80607 |
| Abbé number νd | 47.86 | 46.36 | 46.40 | 46.03 | 46.26 | 46.35 |
| nd − (2.25 − 0.01 × νd) | 0.024 | 0.017 | 0.019 | 0.020 | 0.019 | 0.020 |
| λ80 (nm) | 372 | 375 | 374 | 376 | 377 | 374 |
| λ70 (nm) | 346 | 350 | 348 | 350 | 351 | 350 |
| λ5 (nm) | 278 | 279 | 278 | 278 | 278 | 279 |
| $BO_{1.5} \times F/O$ | 9.51 | 7.04 | 6.26 | 6.18 | 6.26 | 6.26 |
| Excess B—O—B Bonding:D (BBO1.5-(Boxygen-BBO1.5)) | −22.0 | −28.9 | −26.8 | −27.9 | −26.8 | −26.8 |
| $SiO_2/BO_{1.5}$ | 0.203 | 0.242 | 0.230 | 0.230 | 0.230 | 0.230 |
| NWF ($BO_{1.5} + SiO_2 + AlO_{1.5} + GeO_2$) | 43.98 | 44.18 | 45.29 | 45.28 | 45.29 | 45.29 |
| ΣRE | 36.80 | 33.07 | 32.54 | 32.54 | 32.54 | 32.54 |
| $LaO_{1.5}$/ΣRE | 0.600 | 0.600 | 0.600 | 0.600 | 0.795 | 0.698 |
| ΣRE/NWF | 0.837 | 0.748 | 0.719 | 0.719 | 0.719 | 0.718 |
| $2LiO_{0.5} + ZnO + (F/2)$ | 34.36 | 33.45 | 31.31 | 29.21 | 31.31 | 31.31 |
| $2LiO_{0.5}/(2LiO_{0.5} + ZnO)$ | 0.323 | 0.323 | 0.322 | 0.121 | 0.322 | 0.322 |
| $ZnO + 3ZrO_2 + 5TaO_{2.5}$ | 31.54 | 38.78 | 37.12 | 39.24 | 37.12 | 37.12 |
| Volatilization peak Tv (° C.) (Note 4) | 1137 | 1194 | 1121 | 1114 | 1054 | 1128 |
| Weight loss (wt %) (Note 5) | | 0.74 | 0.61 | | | |
| $BO_{1.5} \times F/LaO_{1.5}$ | 28.37 | 24.10 | 21.96 | 21.95 | 16.57 | 18.88 |
| $ZrO_2/(ZrO_2 + TaO_{2.5})$ | 0.42 | 0.39 | 0.40 | 0.40 | 0.40 | 0.40 |
| $ZrO_2 + TaO_{2.5}$ | 4.77 | 5.97 | 5.67 | 5.67 | 5.67 | 5.67 |

| | Example | | | | | |
|---|---|---|---|---|---|---|
| | Example 26 | Example 27 | Example 28 | Example 29 | Example 30 | Example 31 |
| $BO_{1.5}$ | 36.82 | 36.82 | 36.82 | 36.82 | 38.32 | 38.12 |
| $SiO_2$ | 8.47 | 8.47 | 8.47 | 8.47 | 8.11 | 8.07 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 3.17 | 3.17 | 3.17 | 3.17 | 1.01 | 1.01 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |

TABLE 4-continued

|  | | | | | | |
|---|---|---|---|---|---|---|
| ZnO | 13.33 | 13.33 | 13.33 | 13.33 | 16.83 | 16.74 |
| $LaO_{1.5}$ | 16.35 | 13.17 | 17.62 | 15.71 | 18.70 | 18.61 |
| $GdO_{1.5}$ | 16.19 | 19.37 | 11.75 | 10.48 | 12.47 | 12.41 |
| $YO_{1.5}$ | 0.00 | 0.00 | 3.17 | 6.35 | 0.00 | 0.00 |
| $TiO_2$ | 0.00 | 0.00 | 0.00 | 0.00 | 0.00 | 0.00 |
| $ZrO_2$ | 2.28 | 2.28 | 2.28 | 2.28 | 3.04 | 2.52 |
| $TaO_{2.5}$ | 3.39 | 3.39 | 3.39 | 3.39 | 1.52 | 2.52 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 23.28 | 23.28 | 23.28 | 23.28 | 22.30 | 22.19 |
| O (Note 3) | 137.29 | 137.29 | 137.29 | 137.29 | 136.52 | 137.34 |
| F/O(Molar ratio) | 0.170 | 0.170 | 0.170 | 0.170 | 0.163 | 0.162 |
| Glass transition temperature Tg (° C.) | 572 | 569 | 569 | 569 | 580 | 581 |
| Liquidus temperature LT (° C.) | 1120 | 1120 | 1120 | 1120 | 1130 | 1120 |
| Specific gravity | 5.36 | 5.42 | 5.22 | 5.13 | 5.20 | 5.25 |
| Viscosity at liquidus temperature (dPa·s) | 2.3 | 2.3 | 2.3 | 2.3 | 2.3 | 2.5 |
| Refractive index nd | 1.80466 | 1.80487 | 1.80155 | 1.79808 | 1.79900 | 1.80284 |
| Abbé number vd | 46.49 | 46.50 | 46.57 | 46.75 | 47.11 | 46.54 |
| nd − (2.25 − 0.01 × vd) | 0.020 | 0.020 | 0.017 | 0.016 | 0.020 | 0.018 |
| λ80 (nm) | 376 | 379 | 379 | 375 | 374 | 375 |
| λ70 (nm) | 352 | 355 | 350 | 349 | 350 | 350 |
| λ5 (nm) | 280 | 283 | 280 | 279 | 279 | 279 |
| $BO_{1.5}$ × F/O | 6.26 | 6.26 | 6.26 | 6.26 | 6.25 | 6.18 |
| Excess B—O—B Bonding:D (BBO1.5-(Boxygen-BBO1.5)) | −26.8 | −26.8 | −26.8 | −26.8 | −21.6 | −23.0 |
| $SiO_2/BO_{1.5}$ | 0.230 | 0.230 | 0.230 | 0.230 | 0.212 | 0.212 |
| NWF ($BO_{1.5} + SiO_2 + AlO_{1.5} + GeO_2$) | 45.29 | 45.29 | 45.29 | 45.29 | 46.43 | 46.19 |
| ΣRE | 32.54 | 32.54 | 32.54 | 32.54 | 31.17 | 31.02 |
| $LaO_{1.5}$/ΣRE | 0.502 | 0.405 | 0.542 | 0.483 | 0.600 | 0.600 |
| ΣRE/NWF | 0.718 | 0.719 | 0.718 | 0.719 | 0.671 | 0.672 |
| $2LiO_{0.5}$ + ZnO + (F/2) | 31.31 | 31.31 | 31.31 | 31.31 | 30.00 | 29.85 |
| $2LiO_{0.5}/(2LiO_{0.5} + ZnO)$ | 0.322 | 0.322 | 0.322 | 0.322 | 0.107 | 0.108 |
| ZnO + $3ZrO_2$ + $5TaO_{2.5}$ | 37.12 | 37.12 | 37.12 | 37.12 | 33.55 | 36.90 |
| Volatilization peak Tv (° C.) (Note 4) | 1061 | 1148 | 1084 | 1106 | 1024 | 1020 |
| Weight loss (wt %) (Note 5) | | | | | | |
| $BO_{1.5}$ × $F/LaO_{1.5}$ | 26.21 | 32.54 | 24.32 | 27.28 | 22.85 | 22.73 |
| $ZrO_2/(ZrO_2 + TaO_{2.5})$ | 0.40 | 0.40 | 0.40 | 0.40 | 0.67 | 0.50 |
| $ZrO_2 + TaO_{2.5}$ | 5.67 | 5.67 | 5.67 | 5.67 | 4.56 | 5.04 |

|  | Example | | | | | |
|---|---|---|---|---|---|---|
|  | Example 32 | Example 33 | Example 34 | Example 35 | Example 36 | Example 37 |
| $BO_{1.5}$ | 36.44 | 42.84 | 41.57 | 48.52 | 48.52 | 36.66 |
| $SiO_2$ | 8.38 | 9.79 | 8.99 | 1.08 | 1.08 | 8.47 |
| $GeO_2$ | 0.00 | 0.00 | 0.00 | 2.16 | 0.00 | 0.00 |
| $AlO_{1.5}$ | 0.00 | 0.00 | 0.00 | 0.00 | 2.16 | 0.00 |
| $LiO_{0.5}$ | 0.00 | 8.57 | 3.37 | 3.23 | 3.23 | 2.12 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 1.06 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 17.38 | 0.00 | 11.24 | 12.94 | 12.94 | 13.33 |
| $LaO_{1.5}$ | 19.32 | 18.36 | 17.98 | 14.88 | 14.88 | 19.52 |
| $GdO_{1.5}$ | 12.88 | 12.24 | 12.36 | 9.92 | 9.92 | 13.02 |
| $YO_{1.5}$ | 0.00 | 0.00 | 0.00 | 0.00 | 0.00 | 0.00 |
| $TiO_2$ | 0.00 | 0.00 | 0.00 | 0.00 | 0.00 | 0.00 |
| $ZrO_2$ | 2.25 | 3.30 | 0.00 | 2.96 | 2.96 | 2.34 |
| $TaO_{2.5}$ | 3.35 | 4.90 | 4.49 | 4.31 | 4.31 | 3.48 |
| $NbO_{2.5}$ | 0.00 | 0.00 | 0.00 | 0.00 | 0.00 | 0.00 |
| $WO_3$ | 0.00 | 0.00 | 0.00 | 0.00 | 0.00 | 0.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 27.23 | 20.81 | 17.98 | 17.25 | 17.25 | 23.28 |
| O (Note 3) | 136.36 | 142.47 | 141.01 | 139.09 | 138.01 | 137.40 |
| F/O(Molar ratio) | 0.200 | 0.146 | 0.128 | 0.124 | 0.125 | 0.169 |
| Glass transition temperature Tg (° C.) | 588 | 589 | 574 | 568 | 563 | 576 |

TABLE 4-continued

| | | | | | | |
|---|---|---|---|---|---|---|
| Liquidus temperature LT (° C.) | 1120 | 1120 | 1120 | 1120 | 1120 | 1120 |
| Specific gravity | 5.35 | 5.05 | 5.18 | 5.12 | 5.08 | 5.28 |
| Viscosity at liquidus temperature (dPa · s) | 2.2 | 2.2 | 2.8 | 2.2 | 2.2 | 2.4 |
| Refractive index nd | 1.80517 | 1.79086 | 1.79454 | 1.80723 | 1.80365 | 1.80163 |
| Abbé number νd | 46.12 | 47.05 | 46.90 | 45.07 | 45.56 | 46.29 |
| nd − (2.25 − 0.01 × νd) | 0.016 | 0.011 | 0.014 | 0.008 | 0.009 | 0.015 |
| λ80 (nm) | 382 | 371 | 373 | 377 | 382 | 376 |
| λ70 (nm) | 352 | 348 | 349 | 351 | 358 | 350 |
| λ5 (nm) | 280 | 281 | 280 | 280 | 286 | 280 |
| $BO_{1.5} \times F/O$ | 7.29 | 6.25 | 5.32 | 6.02 | 6.07 | 6.20 |
| Excess B—O—B Bonding:D (BBO1.5-(Boxygen-BBO1.5)) | −27.0 | −14.0 | −16.3 | 6.5 | 7.6 | −27.4 |
| $SiO_2/BO_{1.5}$ | 0.230 | 0.229 | 0.216 | 0.022 | 0.022 | 0.231 |
| NWF ($BO_{1.5} + SiO_2 + AlO_{1.5} + GeO_2$) | 44.82 | 52.63 | 50.56 | 51.76 | 51.76 | 45.13 |
| ΣRE | 32.20 | 30.60 | 30.34 | 24.80 | 24.80 | 32.54 |
| $LaO_{1.5}$/ΣRE | 0.600 | 0.600 | 0.593 | 0.600 | 0.600 | 0.600 |
| ΣRE/NWF | 0.718 | 0.581 | 0.600 | 0.479 | 0.479 | 0.721 |
| $2LiO_{0.5} + ZnO + (F/2)$ | 30.99 | 27.54 | 26.97 | 28.03 | 28.03 | 29.21 |
| $2LiO_{0.5}/(2LiO_{0.5} + ZnO)$ | 0.000 | 1.000 | 0.375 | 0.333 | 0.333 | 0.241 |
| $ZnO + 3ZrO_2 + 5TaO_{2.5}$ | 40.88 | 34.40 | 33.69 | 43.37 | 43.37 | 37.75 |
| Volatilization peak Tv (° C.) (Note 4) | 1081 | 1050 | 1037 | 1079 | 1092 | 1106 |
| Weight loss (wt %) (Note 5) | | | | | | |
| $BO_{1.5} \times F/LaO_{1.5}$ | 25.68 | 24.28 | 20.79 | 28.12 | 28.12 | 21.86 |
| $ZrO_2/(ZrO_2 + TaO_{2.5})$ | 0.40 | 0.40 | 0.00 | 0.41 | 0.41 | 0.40 |
| $ZrO_2 + TaO_{2.5}$ | 5.60 | 8.20 | 4.49 | 7.27 | 7.27 | 5.82 |

| | Example | | | | | | |
|---|---|---|---|---|---|---|---|
| | Example 38 | Example 39 | Example 40 | Example 41 | Example 42 | Example 43 | Example 44 |
| $BO_{1.5}$ | 36.66 | 36.28 | 36.28 | 42.16 | 47.62 | 50.51 | 47.87 |
| $SiO_2$ | 8.47 | 8.38 | 8.38 | 4.56 | 4.76 | 5.05 | 5.32 |
| $GeO_2$ | 0.00 | 0.00 | 0.00 | 0.00 | 0.00 | 0.00 | 0.00 |
| $AlO_{1.5}$ | 0.00 | 0.00 | 0.00 | 0.00 | 0.00 | 0.00 | 0.00 |
| $LiO_{0.5}$ | 2.12 | 3.14 | 3.14 | 3.42 | 4.76 | 5.05 | 5.32 |
| $NaO_{0.5}$ | 1.06 | 0.00 | 0.00 | 0.00 | 0.00 | 0.00 | 0.00 |
| $KO_{0.5}$ | 0.00 | 0.00 | 0.00 | 0.00 | 0.00 | 0.00 | 0.00 |
| MgO | 0.00 | 1.05 | 0.00 | 0.00 | 0.00 | 0.00 | 0.00 |
| CaO | 0.00 | 0.00 | 1.05 | 0.00 | 0.00 | 0.00 | 0.00 |
| SrO | 0.00 | 0.00 | 0.00 | 2.28 | 0.00 | 0.00 | 0.00 |
| BaO | 0.00 | 0.00 | 0.00 | 0.00 | 0.00 | 0.00 | 0.00 |
| ZnO | 13.33 | 13.19 | 13.19 | 14.36 | 11.43 | 6.06 | 6.38 |
| $LaO_{1.5}$ | 19.52 | 19.32 | 19.32 | 16.41 | 15.24 | 16.16 | 17.02 |
| $GdO_{1.5}$ | 13.02 | 12.88 | 12.88 | 10.94 | 9.52 | 10.10 | 10.64 |
| $YO_{1.5}$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $ZrO_2$ | 2.34 | 2.31 | 2.31 | 2.45 | 2.86 | 3.03 | 3.19 |
| $TaO_{2.5}$ | 3.48 | 3.45 | 3.45 | 3.42 | 3.81 | 4.04 | 4.26 |
| $NbO_{2.5}$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $YbO_{1.5}$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $SbO_{1.5}$ | 0.00 | 0.00 | 0.00 | 0.00 | 0.00 | 0.00 | 0.00 |
| Total (Note 1) | 100.00 | 100.00 | 100.00 | 100.00 | 100.00 | 100.00 | 100.00 |
| F (Note 2) | 23.28 | 23.04 | 23.04 | 18.23 | 7.62 | 8.08 | 8.51 |
| O (Note 3) | 137.40 | 137.02 | 137.02 | 136.07 | 143.34 | 145.96 | 145.75 |
| F/O(Molar ratio) | 0.169 | 0.168 | 0.168 | 0.134 | 0.053 | 0.055 | 0.058 |
| Glass transition temperature Tg (° C.) | 574 | 570 | 570 | 556 | 577 | 590 | 587 |
| Liquidus temperature LT (° C.) | 1120 | 1120 | 1120 | 1120 | 1060 | 1060 | 1070 |
| Specific gravity | 5.29 | 5.28 | 5.27 | 5.16 | 4.97 | 4.94 | 5.04 |
| Viscosity at liquidus temperature (dPa · s) | 2.4 | 2.3 | 2.3 | 2.4 | 3.2 | 3.2 | 2.9 |
| Refractive index nd | 1.80256 | 1.80235 | 1.80368 | 1.80108 | 1.80219 | 1.79967 | 1.80904 |
| Abbé number νd | 46.32 | 46.48 | 46.40 | 46.07 | 45.83 | 46.42 | 45.89 |
| nd − (2.25 − 0.01 × νd) | 0.016 | 0.017 | 0.018 | 0.012 | 0.010 | 0.014 | 0.018 |
| λ80 (nm) | 373 | 387 | 376 | 378 | 373 | 372 | 375 |
| λ70 (nm) | 349 | 362 | 350 | 351 | 348 | 348 | 348 |
| λ5 (nm) | 279 | 299 | 279 | 279 | 281 | 282 | 281 |
| $BO_{1.5} \times F/O$ | 6.20 | 6.10 | 6.10 | 5.65 | 2.53 | 2.80 | 2.80 |
| Excess B—O—B Bonding:D (BBO1.5-(Boxygen-BBO1.5)) | −27.4 | −28.2 | −28.2 | −9.6 | −0.5 | 5.6 | −2.1 |
| $SiO_2/BO_{1.5}$ | 0.231 | 0.231 | 0.231 | 0.108 | 0.100 | 0.100 | 0.111 |
| NWF ($BO_{1.5} + SiO_2 + AlO_{1.5} + GeO_2$) | 45.13 | 44.66 | 44.66 | 46.72 | 52.38 | 55.56 | 53.19 |
| ΣRE | 32.54 | 32.20 | 32.20 | 27.35 | 24.76 | 26.26 | 27.66 |
| $LaO_{1.5}$/ΣRE | 0.600 | 0.600 | 0.600 | 0.600 | 0.616 | 0.615 | 0.615 |

TABLE 4-continued

| | | | | | | | |
|---|---|---|---|---|---|---|---|
| ΣRE/NWF | 0.721 | 0.721 | 0.721 | 0.585 | 0.473 | 0.473 | 0.520 |
| $2LiO_{0.5}$ + ZnO + (F/2) | 29.21 | 30.99 | 30.99 | 30.32 | 24.76 | 20.20 | 21.28 |
| $2LiO_{0.5}/(2LiO_{0.5}$ + ZnO) | 0.241 | 0.323 | 0.323 | 0.323 | 0.454 | 0.625 | 0.625 |
| ZnO + $3ZrO_2$ + $5TaO_{2.5}$ | 37.75 | 37.37 | 37.37 | 38.81 | 39.06 | 35.35 | 37.25 |
| Volatilization peak Tv (° C.) (Note 4) | 1059 | 1027 | 1104 | 1046 | | | |
| Weight loss (wt %) (Note 5) | | | | | 0.20 | 0.11 | 0.07 |
| $BO_{1.5}$ × F/$LaO_{1.5}$ | 21.86 | 21.63 | 21.63 | 23.42 | 11.91 | 12.63 | 11.97 |
| $ZrO_2/(ZrO_2 + TaO_{2.5})$ | 0.40 | 0.40 | 0.40 | 0.42 | 0.43 | 0.43 | 0.43 |
| $ZrO_2 + TaO_{2.5}$ | 5.82 | 5.76 | 5.76 | 5.87 | 6.67 | 7.07 | 7.45 |

(Note 1) The contents of $BO_{1.5}$ to $SbO_{1.5}$ are given as cationic percentages.
(Note 2) F is the relative quantity (in moles) of fluorine ions for the total quantity of cations, denoted as 100.
(Note 3) O is the relative quantity (in moles) of oxygen ions for the total quantity of cations, denoted as 100.
(Note 4) Volatilization peak Tv is the temperature (° C.) of the endothermic peak accompanying change in the discontinuous weight reduction rate of the glass when heated to 1,200° C. at 10° C./min.
(Note 5) The weight reduction was the amount of weight reduction (wt %) when 100 mg of glass was heated from 400° C. to 1,200° C. at 10° C./min.

TABLE 5

| | Example 1 | Example 2 | Example 3 | Example 4 | Example 5 | Example 6 | Example 7 | Example 8 |
|---|---|---|---|---|---|---|---|---|
| $BO_{1.5}$ | 47.36 | 47.36 | 47.36 | 47.35 | 47.37 | 47.36 | 47.36 | 48.67 |
| $SiO_2$ | 10.53 | 10.53 | 10.53 | 10.53 | 8.77 | 7.02 | 9.65 | 9.29 |
| $GeO_2$ | 0.00 | 0.00 | 0.00 | 0.00 | 0.00 | 0.00 | 0.00 | 0.00 |
| $AlO_{1.5}$ | 0.00 | 0.00 | 0.00 | 0.00 | 0.00 | 0.00 | 0.00 | 0.00 |
| $LiO_{0.5}$ | 14.04 | 14.04 | 14.04 | 14.04 | 14.04 | 14.04 | 14.04 | 13.72 |
| $NaO_{0.5}$ | 0.00 | 0.00 | 0.00 | 0.00 | 0.00 | 0.00 | 0.00 | 0.00 |
| $KO_{0.5}$ | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 |
| CaO | 0.00 | 0.00 | 0.00 | 0.00 | 0.00 | 0.00 | 0.00 | 0.00 |
| SrO | 0.00 | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.88 |
| $LaO_{1.5}$ | 10.53 | 17.54 | 19.02 | 13.60 | 14.04 | 14.04 | 14.04 | 13.72 |
| $GdO_{1.5}$ | 14.03 | 7.02 | 4.07 | 13.60 | 14.03 | 14.03 | 14.03 | 13.72 |
| $YO_{1.5}$ | 3.51 | 3.51 | 4.98 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $ZrO_2$ | 0.00 | 0.00 | 0.00 | 0.88 | 1.75 | 3.51 | 0.00 | 0.00 |
| $TaO_{2.5}$ | 0.00 | 0.00 | 0.00 | 0.00 | 0.00 | 0.00 | 0.88 | 0.00 |
| $NbO_{2.5}$ | 0.00 | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 | 0.00 |
| $YbO_{1.5}$ | 0.00 | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 | 0.00 |
| $SbO_{1.5}$ | 0.00 | 0.00 | 0.00 | 0.00 | 0.00 | 0.00 | 0.00 | 0.00 |
| Total (Note 1) | 100.00 | 100.00 | 100.00 | 100.00 | 100.00 | 100.00 | 100.00 | 100.00 |
| F (Note 2) | 14.04 | 14.04 | 14.04 | 14.04 | 14.04 | 14.04 | 14.04 | 14.16 |
| O (Note 3) | 134.210 | 134.210 | 134.210 | 134.650 | 134.20 | 134.21 | 134.65 | 133.41 |
| F/O(Molar ratio) | 0.105 | 0.105 | 0.105 | 0.104 | 0.105 | 0.105 | 0.104 | 0.106 |
| Glass transition temperature Tg (° C.) | 567 | 558 | 556 | 560 | 558 | 557 | 563 | 555 |
| Liquidus temperature LT (° C.) | 1080 | 1070 | 1120 | 1090 | 1090 | 1100 | 1070 | 1040 |
| Specific gravity(g/cm3) | 4.44 | 4.32 | 4.12 | 4.49 | 4.60 | 4.66 | 4.60 | 4.52 |
| Viscosity at liquidus temperature (dPa · s) | 1.6 | 1.8 | 1.0 | 1.4 | 1.4 | 1.2 | 1.8 | 2.4 |
| Refractive index nd | 1.72358 | 1.72598 | 1.72510 | 1.73004 | 1.74346 | 1.75760 | 1.73636 | 1.72686 |
| Abbé number vd | 54.45 | 54.18 | 54.25 | 53.72 | 52.69 | 51.19 | 52.94 | 54.41 |
| nd − (2.25 − 0.01 × vd) | 0.018 | 0.018 | 0.018 | 0.017 | 0.020 | 0.020 | 0.016 | 0.021 |
| λ80 (nm) | 359 | 357 | 361 | 360 | 370 | 373 | 368 | 356 |
| λ70 (nm) | 340 | 338 | 342 | 341 | 344 | 346 | 345 | 336 |
| λ5 (nm) | 278 | 261 | 273 | 279 | 275 | 277 | 278 | 276 |
| $BO_{1.5}$ × F/O | 4.97 | 4.97 | 4.97 | 4.92 | 4.97 | 4.97 | 4.93 | 5.16 |
| Excess B—O—B Bonding:D ($BBO1.5-(Boxygen-BBO1.5)$) | 7.9 | 7.9 | 7.9 | 74 | 7.9 | 7.9 | 7.4 | 12.6 |
| $SiO_2/BO_{1.5}$ | 0.222 | 0.222 | 0.222 | 0.222 | 0.185 | 0.148 | 0.204 | 0.191 |
| NWF ($BO_{1.5} + SiO_2 + AlO_{1.5} + GeO_2$) | 57.89 | 57.89 | 57.89 | 57.88 | 56.14 | 54.38 | 57.01 | 57.96 |
| ΣRE | 28.07 | 28.07 | 28.07 | 27.20 | 28.07 | 28.07 | 28.07 | 27.44 |
| $LaO_{1.5}$/ΣRE | 0.375 | 0.625 | 0.678 | 0.500 | 0.500 | 0.500 | 0.500 | 0.500 |
| ΣRE/NWF | 0.485 | 0.485 | 0.485 | 0.470 | 0.500 | 0.516 | 0.492 | 0.473 |
| $2LiO_{0.5}$ + ZnO + (F/2) | 35.10 | 35.10 | 35.10 | 35.10 | 35.10 | 35.10 | 35.10 | 35.40 |
| $2LiO_{0.5}/(2LiO_{0.5}$ + ZnO) | 1.000 | 1.000 | 1.000 | 1.000 | 1.000 | 1.000 | 1.000 | 0.969 |
| ZnO + $3ZrO_2$ + $5TaO_{2.5}$ | 0.00 | 0.00 | 0.00 | 2.64 | 5.25 | 10.53 | 4.40 | 0.88 |
| Volatilization peak Tv (° C.) (Note 4) | | | | | | | | |
| Weight loss (wt %) (Note 5) | | | | | | | | |

TABLE 5-continued

| | | | | | | | | |
|---|---|---|---|---|---|---|---|---|
| $BO_{1.5} \times F/LaO_{1.5}$ | 31.57 | 18.95 | 17.48 | 24.44 | 23.69 | 23.68 | 23.68 | 25.12 |
| $ZrO_2/(ZrO_2 + TaO_{2.5})$ | N/A | N/A | N/A | 1.00 | 1.00 | 1.00 | 0.00 | N/A |
| $ZrO_2 + TaO_{2.5}$ | 0.00 | 0.00 | 0.00 | 0.88 | 1.75 | 3.51 | 0.88 | 0.00 |

| | Example 9 | Example 10 | Example 11 | Example 12 | Example 13 | Example 14 | Example 15 |
|---|---|---|---|---|---|---|---|
| $BO_{1.5}$ | 60.11 | 49.56 | 48.24 | 48.89 | 47.41 | 48.24 | 46.43 |
| $SiO_2$ | 0.00 | 9.46 | 9.65 | 9.78 | 11.21 | 10.53 | 10.71 |
| $GeO_2$ | 0.00 | 0.00 | 0.00 | 0.00 | 0.00 | 0.00 | 0.00 |
| $AlO_{1.5}$ | 8.20 | 0.00 | 0.00 | 0.00 | 0.00 | 0.00 | 0.00 |
| $LiO_{0.5}$ | 14.21 | 12.61 | 12.28 | 12.44 | 11.21 | 11.40 | 14.29 |
| $NaO_{0.5}$ | 0.00 | 0.00 | 0.00 | 0.00 | 0.00 | 0.00 | 0.00 |
| $KO_{0.5}$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| CaO | 0.00 | 0.00 | 0.00 | 0.00 | 0.00 | 0.00 | 1.79 |
| SrO | 0.00 | 0.00 | 0.00 | 0.00 | 0.00 | 0.00 | 0.00 |
| BaO | 0.00 | 0.00 | 0.00 | 0.00 | 0.00 | 0.00 | 0.00 |
| ZnO | 0.00 | 0.00 | 2.63 | 0.89 | 3.45 | 2.63 | 0.00 |
| $LaO_{1.5}$ | 8.74 | 13.96 | 13.60 | 13.78 | 13.36 | 13.60 | 13.39 |
| $GdO_{1.5}$ | 8.74 | 13.96 | 13.60 | 13.78 | 13.36 | 13.60 | 13.39 |
| $YO_{1.5}$ | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $ZrO_2$ | 0.00 | 0.45 | 0.00 | 0.44 | 0.00 | 0.00 | 0.00 |
| $TaO_{2.5}$ | 0.00 | 0.00 | 0.00 | 0.00 | 0.00 | 0.00 | 0.00 |
| $NbO_{2.5}$ | 0.00 | 0.00 | 0.00 | 0.00 | 0.00 | 0.00 | 0.00 |
| $WO_3$ | 0.00 | 0.00 | 0.00 | 0.00 | 0.00 | 0.00 | 0.00 |
| $YbO_{1.5}$ | 0.00 | 0.00 | 0.00 | 0.00 | 0.00 | 0.00 | 0.00 |
| $CeO_2$ | 0.00 | 0.00 | 0.00 | 0.00 | 0.00 | 0.00 | 0.00 |
| $SnO_2$ | 0.00 | 0.00 | 0.00 | 0.00 | 0.00 | 0.00 | 0.00 |
| $SbO_{1.5}$ | 100.00 | 0.00 | 0.00 | 0.00 | 0.00 | 0.00 | 0.00 |
| Total (Note 1) | 100.00 | 100.00 | 100.00 | 100.00 | 100.00 | 100.00 | 100.00 |
| F (Note 2) | 8.74 | 14.41 | 17.54 | 14.22 | 13.79 | 14.04 | 10.71 |
| O (Note 3) | 131.42 | 135.14 | 132.46 | 135.12 | 135.78 | 135.53 | 134.82 |
| F/O (Molar ratio) | 0.067 | 0.107 | 0.132 | 0.105 | 0.102 | 0.104 | 0.079 |
| Glass transition temperature Tg (° C.) | 547 | 558 | 553 | 566 | 562 | 565 | 556 |
| Liquidus temperature LT (° C.) | 1040 | 1050 | 1040 | 1040 | 1050 | 1040 | 1100 |
| Specific gravity (g/cm3) | 3.86 | 4.54 | 4.55 | 4.54 | 4.53 | 4.54 | 4.46 |
| Viscosity at liquidus temperature (dPa·s) | 2.0 | 2.4 | 2.8 | 2.8 | 3.0 | 3.0 | 1.4 |
| Refractive index nd | 1.68084 | 1.73062 | 1.72482 | 1.73085 | 1.72791 | 1.72955 | 1.72912 |
| Abbé number νd | 56.60 | 54.16 | 54.42 | 54.06 | 54.00 | 54.04 | 53.82 |
| nd − (2.25 − 0.01 × νd) | −0.003 | 0.022 | 0.019 | 0.021 | 0.018 | 0.020 | 0.017 |
| λ80 (nm) | 371 | 356 | 354 | 356 | 353 | 354 | 360 |
| λ70 (nm) | 355 | 336 | 334 | 338 | 336 | 336 | 339 |
| λ5 (nm) | 298 | 277 | 276 | 277 | 277 | 277 | 274 |
| $BO_{1.5} \times F/O$ | 4.03 | 5.30 | 6.37 | 5.13 | 4.84 | 5.02 | 3.67 |
| Excess B—O—B Bonding: D (BBO1.5-(Boxygen-BBO1.5)) | 48.9 | 13.5 | 12.3 | 11.6 | 6.4 | 9.2 | 4.5 |
| $SiO_2/BO_{1.5}$ | 0.000 | 0.191 | 0.200 | 0.200 | 0.236 | 0.218 | 0.231 |
| NWF ($BO_{1.5} + SiO_2 + AlO_{1.5} + GeO_2$) | 68.31 | 59.02 | 57.89 | 58.67 | 58.62 | 58.77 | 57.14 |
| ΣRE | 17.48 | 27.92 | 27.20 | 27.56 | 26.72 | 27.20 | 26.78 |
| $LaO_{1.5}$/ΣRE | 0.500 | 0.500 | 0.500 | 0.500 | 0.500 | 0.500 | 0.500 |
| ΣRE/NWF | 0.256 | 0.473 | 0.470 | 0.470 | 0.456 | 0.463 | 0.469 |
| $2LiO_{0.5} + ZnO + (F/2)$ | 32.79 | 32.43 | 35.96 | 32.88 | 32.77 | 32.45 | 33.94 |
| $2LiO_{0.5}/(2LiO_{0.5} + ZnO)$ | 1.000 | 1.000 | 0.903 | 0.965 | 0.867 | 0.897 | 1.000 |
| $ZnO + 3ZrO_2 + 5TaO_{2.5}$ | 0.00 | 1.35 | 2.63 | 2.21 | 3.45 | 2.63 | 0.00 |
| Volatilization peak Tv (° C.) (Note 4) | | | | | | | |
| Weight loss (wt %) (Note 5) | | | | | | | |
| $BO_{1.5} \times F/LaO_{1.5}$ | 30.06 | 25.58 | 31.11 | 25.23 | 24.47 | 24.90 | 18.57 |
| $ZrO_2/(ZrO_2 + TaO_{2.5})$ | N/A | 1.00 | N/A | 1.00 | N/A | N/A | N/A |
| $ZrO_2 + TaO_{2.5}$ | 0.00 | 0.45 | 0.00 | 0.44 | 0.00 | 0.00 | 0.00 |

| | Example 16 | Example 17 | Example 18 | Example 19 | Example 20 | Example 21 | Example 22 |
|---|---|---|---|---|---|---|---|
| $BO_{1.5}$ | 46.43 | 46.43 | 46.52 | 41.80 | 61.82 | 56.03 | 42.48 |
| $SiO_2$ | 10.71 | 10.71 | 10.08 | 14.55 | 4.55 | 7.25 | 14.16 |
| $GeO_2$ | 0.00 | 0.00 | 0.00 | 0.00 | 0.00 | 0.00 | 0.00 |
| $AlO_{1.5}$ | 0.00 | 0.00 | 0.00 | 0.00 | 0.00 | 0.00 | 0.00 |
| $LiO_{0.5}$ | 14.29 | 14.29 | 12.40 | 14.55 | 7.27 | 8.70 | 14.16 |
| $NaO_{0.5}$ | 0.00 | 0.00 | 0.00 | 0.00 | 0.00 | 0.00 | 0.00 |
| $KO_{0.5}$ | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 |
| CaO | 0.00 | 0.00 | 0.00 | 0.00 | 3.64 | 5.80 | 0.00 |
| SrO | 1.79 | 0.00 | 0.00 | 0.00 | 0.00 | 0.00 | 0.00 |
| BaO | 0.00 | 1.79 | 0.00 | 0.00 | 0.00 | 0.00 | 0.00 |
| ZnO | 0.00 | 0.00 | 0.00 | 0.00 | 0.00 | 0.00 | 0.00 |
| $LaO_{1.5}$ | 13.39 | 13.39 | 15.50 | 14.55 | 12.27 | 16.91 | 14.60 |
| $GdO_{1.5}$ | 13.39 | 13.39 | 15.50 | 14.55 | 10.45 | 4.83 | 14.60 |
| $YO_{1.5}$ | 0.00 | 0.00 | 0.00 | 0.00 | 0.00 | 0.48 | 0.00 |

TABLE 5-continued

|   | | | | | | | |
|---|---|---|---|---|---|---|---|
| TiO$_2$ | 0.00 | 0.00 | 0.00 | 0.00 | 0.00 | 0.00 | 0.00 |
| ZrO$_2$ | 0.00 | 0.00 | 0.00 | 0.00 | 0.00 | 0.00 | 0.00 |
| TaO$_{2.5}$ | 0.00 | 0.00 | 0.00 | 0.00 | 0.00 | 0.00 | 0.00 |
| NbO$_{2.5}$ | 0.00 | 0.00 | 0.00 | 0.00 | 0.00 | 0.00 | 0.00 |
| WO$_3$ | 0.00 | 0.00 | 0.00 | 0.00 | 0.00 | 0.00 | 0.00 |
| YbO$_{1.5}$ | 0.00 | 0.00 | 0.00 | 0.00 | 0.00 | 0.00 | 0.00 |
| CeO$_2$ | 0.00 | 0.00 | 0.00 | 0.00 | 0.00 | 0.00 | 0.00 |
| SnO$_2$ | 0.00 | 0.00 | 0.00 | 0.00 | 0.00 | 0.00 | 0.00 |
| SbO$_{1.5}$ | 0.00 | 0.00 | 0.00 | 0.00 | 0.00 | 0.00 | 0.00 |
| Total (Note 1) | 100.00 | 100.00 | 100.00 | 100.00 | 100.00 | 100.00 | 100.00 |
| F (Note 2) | 10.71 | 10.71 | 24.79 | 14.55 | 10.91 | 11.59 | 10.62 |
| O (Note 3) | 134.82 | 134.82 | 130.25 | 135.45 | 137.73 | 136.23 | 137.61 |
| F/O(Molar ratio) | 0.079 | 0.079 | 0.190 | 0.107 | 0.079 | 0.085 | 0.077 |
| Glass transition temperature Tg (° C.) | 561 | 557 | 554 | 561 | 599 | 578 | 574 |
| Liquidus temperature LT (° C.) | 1110 | 1110 | 1060 | 1080 | 1070 | 1070 | 1120 |
| Specific gravity(g/cm3) | 4.48 | 4.50 | 4.70 | 4.55 | 4.17 | 3.98 | 4.57 |
| Viscosity at liquidus temperature (dPa · s) | 1.2 | 1.2 | 2.0 | 1.6 | 1.6 | 1.8 | 1.2 |
| Refractive index nd | 1.72923 | 1.72886 | 1.72964 | 1.72849 | 1.70816 | 1.70373 | 1.73803 |
| Abbé number vd | 53.90 | 53.75 | 54.65 | 53.88 | 56.25 | 56.07 | 53.06 |
| nd − (2.25 − 0.01 × vd) | 0.018 | 0.016 | 0.026 | 0.017 | 0.021 | 0.014 | 0.019 |
| λ80 (nm) | 361 | 363 | 358 | 357 | 358 | 358 | 364 |
| λ70 (nm) | 342 | 343 | 339 | 337 | 339 | 341 | 345 |
| λ5 (nm) | 275 | 277 | 274 | 278 | 278 | 278 | 279 |
| BO$_{1.5}$ × F/O | 3.67 | 3.67 | 8.84 | 4.47 | 4.88 | 4.76 | 3.27 |
| Excess B—O—B Bonding:D (BBO1.5-(Boxygen-BBO1.5)) | 4.5 | 4.5 | 9.3 | −10.1 | 47.7 | 31.9 | −10.2 |
| SiO$_2$/BO$_{1.5}$ | 0.231 | 0.231 | 0.217 | 0.348 | 0.074 | 0.129 | 0.333 |
| NWF (BO$_{1.5}$ + SiO$_2$ + AlO$_{1.5}$ + GeO$_2$) | 57.14 | 57.14 | 56.60 | 56.35 | 66.37 | 63.28 | 56.64 |
| ΣRE | 26.78 | 26.78 | 31.00 | 29.10 | 22.72 | 22.22 | 29.20 |
| LaO$_{1.5}$/ΣRE | 0.500 | 0.500 | 0.500 | 0.500 | 0.540 | 0.761 | 0.500 |
| ΣRE/NWF | 0.469 | 0.469 | 0.548 | 0.516 | 0.342 | 0.351 | 0.516 |
| 2LiO$_{0.5}$ + ZnO + (F/2) | 33.94 | 33.94 | 37.20 | 36.37 | 19.99 | 23.20 | 33.63 |
| 2LiO$_{0.5}$/(2LiO$_{0.5}$ + ZnO) | 1.000 | 1.000 | 1.000 | 1.000 | 1.000 | 1.000 | 1.000 |
| ZnO + 3ZrO$_2$ + 5TaO$_{2.5}$ | 0.00 | 0.00 | 0.00 | 0.00 | 0.00 | 0.00 | 0.00 |
| Volatilization peak Tv (° C.) (Note 4) Weight loss (wt %) (Note 5) | | | | | | | |
| BO$_{1.5}$ × F/LaO$_{1.5}$ | 18.57 | 18.57 | 37.20 | 20.90 | 27.48 | 19.20 | 15.45 |
| ZrO$_2$/(ZrO$_2$ + TaO$_{2.5}$) | N/A | N/A | N/A | N/A | N/A | N/A | N/A |
| ZrO$_2$ + TaO$_{2.5}$ | 0.00 | 0.00 | 0.00 | 0.00 | 0.00 | 0.00 | 0.00 |

|   | Example 23 | Example 24 | Example 25 | Example 26 | Example 27 | Example 28 |
|---|---|---|---|---|---|---|
| BO$_{1.5}$ | 44.84 | 63.58 | 51.03 | 62.06 | 60.71 | 63.75 |
| SiO$_2$ | 10.34 | 2.89 | 3.06 | 2.66 | 2.60 | 2.73 |
| GeO$_2$ | 0.00 | 0.00 | 0.00 | 0.00 | 0.00 | 0.00 |
| AlO$_{1.5}$ | 0.00 | 0.00 | 0.00 | 0.00 | 0.00 | 0.00 |
| LiO$_{0.5}$ | 13.79 | 15.03 | 12.24 | 7.09 | 6.94 | 7.29 |
| NaO$_{0.5}$ | 0.00 | 0.00 | 0.00 | 0.00 | 0.00 | 0.00 |
| KO$_{0.5}$ | 0.00 | 0.00 | 0.00 | 0.00 | 0.00 | 0.00 |
| MgO | 5.17 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 0.00 | 0.00 | 5.61 | 2.66 | 2.60 | 0.00 |
| LaO$_{1.5}$ | 12.93 | 9.25 | 13.27 | 13.56 | 13.27 | 13.93 |
| GdO$_{1.5}$ | 12.93 | 6.95 | 11.22 | 11.97 | 11.71 | 12.30 |
| YO$_{1.5}$ | 0.00 | 0.00 | 0.00 | 0.00 | 0.00 | 0.00 |
| TiO$_2$ | 0.00 | 0.00 | 0.00 | 0.00 | 0.00 | 0.00 |
| ZrO$_2$ | 0.00 | 0.00 | 3.06 | 0.00 | 2.17 | 0.00 |
| TaO$_{2.5}$ | 0.00 | 0.00 | 0.51 | 0.00 | 0.00 | 0.00 |
| NbO$_{2.5}$ | 0.00 | 0.00 | 0.00 | 0.00 | 0.00 | 0.00 |
| WO$_3$ | 0.00 | 0.00 | 0.00 | 0.00 | 0.00 | 0.00 |
| YbO$_{1.5}$ | 0.00 | 2.30 | 0.00 | 0.00 | 0.00 | 0.00 |
| CeO$_2$ | 0.00 | 0.00 | 0.00 | 0.00 | 0.00 | 0.00 |
| SnO$_2$ | 0.00 | 0.00 | 0.00 | 0.00 | 0.00 | 0.00 |
| SbO$_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 10.34 | 9.25 | 20.41 | 10.64 | 10.41 | 10.93 |
| O (Note 3) | 133.63 | 131.79 | 128.32 | 137.59 | 138.94 | 138.61 |
| F/O(Molar ratio) | 0.077 | 0.070 | 0.159 | 0.077 | 0.075 | 0.079 |
| Glass transition temperature Tg (° C.) | 550 | 566 | 519 | 590 | 591 | 604 |
| Liquidus temperature LT (° C.) | 1090 | 1040 | 1070 | 1070 | 1060 | 1070 |
| Specific gravity(g/cm3) | 4.41 | 4.54 | 4.61 | 4.50 | 4.52 | 4.46 |
| Viscosity at liquidus temperature (dPa · s) | 1.4 | 3.0 | 3.0 | 3.0 | 3.3 | 3.0 |
| Refractive index nd | 1.72536 | 1.68597 | 1.74343 | 1.73570 | 1.74675 | 1.73115 |
| Abbé number vd | 53.93 | 57.31 | 51.52 | 54.17 | 52.64 | 54.83 |

TABLE 5-continued

| | | | | | | |
|---|---|---|---|---|---|---|
| nd − (2.25 − 0.01 × vd) | 0.015 | 0.009 | 0.009 | 0.027 | 0.023 | 0.029 |
| λ80 (nm) | 379 | 354 | 358 | 361 | 359 | 358 |
| λ70 (nm) | 362 | 336 | 338 | 340 | 338 | 337 |
| λ5 (nm) | 312 | 277 | 265 | 275 | 275 | 275 |
| $BO_{1.5}$ × F/O | 3.45 | 4.45 | 8.12 | 4.80 | 4.55 | 5.03 |
| Excess B—O—B Bonding:D (BBO1.5-(Boxygen-BBO1.5)) | 0.9 | 59.0 | 24.8 | 48.6 | 43.2 | 52.6 |
| $SiO_2/BO_{1.5}$ | 0.231 | 0.045 | 0.060 | 0.043 | 0.043 | 0.043 |
| NWF ($BO_{1.5} + SiO_2 + AlO_{1.5} + GeO_2$) | 55.18 | 66.47 | 54.09 | 64.72 | 63.31 | 66.48 |
| ΣRE | 25.86 | 18.50 | 24.49 | 25.53 | 24.98 | 26.23 |
| $LaO_{1.5}$/ΣRE | 0.500 | 0.500 | 0.542 | 0.531 | 0.531 | 0.531 |
| ΣRE/NWF | 0.469 | 0.278 | 0.453 | 0.395 | 0.395 | 0.395 |
| $2LiO_{0.5}$ + ZnO + (F/2) | 32.75 | 34.68 | 40.29 | 22.16 | 21.68 | 20.04 |
| $2LiO_{0.5}/(2LiO_{0.5} + ZnO)$ | 1.000 | 1.000 | 0.814 | 0.842 | 0.842 | 1.000 |
| ZnO + $3ZrO_2$ + $5TaO_{2.5}$ | 0.00 | 0.00 | 17.34 | 2.66 | 9.11 | 0.00 |
| Volatilization peak Tv (° C.) (Note 4) | | | | | | |
| Weight loss (wt %) (Note 5) | | | | 0.69 | 0.78 | 0.71 |
| $BO_{1.5}$ × $F/LaO_{1.5}$ | 17.93 | 31.79 | 39.24 | 24.35 | 23.81 | 25.01 |
| $ZrO_2/(ZrO_2 + TaO_{2.5})$ | N/A | N/A | 0.86 | N/A | 1.00 | N/A |
| $ZrO_2 + TaO_{2.5}$ | 0.00 | 0.00 | 3.57 | 0.00 | 2.17 | 0.00 |

(Note 1) The contents of $BO_{1.5}$ to $SbO_{1.5}$ are given as cationic percentages.
(Note 2) F is the relative quantity (in moles) of fluorine ions for the total quantity of cations, denoted as 100.
(Note 3) O is the relative quantity (in moles) of oxygen ions for the total quantity of cations, denoted as 100.
(Note 4) Volatilization peak Tv is the temperature (° C.) of the endothermic peak accompanying change in the discontinuous weight reduction rate of the glass when heated to 1,200° C. at 10° C./min.
(Note 5) The weight reduction was the amount of weight reduction (wt %) when 100 mg of glass was heated from 400° C. to 1,200° C. at 10° C./min.

TABLE 6

| | Example | | | | | |
|---|---|---|---|---|---|---|
| | Example 1 | Example 2 | Example 3 | Example 4 | Example 5 | Example 6 |
| $BO_{1.5}$ | 35.61 | 34.96 | 37.00 | 36.29 | 33.11 | 42.00 |
| $SiO_2$ | 1.87 | 1.84 | 1.95 | 1.91 | 3.89 | 0.00 |
| $GeO_2$ | 0.00 | 0.00 | 0.00 | 0.00 | 0.00 | 0.00 |
| $AlO_{1.5}$ | 0.00 | 0.00 | 0.00 | 0.00 | 0.00 | 0.00 |
| $LiO_{0.5}$ | 3.75 | 3.68 | 3.89 | 3.82 | 3.89 | 0.00 |
| $NaO_{0.5}$ | 0.00 | 0.00 | 0.00 | 0.00 | 0.00 | 0.00 |
| $KO_{0.5}$ | 0.00 | 0.00 | 0.00 | 0.00 | 0.00 | 0.00 |
| MgO | 0.00 | 0.00 | 0.00 | 0.00 | 0.00 | 0.00 |
| CaO | 0.00 | 0.00 | 0.00 | 0.00 | 0.00 | 0.00 |
| SrO | 0.00 | 0.00 | 0.00 | 0.00 | 0.00 | 0.00 |
| BaO | 0.00 | 0.00 | 0.00 | 0.00 | 0.00 | 0.00 |
| ZnO | 17.81 | 17.48 | 18.50 | 18.15 | 18.50 | 19.00 |
| $LaO_{1.5}$ | 20.62 | 21.16 | 19.47 | 20.06 | 20.45 | 19.00 |
| $GdO_{1.5}$ | 7.97 | 8.74 | 6.33 | 7.16 | 7.30 | 6.00 |
| $YO_{1.5}$ | 0.00 | 0.00 | 0.00 | 0.00 | 0.00 | 1.00 |
| $TiO_2$ | 0.00 | 0.00 | 0.00 | 0.00 | 0.00 | 0.00 |
| $ZrO_2$ | 2.53 | 2.48 | 2.63 | 2.58 | 2.63 | 2.00 |
| $TaO_{2.5}$ | 5.15 | 5.06 | 5.36 | 5.25 | 5.36 | 4.00 |
| $NbO_{2.5}$ | 0.00 | 0.00 | 0.00 | 0.00 | 0.00 | 0.00 |
| $WO_3$ | 4.69 | 4.60 | 4.87 | 4.78 | 4.87 | 7.00 |
| $YbO_{1.5}$ | 0.00 | 0.00 | 0.00 | 0.00 | 0.00 | 0.00 |
| $CeO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $SbO_{1.5}$ | 0.00 | 0.00 | 0.00 | 0.00 | 0.00 | 0.00 |
| Total (Note 1) | 100.00 | 100.00 | 100.00 | 100.00 | 100.00 | 100.00 |
| F (Note 2) | 11.25 | 14.72 | 3.89 | 7.64 | 7.79 | 8.00 |
| O (Note 3) | 146.11 | 144.34 | 149.87 | 147.95 | 148.89 | 152.00 |
| F/O(Molar ratio) | 0.077 | 0.102 | 0.026 | 0.052 | 0.052 | 0.053 |
| Glass transition temperature Tg (° C.) | 562 | 559 | 568 | 564 | 567 | 585 |
| Liquidus temperature LT (° C.) | 1120 | 1120 | 1120 | 1120 | 1120 | 1120 |
| Specific gravity | 5.65 | 5.69 | 5.53 | 5.61 | 5.61 | 5.61 |
| Viscosity at liquidus temperature (dPa · s) | 1.6 | 1.4 | 2.0 | 1.8 | 2.0 | 1.8 |
| Refractive index nd | 1.87924 | 1.87679 | 1.88262 | 1.88077 | 1.88283 | 1.87398 |
| Abbé number vd | 37.96 | 38.19 | 37.34 | 37.70 | 37.44 | 36.99 |
| nd − (2.25 − 0.01 × vd) | 0.009 | 0.009 | 0.006 | 0.008 | 0.007 | −0.006 |
| λ80 (nm) | 443 | 442 | 443 | 448 | 451 | 438 |
| λ70 (nm) | 386 | 386 | 385 | 385 | 387 | 387 |
| λ5 (nm) | 345 | 344 | 347 | 347 | 347 | 350 |
| $BO_{1.5}$ × F/O | 2.74 | 3.57 | 0.96 | 1.89 | 1.72 | 2.23 |
| Excess B—O—B Bonding:D (BBO1.5-(Boxygen-BBO1.5)) | −39.3 | −39.5 | −38.9 | −39.1 | −49.6 | −26.0 |
| $SiO_2/BO_{1.5}$ | 0.053 | 0.053 | 0.053 | 0.053 | 0.117 | 0.000 |
| NWF ($BO_{1.5} + SiO_2 + AlO_{1.5} + GeO_2$) | 37.48 | 36.80 | 38.95 | 38.20 | 37.00 | 42.00 |

TABLE 6-continued

| | | | | | | |
|---|---|---|---|---|---|---|
| ΣRE | 28.59 | 29.90 | 25.80 | 27.22 | 27.75 | 26.00 |
| $LaO_{1.5}/\Sigma RE$ | 0.721 | 0.708 | 0.755 | 0.737 | 0.737 | 0.731 |
| ΣRE/NWF | 0.763 | 0.812 | 0.662 | 0.712 | 0.750 | 0.619 |
| $2LiO_{0.5} + ZnO + (F/2)$ | 30.93 | 32.20 | 28.23 | 29.61 | 30.17 | 23.00 |
| $2LiO_{0.5}/(2LiO_{0.5} + ZnO)$ | 0.296 | 0.296 | 0.296 | 0.296 | 0.296 | 0.000 |
| $ZnO + 3ZrO_2 + 5TaO_{2.5}$ | 51.15 | 50.22 | 53.19 | 52.14 | 53.19 | 45.00 |
| Volatilization peak Tv (° C.) (Note 4) | | | | | | |
| Weight loss (wt %) (Note 5) | | 0.51 | | | | |
| $BO_{1.5} \times F/LaO_{1.5}$ | 9.71 | 12.16 | 3.7 | 6.91 | 6.31 | 8.84 |
| $ZrO_2/(ZrO_2 + TaO_{2.5})$ | 0.33 | 0.33 | 0.33 | 0.33 | 0.33 | 0.33 |
| $ZrO_2 + TaO_{2.5}$ | 7.68 | 7.54 | 7.99 | 7.83 | 7.99 | 6.00 |

| | Example | | |
|---|---|---|---|
| | Example 7 | Example 8 | Example 9 |
| $BO_{1.5}$ | 32.00 | 38.10 | 36.29 |
| $SiO_2$ | 6.00 | 3.81 | 1.91 |
| $GeO_2$ | 0.00 | 0.00 | 0.00 |
| $AlO_{1.5}$ | 0.00 | 0.00 | 0.00 |
| $LiO_{0.5}$ | 0.00 | 3.81 | 3.82 |
| $NaO_{0.5}$ | 0.00 | 0.00 | 0.00 |
| $KO_{0.5}$ | 0.00 | 0.00 | 0.00 |
| MgO | 0.00 | 0.00 | 0.00 |
| CaO | 0.00 | 0.00 | 0.00 |
| SrO | 0.00 | 0.00 | 0.00 |
| BaO | 0.00 | 0.00 | 0.00 |
| ZnO | 21.00 | 15.24 | 18.15 |
| $LaO_{1.5}$ | 21.50 | 20.95 | 20.06 |
| $GdO_{1.5}$ | 5.00 | 7.62 | 7.16 |
| $YO_{1.5}$ | 0.00 | 0.00 | 0.00 |
| $TiO_2$ | 0.50 | 0.00 | 0.00 |
| $ZrO_2$ | 2.50 | 2.86 | 2.58 |
| $TaO_{2.5}$ | 5.00 | 5.71 | 5.25 |
| $NbO_{2.5}$ | 0.50 | 0.00 | 0.00 |
| $WO_3$ | 6.00 | 1.90 | 4.78 |
| $YbO_{1.5}$ | 0.00 | 0.00 | 0.00 |
| $CeO_2$ | 0.00 | 0.00 | 0.00 |
| $SnO_2$ | 0.00 | 0.00 | 0.00 |
| $SbO_{1.5}$ | 0.00 | 0.00 | 0.00 |
| Total (Note 1) | 100.00 | 100.00 | 100.00 |
| F (Note 2) | 8.00 | 11.43 | 7.64 |
| O (Note 3) | 154.50 | 144.75 | 147.95 |
| F/O (Molar ratio) | 0.052 | 0.079 | 0.052 |
| Glass transition temperature Tg (° C.) | 597 | 567 | 560 |
| Liquidus temperature LT (° C.) | 1120 | 1100 | 1110 |
| Specific gravity | 5.61 | 5.44 | 5.60 |
| Viscosity at liquidus temperature (dPa·s) | 2.0 | 2.2 | 2.0 |
| Refractive index nd | 1.88583 | 1.85348 | 1.87976 |
| Abbé number νd | 36.33 | 40.91 | 37.67 |
| nd − (2.25 − 0.01 × νd) | −0.001 | 0.013 | 0.006 |
| λ80 (nm) | 441 | 405 | 463 |
| λ70 (nm) | 388 | 372 | 387 |
| λ5 (nm) | 351 | 336 | 346 |
| $BO_{1.5} \times F/O$ | 1.66 | 3.01 | 1.87 |
| Excess B—O—B Bonding:D (BBO1.5-(Boxygen-BBO1.5)) | −58.5 | −30.5 | −39.1 |
| $SiO_2/BO_{1.5}$ | 0.188 | 0.100 | 0.053 |
| NWF ($BO_{1.5} + SiO_2 + AlO_{1.5} + GeO_2$) | 38.00 | 41.91 | 38.20 |
| ΣRE | 26.50 | 28.57 | 27.22 |
| $LaO_{1.5}/\Sigma RE$ | 0.811 | 0.733 | 0.737 |
| ΣRE/NWF | 0.697 | 0.682 | 0.712 |
| $2LiO_{0.5} + ZnO + (F/2)$ | 25.00 | 28.57 | 29.61 |
| $2LiO_{0.5}/(2LiO_{0.5} + ZnO)$ | 0.000 | 0.333 | 0.296 |
| $ZnO + 3ZrO_2 + 5TaO_{2.5}$ | 53.50 | 52.37 | 52.14 |
| Volatilization peak Tv (° C.) (Note 4) | | | |
| Weight loss (wt %) (Note 5) | | 0.23 | 0.06 |
| $BO_{1.5} \times F/LaO_{1.5}$ | 5.95 | 10.39 | 6.91 |
| $ZrO_2/(ZrO_2 + TaO_{2.5})$ | 0.33 | 0.33 | 0.33 |
| $ZrO_2 + TaO_{2.5}$ | 7.50 | 8.57 | 7.83 |

(Note 1) The contents of $BO_{1.5}$ to $SbO_{1.5}$ are given as cationic percentages.
(Note 2) F is the relative quantity (in moles) of fluorine ions for the total quantity of cations, denoted as 100.
(Note 3) O is the relative quantity (in moles) of oxygen ions for the total quantity of cations, denoted as 100.
(Note 4) Volatilization peak Tv is the temperature (° C.) of the endothermic peak accompanying change in the discontinuous weight reduction rate of the glass when heated to 1,200° C. at 10° C./min.
(Note 5) The weight reduction was the amount of weight reduction (wt %) when 100 mg of glass was heated from 400° C. to 1,200° C. at 10° C./min.

The value of $B_B$—($B_O$—$B_B$) was denoted as D, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$. In Example 32 of Table 3, D is −0.60. In Example 33, D is 0.60. Glass in which D was 22.0 was prepared as a reference sample (reference composition).

Changes in the refractive index nd and the Abbé number νd when the melting time was varied were examined for Examples 32 and 33 in Table 3 and the reference composition. The results are given in FIG. 1.

The numbers recorded near the various plots in FIG. 1 denote melting times in unit of hours. Examples 32 and 33 of Table 3, in which D was small, exhibited smaller changes in refractive index and Abbé number for change in melting time than the reference composition.

Figure 2:
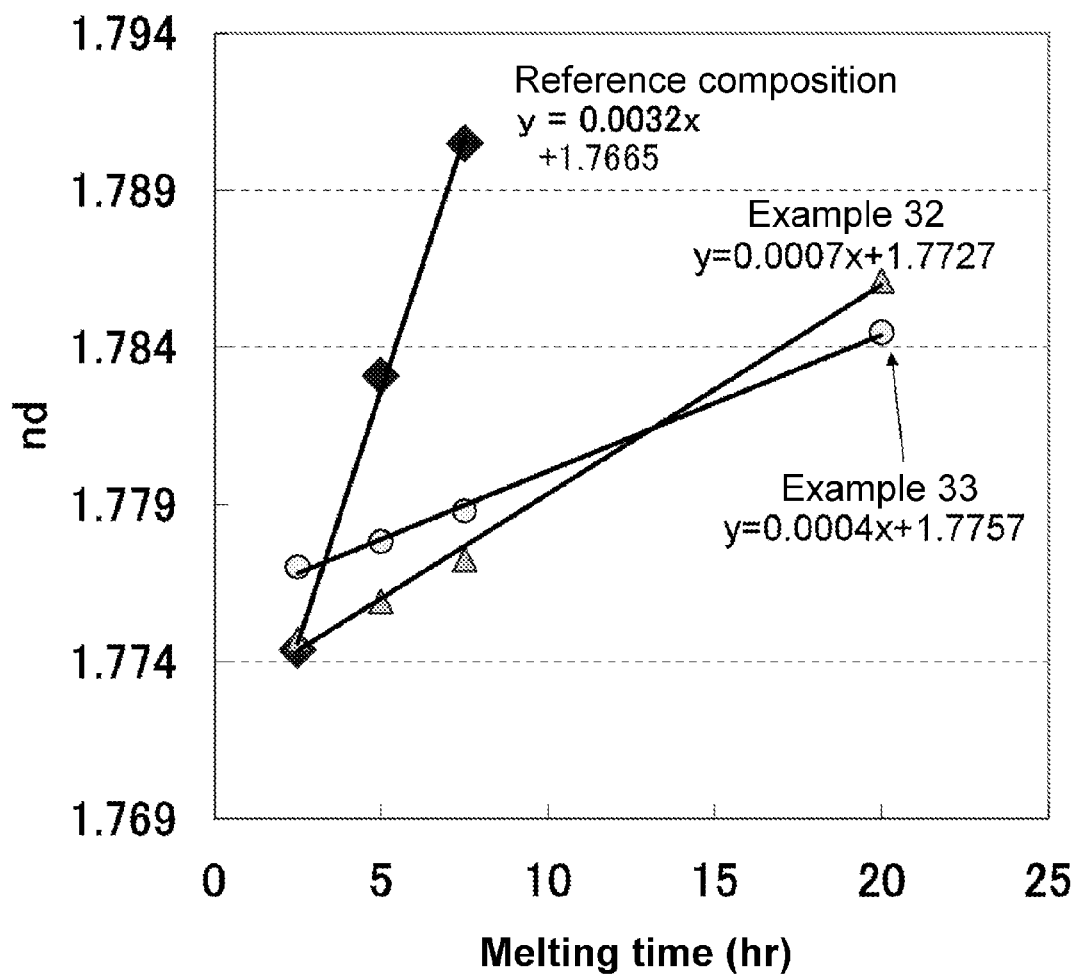
FIG. 2 shows the change in the refractive indexes of Examples 32 and 33 in Table 3 (Form A), with the horizontal axis denoting the melting time and the vertical axis denoting the refractive index nd.

FIG. 2 shows the change in refractive index in Examples 32 and 33 of Table 3, with the melting time denoted by the horizontal axis and the refractive index nd denoted by the vertical axis.

Figure 3:
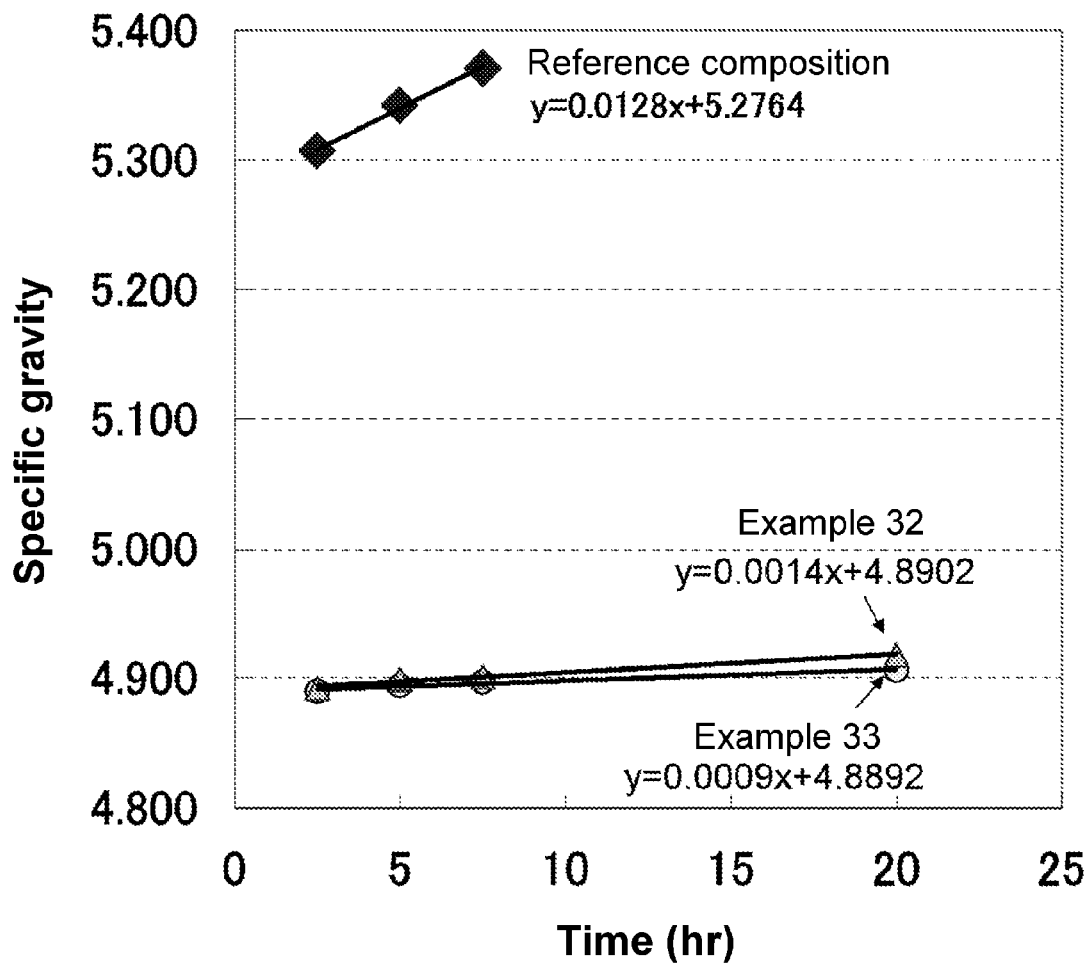
FIG. 3 shows the change in specific gravity of Examples 32 and 33 in Table 3 (Form A), with the horizontal axis denoting the melting time and the vertical axis denoting specific gravity.

FIG. 3 shows the change in specific gravity in Examples 32 and 33 of Table 3, with the melting time denoted by the horizontal axis and the specific gravity denoted by the vertical axis.

Figure 4:
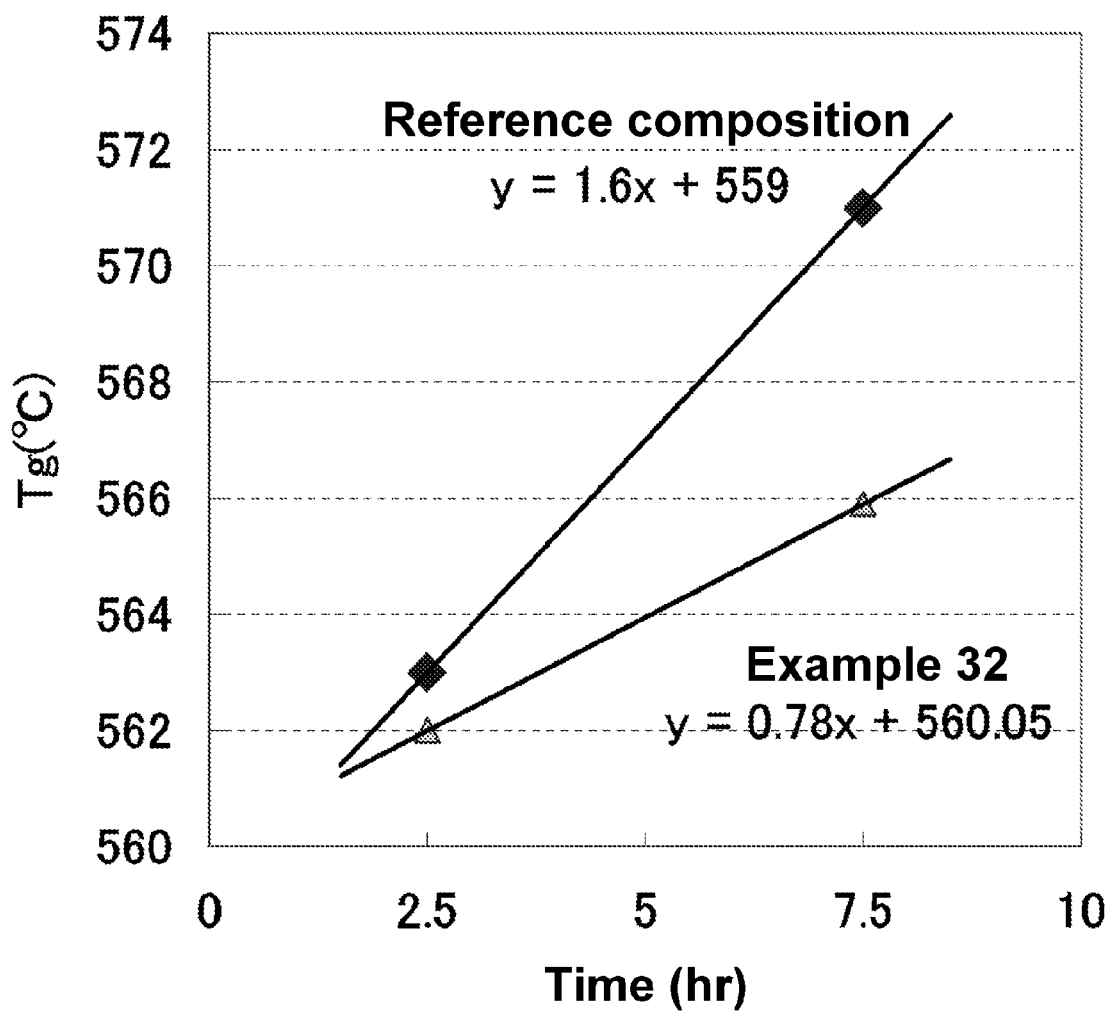
FIG. 4 shows the change in the glass transition temperature of Example 32 in Table 3 (Form A), with the horizontal axis denoting the melting time and the vertical axis denoting the glass transition temperature Tg.

FIG. 4 shows the change in the glass transition temperature in Example 32 of Table 3, with the melting time denoted by the horizontal axis and the glass transition temperature Tg denoted by the vertical axis.

From these results, it will be understood that the change in characteristics accompanying change in the melting time was smaller in Examples 32 and 33 of Table 3, which had a lower D than in the reference composition, which had a D of 22.0.

When D increased above 22.0, and when it exceeded 60, the change in characteristics accompanying the change in melting time became extremely large. This meant that in the course of preparing the glass, the variation in the various characteristics of the glass ended up increasing. The main factor behind the variation in characteristics was thought to be volatilization from the glass. With pronounced volatilization, striae tended to form in the molded glass.

Additionally, since the value of D was low in the optical glasses of the examples of the present invention, including Examples 32 and 33 of Table 3, volatilization was suppressed, striae tended not to form, and there was little variation in the various characteristics during large-quantity production.

Keeping D within the above desirable range made it possible to control volatilization of the glass, preventing a decrease in quality due to variation in characteristics and striae.

The optical glasses thus obtained were suitable as glass materials for use in precision press molding.

The various characteristics of the optical glasses were measured by the following methods.

(1) The Refractive Index nd and the Abbé Number νd

The refractive indexes nd, nF, and nc of the glasses obtained by lowering the temperature at a rate of −30° C./hour were measured by the refractive index measuring methods of the Japan Optical Glass Industry Association Standards. The Abbé number νd was computed from these results.

(2) The Liquidus Temperature LT and the Viscosity at Liquidus Temperature

The glass was placed in a furnace that had been heated to a predetermined temperature, kept there for two hours, and cooled. The interior of the glass was then observed by optical microscopy at 100-fold magnification to determine the liquidus temperature based on the presence or absence of crystals.

The viscosity of the glass at the liquidus temperature was measured by the rotating cylinder method based on "JIS Z 8803-1991 'Liquid Viscosity—Measurement Methods,' 8. Viscosity measurement by single cylinder type rotational viscometer."

(3) The Glass Transition Temperature Tg

The glass transition temperature was measured at a heating rate of 10° C./min with a differential scanning calorimeter (DSC3300) made by Bruker ASX.

(4) Specific Gravity

The specific gravity was measured by Archimedes' method.

(5) λ(lambda) 80, λ70, λ5 (nm)

Plate like glass samples that were 1.0 mm in thickness, had two mutually parallel surfaces, and had been optically polished were employed. Monochromatic light of intensity $I_{in}$ was made to perpendicularly enter one of the optically polished surfaces, pass through the sample, and exit through the other optically polished surface, at which time the intensity was denoted as $I_{out}$. The external transmittance $I_{out}/I_{in}$ was then calculated. The external transmittance was measured over a wavelength range of 280 to 700 nm. The wavelength at which the external transmittance was 80 percent was denoted as λ80, that at which the external transmittance was 70 percent as λ70, and that at which the external transmittance was 5 percent as λ5.

(6) The Methods of Measuring Change Over Time
 (i) Refractive index nd
 (ii) Abbé number νd
 (iii) Specific gravity
 (iv) Glass transition temperature Tg The glass melt was sampled during melting and glass samples were used to measure the various characteristics by the above-described methods. A certain interval of time following the sampling was allowed to elapse, the glass melt was again sampled, and the glass samples were used to measure the various characteristics. The change in various characteristics over time was computed from measured values of the various characteristics obtained by two or more samplings and the sampling time interval.

(7) Weight Reduction

The weight reduction indicates the reduction in weight of fluorine-containing glass as glass components volatize during heating. To quantify the level of weight reduction, equipment measuring the change in weight of a sample accompanying change in temperature, such as TG-DTA measurement and TG-MS measurement, can be employed.

In TG-DTA, for example, a glass sample positioned on a precision scale is heated and the weight of the sample at various temperatures is measured to quantify the change in weight of the glass as the temperature rises.

Specifically, a prescribed weight W (about 100 mg) of glass sample in powder form was packed in a Pt cell 5 mm in diameter and 5 mm in height and heated at a rate of 10° C./min to 1,200° C. with a Rigaku Denki TG-DTA (Thermo Plus TG8120). The amount of weight reduction in the glass, Δ(DELTA)W (mg) was then measured, and the weight reduction was calculated as Weight reduction=ΔW/W×100(%).

Since weight reduction that is unrelated to the volatilization of glass components is sometimes observed due to the elimination of moisture and organic material adhering to the glass over the temperature range of from room temperature to 400° C., the weight reduction of the glass was defined as the weight reduction from 400 to 1,200° C.

(8) Volatilization Peak

The volatilization peak is the temperature of the sharp endothermic peak that appears in the high temperature range as the result of measurement by differential scanning calorimetry, DSC. That is, in the TG-DTA measurement of fluorine-containing glass, at temperatures exceeding 900° C., the rate of weight reduction of glass components with temperature change increases discontinuously, and displacement of heat accompanying the absorption of heat by the glass is sometimes observed. With such change in the weight reduction behavior of the glass, the temperature at which the peak in endothermic behavior is exhibited is defined in the present invention as the volatilization peak temperature Tv of the glass. The endothermic peak at temperature Tv can be measured by differential scanning calorimetry DSC if the range of change in the weight reduction rate is specified in advance by TG-DTA measurement.

Pronounced volatilization occurs at and above Tv. The lower temperature limit of the temperature range at which crystals that have precipitated melt is the liquidus temperature LT. So long as the glass melt is maintained at or above LT, crystallization (devitrification) will not occur. If Tv is higher than LT, the glass melt can be molded at a temperature between LT and Tv. Thus, volatilization can be prevented while preventing devitrification. The greater the temperature differential between LT and Tv, the wider the temperature range over which devitrification and volatilization can be prevented, and the easier it is to stably provide high-quality glass.

As the specific magnitude of the rate of weight reduction with temperature change, for a glass weight reduction of 0.5 percent, for example, the rate of weight reduction with temperature change of the glass is about $1 \times 10^{-3}$ wt %/° C. below or equal to temperature Tv, becoming about $3 \times 10^{-3}$ wt %/° C. above or equal to temperature Tv. For a glass weight reduction of 2 percent, the rate of weight reduction with temperature change is about $1 \times 10^{-3}$ wt %/° C. below or equal to temperature Tv, becoming about $15 \times 10^{-3}$ wt %/° C. above or equal to temperature Tv.

When LT≦Tv does not hold true, it does not mean that it is impossible to simultaneously prevent both devitrification and volatilization. Since it takes time for crystals to precipitate when maintaining the glass melt at a temperature somewhat lower than LT, volatilization does not occur. (The lower the temperature that is being maintained, the more rapidly crystal precipitation occurs.) Thus, the desirable range of Tv in Form B (Table 4) contains a temperature range that is lower than LT.

Comparative Examples

Figure 7:
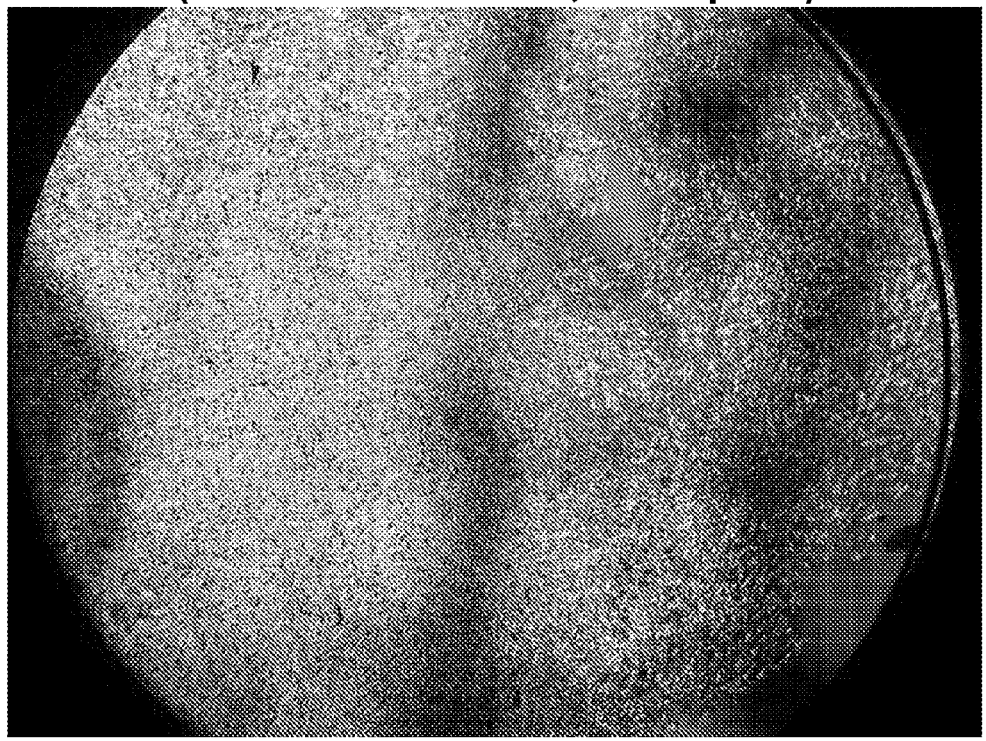
FIG. 7 shows microscopic photographs of the various glasses, following holding, in the comparative examples.

The glass of Example 5 described in Patent Document 1 (Japanese Unexamined Patent Publication (KOKAI) No. 2005-170782) was prepared by the method described in Patent Document 1. After maintaining the glass at 1,140° C. for two hours, an optical microscope was used to observe whether or not crystals had precipitated. FIG. 7 shows a microscopic photograph of the glass after it had been maintained at this temperature. As will be clear from FIG. 7, crystals were found on the surface and in the interior of the glass. These results clearly indicate that the liquidus temperature of Example 5 described in Patent Document 1 (Japanese Unexamined Patent Publication (KOKAI) No. 2005-170782) was higher than 1,140° C.

Wet Backwordly Comparison Test

Figure 8:
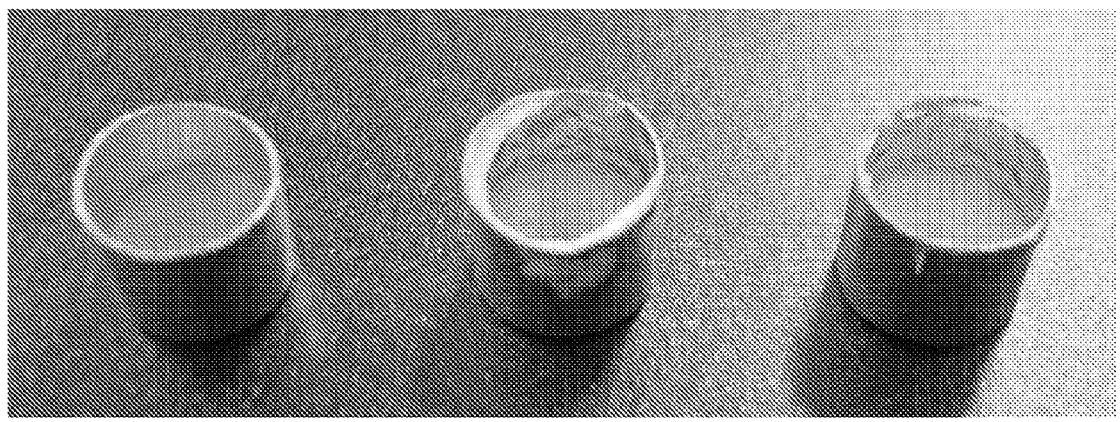
FIG. 8 shows the results (photographs) of a comparison experiment of wet backwordly.

The glass (Form B) of Example 22 in Table 4 and the glasses of Examples 2 and 3 in Patent Document 1 were subjected to a wet backwordly comparison test conducted by the following method. The results (photographs) are given in FIG. 8. As a result, it will be understood that while the glass of the present invention exhibited no wet backwordly, the glasses of Examples 2 and 3 of Patent Document 1 exhibited pronounced wet backwordly as well as high volatility.

Transmittance Curve

Figure 9:
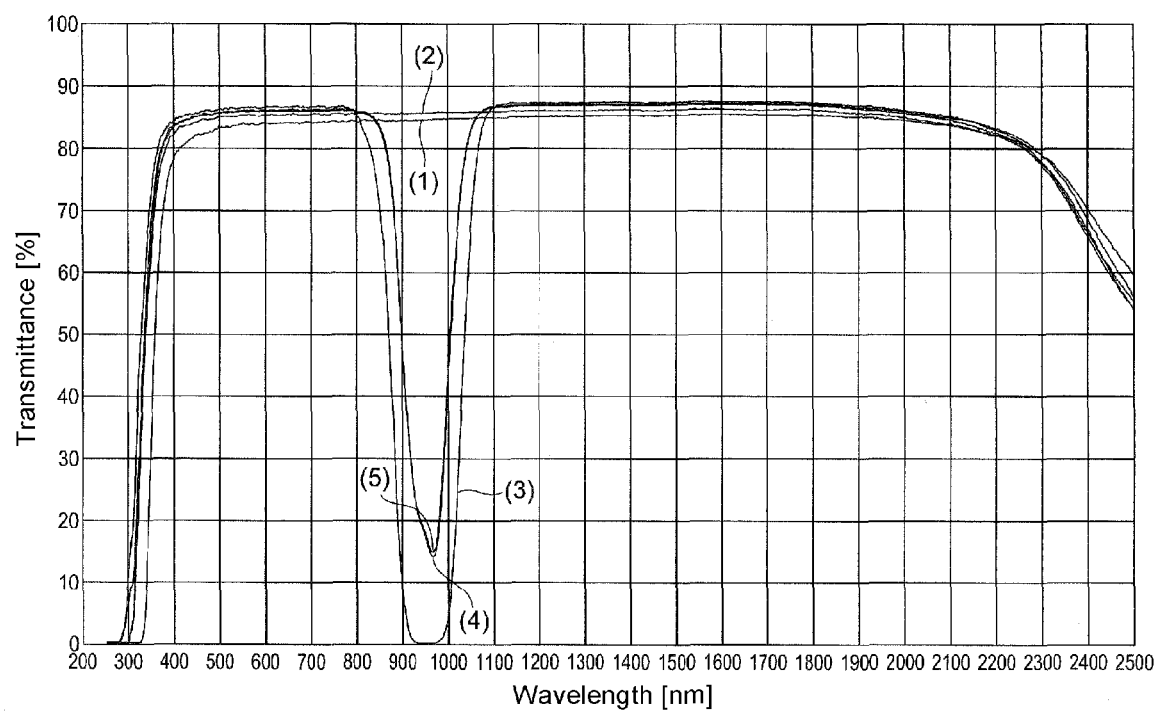
FIG. 9 shows transmittance curves for glasses reproduced from Patent Documents 1 and 3.

FIG. 9 shows transmittance curves that are the results of measurement of the spectral transmittance of samples 10 mm in thickness of the following glasses that were reproduced:

(1) Example 31 ($YbO_{1.5}$=0 percent) described in Patent Document 3 (WO2004/054937);
(2) Example 5 ($YbO_{1.5}$=0 percent) of Patent Document 1 (Japanese Unexamined Patent Publication (KOKAI) No. 2005-170782);
(3) Example 34 ($YbO_{1.5}$=6.11 percent);
(4) Example 3 ($YbO_{1.5}$=1 percent);
(5) Example 2 ($YbO_{1.5}$=0.98 percent).

The glasses of (1) and (2) above that did not contain $YbO_{1.5}$, described in Patent Documents 1 and 3, had high transmittance over a wavelength range of 900 to 1,000 nm. However, the glasses of (4) and (5), which contained slight amounts of $YbO_{1.5}$, exhibited transmittance of less than 20 percent over the same wavelength range because of strong absorbance by Yb. Almost no light of the above wavelength passed through the glass of (3). Thus, glasses containing more than 0.5 percent of $YbO_{1.5}$ are not suitable as materials for optical elements constituting image pickup optical systems in which high transmittance in the infrared range is desirable.

The various above glasses were then ground and polished to prepare precision press-molding preforms. It was possible for the shape of the preforms to be close to the shape of the optical element to be fabricated, spherical, or some other shape.

The entire surface of the preforms thus obtained was coated with a carbon film as necessary. The preforms were heated and precision press molded in a pressing mold to fabricate aspherical lenses such as convex meniscus lenses, concave meniscus lenses, biconvex lenses, biconcave lenses, plano-convex lenses, and plano-concave lenses. Following precision press molding, the molded products were centered as needed to finish the lenses. An antireflective film was also coated as needed on the surfaces of the lenses obtained.

Instead of a SiC mold, it was also possible to conduct precision press molding with a WC mold or a cermet mold. A mold release film in the form of a carbon film could also be coated on the molding surfaces of a SiC mold. A noble metal film, such as platinum, or a noble metal alloy film could also be coated on the molding surfaces of a WC mold.

Due to the low glass transition temperature of the optical glass, it was possible to lower the precision press molding temperature. Thus, good precision press molding could be conducted even without using a mold with extremely good heat resistance such as a SiC mold.

Next, the interchangeable lenses of a single-lens reflex camera and the image pickup optical system of a compact camera that incorporated the various above-described aspherical lenses were fabricated.

Further, the CCDs or CMOSs of the image pickup optical system of a compact camera were assembled to fabricate an image pickup optical system unit, which was built into a compact camera.

INDUSTRIAL APPLICABILITY

The present invention is useful in fields relating to optical glass.

What is claimed is:

1. An optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 20 percent; |
| $ZnO$ | 0 to 20 percent; |
| $ZrO_2$ | 0 to 4.5 percent; |
| $TaO_{2.5}$ | 0 to 7 percent; |
| $YbO_{1.5}$ | 0 to 0.5 percent; |
| $GeO_2$ | 0 to 5 percent; |
| $YO_{1.5}$ | 0.5 to 10 percent; | as well as O and F,
with the F/O molar ratio of the F content to the O content being 0.01 to 0.30;
the combined sum of the ZnO content, three times the $ZrO_2$ content, and five times the $TaO_{2.5}$ content ($ZnO+3ZrO_2+5TaO_{2.5}$) being 40 percent or less;
the combined sum of twice the $LiO_{0.5}$ content, the ZnO content, and ½ the F content ($2LiO_{0.5}+ZnO+(F/2)$) when the total quantity of cations is denoted as 100 being 20 percent or greater;
the value of $B_B-(B_O-B_B)$ falling within a range of −60 to +20, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;
the refractive index nd being 1.75 to 1.81;
the Abbé number vd being 48 to 52; and
the glass transition temperature Tg being 590° C. or lower.

2. The optical glass according to claim 1, wherein the refractive index nd and the Abbé number vd of the optical glass satisfy equation (1) below $$nd-(2.25-0.01\times vd)\geq-0.01 \quad (1).$$

3. An optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 20 percent; |
| $ZnO$ | 0 to 25 percent; |
| $ZrO_2$ | 8 percent or less; |
| $TaO_{2.5}$ | 7 percent or less; |
| $YbO_{1.5}$ | 0 to 3 percent; |
| $GeO_2$ | 0 to 5 percent; | as well as O and F,
with the F/O molar ratio of the F content to the O content being 0.01 to 0.30;
the ratio of the $ZrO_2$ content to the combined content of $ZrO_2$ and $TaO_{2.5}$ ($ZrO_2/(ZrO_2+TaO_{2.5})$) being 0 to 0.7;
the combined sum of $ZrO_2$ and $TaO_{2.5}$ ($ZrO_2+TaO_{2.5}$) being 3 to 10;
the combined sum of twice the $LiO_{0.5}$ content, the ZnO content, and ½ the F content ($2LiO_{0.5}+ZnO+(F/2)$) when the total quantity of cations is denoted as 100 being 20 percent or greater;
the value of $B_B-(B_O-B_B)$ falling within a range of −60 to +20, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;
the refractive index nd being 1.802 to 1.835; and
the Abbé number vd being 42 to 48.

4. The optical glass according to claim 3, wherein the refractive index nd and the Abbé number vd of the optical glass satisfy equation (2) below $$nd-(2.25-0.01\times vd)\geq-0.01 \quad (2).$$

5. An optical glass comprising, denoted as cationic percentages:

| | |
|---|---|
| $BO_{1.5}$ | 20 to 70 percent; |
| $LaO_{1.5}$ | 6 to 30 percent; |
| $GdO_{1.5}$ | 4 to 25 percent; |
| $SiO_2$ | 0 to 20 percent; |
| $LiO_{0.5}$ | 0 to 20 percent; |
| $ZnO$ | 0 to 15 percent; |
| $ZrO_2$ | 5 percent or less; |
| $TaO_{2.5}$ | 3 percent or less; |
| $YbO_{1.5}$ | 0 to 3 percent; |
| $GeO_2$ | 0 to 5 percent; | as well as O and F,
with the F/O molar ratio of the F content to the O content being 0.01 to 0.30;
the combined sum of the ZnO content, three times the $ZrO_2$ content, and five times the $TaO_{2.5}$ content ($ZnO+3ZrO_2+5TaO_{2.5}$) being 15 percent or less;
the combined sum of twice the $LiO_{0.5}$ content, the ZnO content, and ½ the F content ($2LiO_{0.5}+ZnO+(F/2)$) when the total quantity of cations is denoted as 100 being 20 percent or greater;
the value of $B_B-(B_O-B_B)$ falling within a range of −60 to +60, with the value $B_B$ being 1.5 times the content of $BO_{1.5}$ denoted as a cationic percentage, the total quantity of all cations in the glass being denoted as 100, and the molar ratio of the total oxygen content relative to this total quantity being denoted as $B_O$;
the refractive index nd being 1.675 to 1.745; and
the Abbé number vd being 51 to 58.

6. The optical glass according to claim 5, wherein the refractive index nd and the Abbé number vd of the optical glass satisfy equation (3) below $$nd-(2.25-0.01\times vd)\geq-0.01 \quad (3).$$

7. A preform for precision press molding that is comprised of an optical glass according to claim 1.

8. An optical element that is comprised of an optical glass according to claim 1.

9. A method of manufacturing an optical element comprises heating and precision press molding a preform according to claim 7 with a pressing mold.

10. A lens unit being equipped with an optical element according to claim 8.

11. An image pickup device being equipped with a lens unit of according to claim 10.

* * * * *